United States Patent
Ito et al.

(10) Patent No.: US 9,314,760 B2
(45) Date of Patent: Apr. 19, 2016

(54) CONTINUOUS FIXED-BED CATALYTIC REACTOR AND CATALYTIC REACTION METHOD USING SAME

(71) Applicant: NIPPON STEEL & SUMITOMO METAL CORPORATION, Tokyo (JP)

(72) Inventors: Nobuaki Ito, Tokyo (JP); Kimihito Suzuki, Tokyo (JP); Kenichiro Fujimoto, Tokyo (JP); Kenji Nakao, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/369,668

(22) PCT Filed: Jan. 21, 2013

(86) PCT No.: PCT/JP2013/051100
§ 371 (c)(1),
(2) Date: Jun. 27, 2014

(87) PCT Pub. No.: WO2013/108920
PCT Pub. Date: Jul. 25, 2013

(65) Prior Publication Data
US 2015/0010467 A1    Jan. 8, 2015

(30) Foreign Application Priority Data

Jan. 20, 2012 (JP) .................. 2012-010460
Jan. 20, 2012 (JP) .................. 2012-010464
Jan. 20, 2012 (JP) .................. 2012-010479

(51) Int. Cl.
*B01J 8/02* (2006.01)
*B01J 8/16* (2006.01)
(Continued)

(52) U.S. Cl.
CPC .. *B01J 8/16* (2013.01); *B01J 8/008* (2013.01); *B01J 8/02* (2013.01); *B01J 8/0285* (2013.01);
(Continued)

(58) Field of Classification Search
CPC .................. B01J 8/02; B01J 8/10; B01J 8/16; B01J 2280/00884; B01J 19/185; B01J 19/285; B01J 19/305
See application file for complete search history.

(56) References Cited

U.S. PATENT DOCUMENTS 2,635,949 A * 4/1953 Fenske et al. ................. 422/140
2,856,273 A * 10/1958 Beber et al. .................. 422/145
(Continued)

FOREIGN PATENT DOCUMENTS

JP    64-18438 A    1/1989
JP    8-24622 A     1/1996
(Continued)

OTHER PUBLICATIONS

Catalytic reaction device and its design (2nd engineering version) in Catalyst Lecture 6 edited by Catalysis Society of Japan and published by Kodansha Ltd. (Tokyo), 1985, pp. 100-169.
(Continued)

*Primary Examiner* — Lessanework Seifu
(74) *Attorney, Agent, or Firm* — Birch, Stewart, Kolasch & Birch, LLP

(57) ABSTRACT

A continuous fixed-bed catalytic reactor includes an inflow path for raw material gas for a catalytic reaction and an outflow path for reformed gas, a catalytic reaction container that is connected to the inflow path and the outflow path and holds a clumpy catalyst, catalyst holders that have a ventilation property and hold the clumpy catalyst, and a driving mechanism that moves the clumpy catalyst up and down by moving the catalyst holders up and down.

16 Claims, 25 Drawing Sheets

(51) Int. Cl.
*C10K 1/34* (2006.01)
*C10G 49/00* (2006.01)
*C10K 3/02* (2006.01)
*B01J 37/03* (2006.01)
*B01J 21/06* (2006.01)
*B01J 23/83* (2006.01)
*B01J 35/02* (2006.01)
*C01B 3/02* (2006.01)
*B01J 8/06* (2006.01)
*B01J 8/00* (2006.01)
*B01J 37/00* (2006.01)

(52) U.S. Cl.
CPC *B01J 8/06* (2013.01); *B01J 21/066* (2013.01); *B01J 23/83* (2013.01); *B01J 35/023* (2013.01); *B01J 35/026* (2013.01); *B01J 37/0036* (2013.01); *B01J 37/03* (2013.01); *C01B 3/02* (2013.01); *C10G 49/002* (2013.01); *C10K 1/34* (2013.01); *C10K 3/02* (2013.01); *C10K 3/023* (2013.01); *B01J 2208/00884* (2013.01); *B01J 2219/00247* (2013.01); *B01J 2219/3085* (2013.01); *B01J 2219/30223* (2013.01); *B01J 2219/30408* (2013.01); *B01J 2219/30416* (2013.01); *B01J 2219/30475* (2013.01)

(56) References Cited

U.S. PATENT DOCUMENTS

| | | |
|---|---|---|
| 4,670,993 A | 6/1987 | Dunaway et al. |
| 4,851,115 A | 7/1989 | Akao et al. |
| 2012/0058030 A1 | 3/2012 | Suzuki et al. |

FOREIGN PATENT DOCUMENTS

| | | |
|---|---|---|
| JP | 11-333283 A | 12/1999 |
| JP | 2006-35172 A | 2/2006 |
| JP | 2007-506856 A | 3/2007 |
| JP | 2008-120604 A | 5/2008 |
| JP | 2009-48797 A | 3/2009 |
| JP | 2010-77219 A | 4/2010 |
| JP | 2011-6289 A | 1/2011 |
| JP | 2011-212552 A | 10/2011 |
| JP | 2011-212574 A | 10/2011 |
| JP | 2011-212598 A | 10/2011 |
| WO | WO 82/01762 A1 | 5/1982 |
| WO | WO 87/01762 A1 | 3/1987 |
| WO | WO 00/35576 A2 | 6/2000 |
| WO | WO 2006/031011 A1 | 3/2006 |
| WO | WO 2010/134326 A1 | 11/2010 |

OTHER PUBLICATIONS

International Search Report, mailed Mar. 19, 2013, issued in PCT/JP2013/051100.

Written Opinion of the International Searching Authority, mailed Mar. 19, 2013, issued in PCT/JP2013/051100.

European Search Report issued in corresponding EP Application No. 13738004.4 on Jul. 6, 2015 (in English).

Office Action issued in corresponding Chinese Application No. 201380005695.6 on Jul. 23, 2015 (with English translation of the Search Report).

Notice of Allowance issued on May 12, 2015 in corresponding Japan Application No. 2012-010464 (with English translation).

* cited by examiner

A-A CROSS-SECTIONAL VIEW

B-B CROSS-SECTIONAL VIEW

CONTINUOUS FIXED-BED CATALYTIC REACTOR AND CATALYTIC REACTION METHOD USING SAME

TECHNICAL FIELD OF THE INVENTION

The present invention relates to a continuous fixed-bed catalytic reactor for causing a chemical reaction of a fluid using a clumpy catalyst and a technique for a catalystic reaction method using the same.

Priority is claimed on Japanese Patent Application No. 2012-010460, filed Jan. 20, 2012, Japanese Patent Application No. 2012-010464, filed Jan. 20, 2012, and Japanese Patent Application No. 2012-010479, filed Jan. 20, 2012, the contents of which are incorporated herein by reference.

RELATED ART

In a chemical reaction of a fluid using a fixed-bed catalytic reaction container filled with a catalyst, in a case in which a solid precipitate or the like is generated due to a catalytic reaction, the solid precipitate frequently accumulates in spaces between catalyst particles in a catalyst layer. Therefore, a problem of the catalyst layer becoming blocked and thus incapable of ventilating is caused.

For example, Patent Document 1 discloses a technique in which gas containing hydrogen, carbon dioxide, water vapor and tar is brought into contact with a catalyst containing nickel, cerium and aluminum in a fixed-bed catalytic reactor, thereby reforming tar gas. In this technique, solid carbon is precipitated on the catalyst surface during the reformation, and a recycling treatment in which water vapor or air is brought into contact with the carbon is required to remove the solid carbon.

In addition, Patent Document 1 also exemplifies the use of a moving bed catalytic reaction container and a fluidized-bed catalytic reaction container. In these catalytic reaction containers, carbon precipitated on the catalyst surface can be removed during a reaction operation. However, compared with the fixed-bed catalytic reaction container, the above-described containers are complex, and the operation is also likely to become unstable in the fluidized-bed catalytic reaction container. Therefore, the above-described containers are not ordinary as a reaction container particularly for treating a highly corrosive high-temperature and high-pressure fluid.

In the fixed-bed reaction container that does not have the above-described problem of the moving bed catalytic reaction container and the fluidized-bed catalytic reaction container, generally, spaces are provided on both sides of the catalyst layer, and a fluid is made to flow from one space to the other space, thereby causing a reaction. To form the spaces on both sides of the catalyst layer, a catalyst holding mechanism is required. A typical example of the catalyst holding mechanism is described in Patent Document 2, and the holding of the catalyst and the ventilation are ensured using a punching metal plate or a net having a pore diameter smaller than the catalyst diameter. FIG. 6 illustrates an example thereof, in which a catalyst 2 is accommodated inside a catalytic reaction container 1, and the catalyst is held using a punching metal plate 3 or a net. In FIG. 6, raw material gas 4 is made to flow in from an inflow opening 5 and to flow out from an outflow opening 6 as reformed gas 7.

As a method for preventing the blockage in the catalyst layer caused by the accumulation of the solid precipitate during the reaction, for example, Patent Document 2 describes a technique that prevents the blockage in a second catalyst layer by complementing dust in gas flowing out from a first catalyst layer in free spaces through which gas flows between the two catalyst layers. However, in this case, it is not possible to prevent the blockage in the catalyst layer caused by dust that is generated in the catalyst layer, is attached to and accumulates on the catalyst in the space between the catalyst particles.

Patent Document 3 describes a technique that drains and removes water generated on a catalyst by radiating an ultrasonic wave to a catalyst layer in a cell for a fuel battery. However, the ultrasonic wave significantly attenuates in a free space or in a granule layer and a powder layer, and therefore the ultrasonic wave is capable of acting only in the vicinity of a radiation source. Therefore, while this technique is effective for a relatively small catalyst layer like a catalyst layer in a cell for a fuel battery, in a large catalyst layer treating a large amount of a fluid, it is difficult to vibrate the entire catalyst layer using an ultrasonic wave.

Patent Document 4 describes a technique that suppresses coking by carrying out the water vapor reformation of hydrocarbon at a low temperature. However, a catalytic reaction has an optimal reaction temperature condition from the viewpoint of the catalyst durability and the reaction rate, and the blockage in the catalyst layer caused by coking occurs under the optimal condition. Therefore, a decrease in the catalytic reaction temperature hinders the catalytic reaction from occurring under the optimal condition, and therefore there is a problem of the degradation of catalyst performance.

Patent Document 5 describes the removal of the partial blockage in a catalyst layer caused by accumulated dust in a moving bed catalytic reaction container using a hammering apparatus or a vibrator as a related art. In this case, there is a problem in that hammering or vibration increases the filling rate of a catalyst so as to narrow spaces between catalyst particles, and conversely, the fluidity of the catalyst deteriorates.

Non-Patent Document 1 describes a parallel flow-type catalytic reaction container, a monolith-type catalytic reaction container, a pipe wall-type catalytic reaction container and the like as special fixed-bed catalytic reaction containers. All of the catalytic reaction containers are provided with catalyst layers and exclusive airflow paths surrounded by the catalyst layers, thereby reducing the airflow resistance in the catalytic reaction containers. To describe briefly, in the parallel flow-type catalytic reaction container, a plurality of ordinary catalyst layers having both ends held by a net or the like are arrayed in parallel, and spaces between the catalyst layers are used as exclusive airflow paths. In the monolith-type catalytic reaction container, a catalyst is carried by the surface of a structure having a honeycomb structure or the like, and holes in the honeycomb structure are used as exclusive airflow paths. In the pipe wall-type catalytic reaction container, the insides of pipes are used as exclusive airflow paths, and a catalyst is carried by the inner surfaces of the pipes.

In a case in which exclusive airflow paths are provided, when a solid product is generated from a catalytic reaction, the solid product accumulates on the catalyst surface configuring the exclusive airflow paths so as to decrease the flow path width of the exclusive airflow path, and in some cases, the exclusive airflow paths are blocked. Alternatively, even in a case in which the airflow paths are not blocked, the exchange of a fluid between the exclusive airflow paths and the catalyst layers is hindered by the solid product accumulated on the catalyst surface configuring the exclusive airflow paths, and therefore a "blow-by" phenomenon is caused in which raw material gas is drained without coming into contact with the active catalyst so as to significantly decrease the catalytic reaction efficiency. Alternatively, in a reaction container in which a plurality of exclusive airflow paths are provided, the respective exclusive airflow paths are isolated from each other (that is, in a state in which the substance exchange between adjacent airflow paths and the accompanying heat exchange are suppressed), and airflow paths incapable of supplying heat from the outside are provided in exclusive airflow paths located deep inside the reaction container like a monolith-type reaction container, in the case of an endothermic reaction in which the catalytic reaction is intensive, the reaction on the upper stream side significantly decreases the fluid temperature on the downstream side to a temperature at which the reaction is not possible, and the reaction efficiency extremely decreases. Conversely, in the case of an exothermic reaction in which the catalytic reaction is intensive, it is not possible to emit the generated heat to the outside through the reaction container at portions deep inside the reaction container, and thus the fluid temperature excessively increases on the downstream side such that the catalyst is inactivated, and in some cases, the catalytic reaction container is burned out.

Furthermore, in the case of the monolith-type reaction container, it is necessary to mold an entire monolith which generally has a complex shape and a large size as a carrier for carrying the catalyst or a single structure of the catalyst, and thus there is a problem in that the applicable catalyst design (structure) is limited to a relatively simple design (for example, a design in which a catalyst containing a single chemical component is uniformly applied to a carrier surface, or the like) due to catalyst-manufacturing techniques. Therefore, it is significantly difficult to apply the monolith-type reaction container to a catalyst having a complex design (structure) in which the surface is finely divided into a plurality of compartments of different chemical components and the respective chemical components exhibit a catalytic effect in mutual cooperation like, for example, a tar-reformed catalyst, and, even when such application is possible, the application becomes extremely expensive.

PRIOR ART DOCUMENT

Patent Document

[Patent Document 1] Japanese Unexamined Patent Application, First Publication No. 2010-77219
[Patent Document 2] Japanese Unexamined Patent Application, First Publication No. 2011-6289
[Patent Document 3] Japanese Unexamined Patent Application, First Publication No. 2009-48797
[Patent Document 4] Japanese Unexamined Patent Application, First Publication No. 2008-120604
[Patent Document 5] Japanese Unexamined Patent Application, First Publication No. H8-24622

Non-Patent Document

[Non-Patent Document 1] Catalytic reaction device and its design ($2^{nd}$ engineering version) in Catalyst Lecture 6 edited by Catalysis Society of Japan and published by Kodansha Ltd. (Tokyo), 1985, pp. 100 to 169

DISCLOSURE OF THE INVENTION

Problems to be Solved by the Invention

As described above, in the related art, there has been no method for effectively removing a solid product being generated and accumulated in a large fixed-bed catalyst layer. Therefore, a first object of the invention is to provide a continuous fixed-bed catalytic reactor having a unit for effectively removing a solid product being generated and accumulated in a large fixed-bed catalyst layer, and a catalytic reaction method in which raw material gas, particularly, tar-containing raw material gas is highly efficiently reformed using the continuous fixed-bed catalytic reactor.

In addition, there have been the following problems with the related art.

(A) For punching metal or a net, since it is not possible to set a large aperture ratio (1−[total aperture area]/[apparent cross-sectional area of flow paths]) due to a limitation of the strength of a holding mechanism (a possible maximum aperture ratio is approximately 70%), high airflow resistance or blockage is likely to occur.

That is, for example, in the case of a holding mechanism in which a net is used, there is an upper limit with the mesh size, and thus it is necessary to decrease the wire diameter of a wire rod configuring the net to increase the aperture ratio. However, in a relatively high-temperature operation condition required for a catalytic reaction, an extremely thin wire rod is easily broken due to the contact with a reactive gas that may be contained in raw material gas, and therefore it is not possible to employ an extremely thin wire rod.

(B) Since individual apertures are isolated from each other (the entire circumference of a small aperture is surrounded by a solid substance), for example, in the case of a reforming reaction or the like in which a catalyst for raw material gas containing tar is used, in response to a reforming reaction, a solid substance such as carbon generated on the catalyst surface drops onto and scatters into a holding mechanism, is attached to the outer circumferential sections of individual apertures in the holding mechanism, gradually grows toward the center of the aperture, finally, blocks the apertures, and disables ventilation.

Particularly, to hold a high-temperature or highly corrosive fluid, while it is desirable to use a Ni-containing alloy (stainless steel, INCONEL, HASTELLOY or the like) in terms of strength and corrosion resistance, metallic Ni frequently exhibits a reforming catalytic action of hydrocarbon so as to precipitate a solid substance of carbon or the like on the surface of a catalyst holder, and this effect also encourages the blockage in the apertures.

Therefore, a second object of the invention is to realize a high aperture ratio and the prevention of blockage in catalyst holders, and ultimately, to reform tar-containing gas at a high efficiency.

Means for Solving the Problem

To achieve the above-described objects, the invention employs the following configurations.

(1) According to a first aspect of the invention, there is provided a continuous fixed-bed catalytic reactor including an inflow path for raw material gas for a catalytic reaction and an outflow path for reformed gas; a catalytic reaction container that is connected to the inflow path and the outflow path and holds a clumpy catalyst; a catalyst holder that has a ventilation property and holds the clumpy catalyst; and a driving mechanism that moves the clumpy catalyst up and down by moving the catalyst holder up and down.

(2) In the continuous fixed-bed catalytic reactor according to the above (1), a space for storing a solid or liquid foreign substance generated in a catalyst layer may be provided below the catalyst layer that is a collection of the clumpy catalyst particles.

(3) In the continuous fixed-bed catalytic reactor according to the above (1) or (2), at least some of catalyst particles configuring side outer circumferential surfaces of the catalyst layer may be in contact with an inner wall of the catalytic reaction container.

(4) In the continuous fixed-bed catalytic reactor according to the above (2) or (3), a height of the catalyst layer may be twice or less a thickness of the catalytic reaction container and may be three times or more a maximum value of a typical length of an external surface of the clumpy catalyst.

(5) In the continuous fixed-bed catalytic reactor according to any one of the above (1) to (4), an average speed of the driving mechanism moving the catalyst holder down may be faster than an average speed of the driving mechanism moving the catalyst holder up.

(6) In the continuous fixed-bed catalytic reactor according to any one of the above (1) to (5), the catalyst holder may be disposed in parallel with each other, and may have a plurality of pins directly holding the clumpy catalyst at a front end section.

(7) In the continuous fixed-bed catalytic reactor according to the above (6), an inter-shaft distance between adjacent pins in the plurality of the pins may satisfy a condition of [inter-shaft distance between pins]−[outer diameter dimension of pin]<[minimum mesh size dimension allowing the clumpy catalyst to pass through].

(8) In the continuous fixed-bed catalytic reactor according to the above (6) or (7), a curvature at a contact section in the pin with the clumpy catalyst may be smaller than a maximum curvature on an outer surface of the clumpy catalyst.

(9) In the continuous fixed-bed catalytic reactor according to any one of the above (1) to (8), the catalyst holder may have central rods forming catalyst particle series by penetrating a plurality of the clumpy catalyst particles without impairing mobility of the clumpy catalyst and a holding plate supporting the plurality of the central rods upright.

(10) In the continuous fixed-bed catalytic reactor according to the above (9), a material with a high thermal conductivity may be used for the central rods, and a heating apparatus may be provided to heat end sections of the central rods.

(11) In the continuous fixed-bed catalytic reactor according to the above (9) or (10), the driving mechanism may be operated so that a speed of the central rod becomes slower than a speed of the clumpy catalyst particles at a terminal portion of reciprocal movement by the driving mechanism.

(12) In the continuous fixed-bed catalytic reactor according to any one of the above (1) to (11), the raw material gas may be gas containing hydrocarbon, and products of a catalytic reaction may be gas and solid hydrocarbon or solid carbon.

(13) In the continuous fixed-bed catalytic reactor according to the above (12), the raw material gas may be gas containing tar.

(14) In the continuous fixed-bed catalytic reactor according to the above (13), the clumpy catalyst may be a complex oxide containing nickel, magnesium, cerium and aluminum, and is made of a complex oxide not containing alumina, in which the complex oxide may be made of crystal phases of $NiMgO$, $MgAl_2O_4$ and $CeO_2$.

(15) In the continuous fixed-bed catalytic reactor according to the above (13), the clumpy catalyst may be made of a complex oxide containing nickel, magnesium, cerium, zirconium and aluminum, in which the complex oxide includes crystal phases of $NiMgO$, $MgAl_2O_4$ and $Ce_xZr_{1-x}O_2$ ($0<x<1$).

(16) In the continuous fixed-bed catalytic reactor according to the above (13), the clumpy catalyst may be a catalyst for reforming tar-containing gas that is a complex oxide represented by $aM.bNi.cMg.dO$, in which a, b and c satisfy $a+b+c=1$, $0.02 \leq a \leq 0.98$, $0.01 \leq b \leq 0.97$ and $0.01 \leq c \leq 0.97$, d represents a value at which oxygen and a positive element become electrically neutral, M represents at least one element selected from Ti, Zr, Ca, W, Mn, Zn, Sr, Ba, Ta, Co, Mo, Re, platinum, rhenium, palladium, rhodium, Li, Na, K, Fe, Cu, Cr, La, Pr and Nd, at least one oxide selected from silica, alumina and zeolite is added to the complex oxide, and an amount of the oxide selected from silica, alumina and zeolite is in a range of 1% by mass to 90% by mass with respect to the complex oxide.

(17) According to a second aspect of the invention, there is provided a continuous fixed-bed catalytic reaction method in which a catalytic reaction is caused using the continuous fixed-bed catalytic reactor according to any one of the above (1) to (16).

Effects of the Invention

According to the continuous fixed-bed catalytic reactor of the invention, it is possible to efficiently remove a solid accumulated substance which is generated and accumulated on the catalyst particles in the fixed-bed catalyst layer so as to degrade the catalyst performance and causes the blockage in the catalyst layer by moving the entire catalyst layer up and down. Therefore, it is not necessary to stop the operation to wash the blocked catalyst holder as in the related art, and it becomes possible to continuously operate the reactor. In addition, it is possible to cause with a high efficiency a catalytic reaction generating a solid product such as solid carbon using the continuous fixed-bed catalytic reactor.

EMBODIMENTS OF THE INVENTION

Figure 1A:
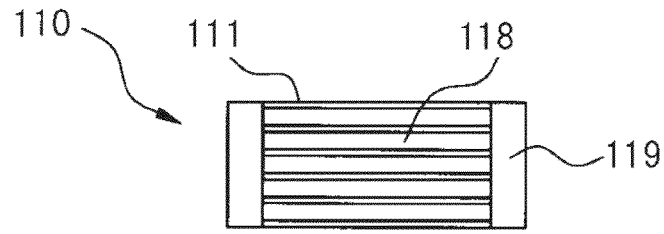
FIG. 1A is a plan view of a continuous fixed-bed catalytic reactor according to a first embodiment of the invention.

As a result of investigations, the present inventors found that a mechanism of the accumulation of solid carbon generated between catalyst particles in a fixed-bed catalyst layer was as described below.

(1) In inter-catalyst spaces formed between a plurality of adjacent catalyst particles in a fixed-bed catalyst layer, (partially reformed) raw material gas flows in through voids on the upper stream side of the main stream, and reformed gas (including some of non-reformed raw material gas) flows out through voids on the downstream side of the main stream as reformed gas.

(2) When the raw material gas supplied to the inter-catalyst spaces is reformed by a catalytic reaction, some of solid carbon generated on the catalyst surface is attached to the catalyst surface.

(3) When the raw material gas supplied to the inter-catalyst spaces is reformed by a catalytic reaction, fine solid carbon particles that have been generated on the catalyst surface and then set free from the catalyst surface by an air stream are attached to the solid carbon that has been previously attached to the catalyst surface, whereby carbon spheres having a diameter in a range of several tens of micrometers to approximately one millimeter grow on the catalyst surface.

(4) The carbon spheres are occasionally set free from the catalyst surface, and are reattached to other previously-existing carbon spheres, whereby a solid carbon accumulation layer that is made up of multiple layers of carbon spheres and has a thickness reaching up to several millimeters is formed on the catalyst surface.

(5) The solid carbon accumulation layer is substantially porous, and therefore a large pressure loss is caused when gas is ventilated at a high speed.

(6) When the ventilation resistance becomes excessive in specific inter-catalyst spaces, the main stream preferentially flows through inter-catalyst spaces having a lower ventilation resistance. However, since the solid carbon accumulation layer is porous, even in spaces having a ventilation resistance excessively increased by the accumulation of the solid carbon, the flow of the gas into the inter-catalyst spaces is not fully blocked, and the raw material gas is continuously supplied to the catalyst surface at a low flow rate. As a result, the growth of the solid carbon on the catalyst surface by gas reformation continuously progresses at all times (however, since the exposed area on the catalyst surface decreases, the reformation rate significantly decreases compared with the reformation rate in the initial stage).

(7) When the solid carbon accumulates in the majority of the inter-catalyst spaces in the catalyst layer, the pressure loss becomes excessive as a whole in the catalyst layer, and a "blocked state" is caused (in a catalytic reaction container, the raw material gas needs to be treated at a predetermined flow rate, and, in a state in which the pressure loss unavoidably exceeds the permissible value (determined by the gas transportation capability, the strength of the container, and the like) of a reactor although the raw material gas is ventilated through all the inter-catalyst spaces at the predetermined flow rate, the catalyst layer becomes substantially "blocked").

When the solid carbon accumulation layer is solely removed from the catalyst surface in the fixed-bed catalytic reaction container in which a reformation reaction of hydrogen, carbon dioxide, water vapor and tar-containing gas is caused and the catalyst layer is blocked, the solid carbon accumulation layer is put into a container, and an external mechanical force such as light shaking is applied, the solid carbon accumulation layer is easily separated at the boundaries of the carbon spheres that are configuration units, and is powdered. To remove the solid carbon from the catalyst layer blocked by the above-described accumulation of the solid carbon, the inventors tested a variety of measures.

The inventors tested the backwashing of the catalyst layer through blowing from the outside of the catalyst layer as a first measure. In detail, the backwashing of the catalyst layer was tested by providing a nitrogen gas supply pipe on the downstream side of the catalyst layer in the reaction container and spraying a high-speed nitrogen flow to the catalyst layer. The backwashing is an ordinary method used as a measure for solving the blockage in a dust-removing filter.

The result was that, while some of the solid carbon was removed, the pressure loss in the catalyst layer changed only slightly, and there was no effect to solve the blockage. The reasons for the above-described result are considered as follows.

1) In the case of a filter, among dust grains flowing into the filter from the upper stream side, dust grains larger than the filter mesh size are trapped on the site. Generally, the filter has a larger mesh size on the upper stream side, and therefore, in a case in which backwashing is carried out by supplying a high-speed flow to a blocked part in the filter from the downstream side of the main stream, among the trapped dust grains, dust grains set free from the meshes of the filter pass through larger meshes when being transported by the high-speed airflow toward the upper stream side of the main stream, and therefore the dust grains are not likely to be re-trapped at the meshes and can be exhausted outside the filter.

Meanwhile, the accumulation layer of the solid carbon or the like which is a byproduct of the catalytic reaction is generated in the inter-catalyst spaces using the gas as a raw material instead of flowing in from the upper stream side of the main stream. Therefore, the sizes of accumulated carbon particles are not always smaller than inflow and outflow voids in the inter-catalyst spaces, and therefore a large number of accumulated carbon particles that cannot be flowed out from the inter-catalyst spaces remain in the inter-catalyst spaces.

When the carbon accumulation layer is broken and powdered, it might be possible to flow the accumulated carbon particles out from the inter-catalyst spaces. However, generally, the stress supplied by the airflow to the accumulated carbon is small (even when a large air pressure difference is supplied to the entire catalyst layer, since it is common for the catalyst to be loaded into the catalyst layer in multiple layers, the air pressure difference between the inlet and outlet of each inter-catalyst space becomes small, and it is not possible to supply a large stress to the accumulated carbon), and it is not possible to break the accumulated carbon layer.

2) When some of the carbon is removed, narrow flow paths formed of a series of a small number of the inter-catalyst spaces the airflow resistance of which has been decreased as a result of the removal of the carbon are newly formed in the catalyst layer, and the majority of the main stream flows mainly through these flow paths. At this time, an air stream rarely passes through the inter-catalyst spaces other than the newly-formed flow paths, and therefore the carbon is no longer removed. Therefore, the flow speed increases in the narrow flow paths through which the main stream passes, and a large pressure loss is caused, and therefore the blocked state does not improve. Since the new flow paths formed as described above are also rapidly blocked again by the generation and accumulation of new carbon in the flow paths, the effect of the backwashing lasts only for a short period of time. Meanwhile, in the inter-catalyst spaces made of (surrounded by) the catalyst inactivated in an early stage, the re-blocking of the inter-catalyst spaces as described above does not occur. However, when the main stream only comes into contact with the inactivated catalyst and passes through the catalyst layer, it is not possible to reform the gas, and therefore the filter is not capable of exhibiting performances as the catalytic reaction container.

Based on what has been described above, the following conclusion can be drawn.

That is, generally, in the blocked catalyst layer, a state of

[the size of each accumulated carbon]>[the void in the inter-catalyst space]

is formed, and it is not possible to remove a large amount of carbon from the catalyst layer unless

[the size of each accumulated carbon]<[the void in the inter-catalyst space]

is satisfied, and the backwashing of the catalyst layer through blowing from the outside of the catalyst layer is not effective for the removal of carbon.

Therefore, as a second measure, an attempt was made to break the accumulated carbon layer or to enlarge the inter-catalyst space by hammering the external surface of the reaction container.

The result is as follows: when hammering (first hammering) was carried out after the occurrence of the initial blockage, some of accumulated carbon could be removed, the pressure loss was also decreased to approximately half, and a certain effect was observed. After that, when hammering (second hammering) was carried out again after the reoccurrence of blockage, only a small amount of accumulated carbon was removed, the pressure loss did not change, and it was not possible to avoid blockage. That is, it was found that the second and later hammerings of the external surface of the reaction container were not effective for the removal of accumulated carbon. The reason for the above-described result is considered as follows.

1) When the catalyst is accumulated in the reaction container, it is common to simply drop the catalyst from above, and therefore the catalyst is not in a close-packed state in the catalyst layer. When the first hammering is carried out on the catalyst not in a close-packed state, the catalyst turns into a close-packed state or an almost close-packed state due to vibration (for simplification, hereinafter, referred to as "close-packed emphasizing"). During the close packing process, the relative position between catalyst particles moves a total of approximately 30% of the typical length of the catalyst particles. During the above-described movement of the relative position (that is, relative inter-catalyst movement), since some of the accumulated carbon is broken due to the contact stress with the catalyst so as to be decreased in size, and there are moments at which the inter-catalyst intervals temporarily widen, a relationship of

[the size of each accumulated carbon]<[the void in the inter-catalyst space]

is realized, the catalyst drops into the catalyst layer, and finally, is removed from the catalyst layer.

2) Meanwhile, since the catalyst layer is close-packed after the end of the first hammering, even when the second and later hammerings are carried out, the relative positions of the catalyst particles rarely change, and the breakage of the accumulated carbon or the widening of the intervals between the catalyst particles does not occur. Therefore, in the second and later hammerings, an effect that removes the accumulated carbon was not observed.

Based on what has been described above, the following conclusion can be drawn.

That is, in many cases, since the blockage-solving effect of the first hammering does not last for the necessary treatment duration in the catalytic reaction container, the hammering of the external surface of the reaction container is not sufficient for the continuous removal of the accumulated carbon. To continuously remove the accumulated carbon from the catalyst layer, a method for setting

[the size of each accumulated carbon]<[the void in the inter-catalyst space], and then breaking the close-packed state of the catalyst layer is required.

Based on the above-described conclusion, moving the catalyst layer in the reaction container was tested as a third measure. In more detail, it was tested to move up and down the entire catalyst layer by moving up and down a holder provided at the bottom of the catalyst layer in a state in which the catalyst was in contact with the inner wall of the reaction container in a still reaction container (that is, a state in which at least some of the catalyst particles configuring the side outer circumferential surfaces of the catalyst layer were in contact with the inner wall of the catalytic reaction container). As a result, the up-and-down movement of the catalyst layer reaches a stable state (averagely, the catalyst layer returns to the initial state after one cycle of up-and-down operation) after several times of the up-and-down operation. When the holder is moved up in the stable state, generally, the elevating amount of the top end of the catalyst layer is smaller than the elevating amount of the bottom end of the catalyst layer, and the top and bottom ends of the catalyst layer return to the initial locations after the holder is moved down. Therefore, in the up-and-down cycle of the holder, the average packing ratio of the catalyst layer changes (the average packing ratio of the catalyst layer increases when the holder is moved up, and the average packing ratio of the catalyst layer decreases when the holder is moved down), and relative inter-catalyst movement occurs in the catalyst layer at least in an up-and-down direction. The difference in the elevating amount between the top end and bottom end of the catalyst layer during the up-and-down movement of the holder increases as the height of the catalyst layer (the distance between the top end and bottom end of the catalyst layer) increases, and in the end, the top end of the catalyst layer is rarely moved up. In a state in which the top end of the catalyst layer is not moved, since the catalyst particles in the vicinity of the top end of the catalyst layer are not moved by the up-and-down movement of the holder, the relative inter-catalyst movement is not caused. As a result, in this region, it is not possible to remove the accumulated carbon between the catalyst particles by moving the holder up and down. Therefore, it was found that, to remove the accumulated carbon between the catalyst particles in the entire catalyst layer by moving the holder up and down, it is necessary not only to change the average packing ratio of the catalyst layer but also to ensure a sufficient up-and-down stroke even in the top end of the catalyst layer by moving the holder up and down.

Figure 4:
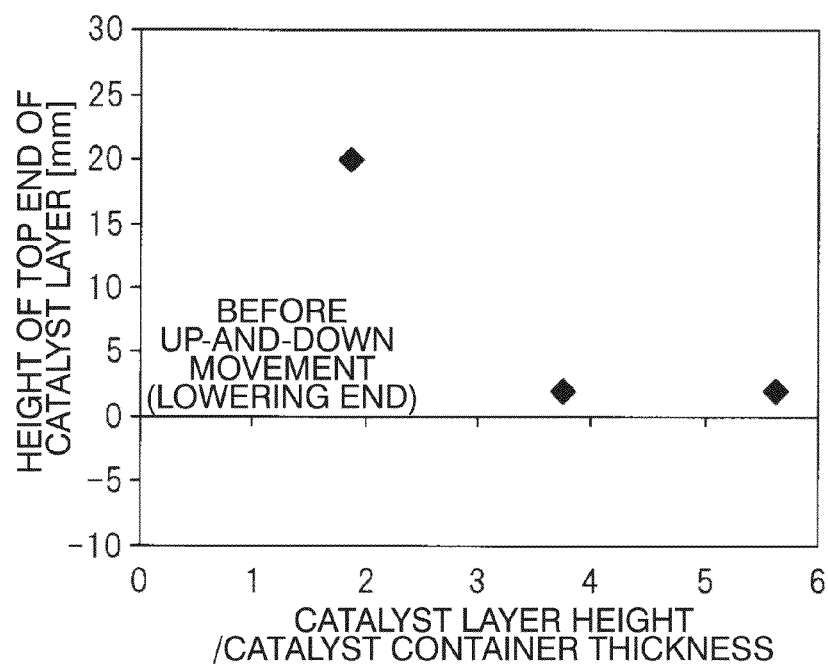
FIG. 4 is a graph illustrating a relationship between an aspect ratio of a catalyst layer and a height of a top end of the catalyst layer.

FIG. 4 illustrates the height of the top end of the catalyst layer expressed as the displacement of the height of the top end of the catalyst layer in a stable state after the catalyst layer in the still reaction container is moved up and down five times in a state in which the catalyst is in contact with the inner wall of the reaction container by moving the holder up as high as 27 mm in an apparatus having a mechanism in which the catalyst layer is formed by loading the catalyst into a duct-shaped reaction container having a rectangular cross-sectional surface with a constant cross-sectional area and the catalyst layer is held by providing the holder below the catalyst layer. The vertical axis indicates the height of the top end of the catalyst layer, and the criterion height of 0 mm corresponds to the location of the top end of the catalyst layer in the vertical direction before the holder is moved up. The catalyst layer height/reaction container thickness in the horizontal axis refers to an index that, hereinafter, will also be called the "aspect ratio" of the catalyst layer, and the reaction container thickness corresponds to the shortest length of the typical lengths of the reaction container on a horizontal plane, for example, the length of the short side in a case in which the horizontal cross-section of the reaction container is rectangular, and the diameter in a case in which the horizontal cross-section of the reaction container is round.

From FIG. 4, it is found that, when the aspect ratio (catalyst layer height/reaction container thickness) of the catalyst layer is larger than two, the elevating amount of the catalyst layer (the elevating amount based on the height before the initiation of the up-and-down movement that is finally admitted after five times of the up-and-down operation) is much smaller than the elevating amount of the holder (27 mm) or the external size (diameter) of the catalyst (15 mm). This indicates that, when the holder is moved up (when the catalyst layer is moved up), the catalyst packing ratio increases, and, when the holder is moved down (when the catalyst layer is moved down), the packing ratio decreases. Since the catalyst on the bottom side has a larger movement speed during the up-and-down movement of the holder, the movement speeds of the respective catalyst particles differ in the height direction of the catalyst layer, and the relative inter-catalyst movement is caused at least in the vertical direction. Under the above-described condition (the aspect ratio>2), the elevating amplitude of the top end section of the catalyst layer is small, and therefore the relative movement between the catalyst particles is relatively small at this section, and the exhaust capability of the accumulated carbon between the catalyst particles is low.

On the contrary, when the aspect ratio of the catalyst layer is equal to or smaller than two (aspect ratio=1.8), it is found that the elevating amount of the top end of the catalyst layer is slightly smaller than the elevating amount of the holder (the top end of the catalyst layer is moved up as high as 20 mm compared with the elevating amount of the holder of 27 mm). That is, under the above-described condition, the same level of the up-and-down stroke as in the holder is also satisfied in the top end of the catalyst layer, the relative inter-catalyst movement in the entire area of the catalyst layer which means that a change in the packing ratio of the catalyst layer by the up-and-down movement of the holder is ensured can be realized, and the exhaust capability of the accumulated carbon between the catalyst particles is high.

Furthermore, in addition to the above-described effect of the relative inter-catalyst movement in the vertical direction, when the catalyst layer is moved up and down in a state in which the catalyst is in contact with the inner wall of the reaction container, it is possible to exhibit an effect that generates the relative inter-catalyst movement in the thickness direction and in the width direction of the catalyst layer as well. That is, when the change in the relative position between the catalyst particles during the change in the packing ratio caused by the up-and-down movement of the catalyst layer is taken into account, the restriction state with respect to the movement of the respective catalyst particles in the thickness direction of the catalyst layer (the same as the thickness direction of the reaction container) differs. This results from the restriction with respect to the catalyst particles in the vicinity of the wall surface increased by the friction with the wall surface and the small up-and-down movement speeds in the initial phase. As a result, the movement speeds of the respective catalyst particles in the thickness direction of the catalyst layer differ, and therefore the relative movement among the catalyst particles is caused.

In a case in which the catalyst layer is moved up and down by bringing the catalyst into contact with the inner wall of the container in the reaction container as described above, the change in the relative position between the catalyst particles during the change in the packing ratio caused by the up-and-down movement of the catalyst layer becomes great; for example, in a case in which the up-and-down stroke of the holder is 30 mm, the change in the relative position between the catalyst particles reaches approximately 30% of the typical length (for example, 15 mm) of the catalyst particles each time the catalyst layer is moved up and down.

It was found that, when the catalyst is brought into contact with the inner wall of the container in the reaction container, and the catalyst layer is moved up and down, thereby moving the individual relative positions between the catalyst particles and stirring the entire catalyst layer as described above, it is possible to remove a solid substance accumulated between the catalyst particles throughout the entire catalyst layer, for example, carbon or the like accumulated during the reformation reaction of gas containing a tar component from the catalyst layer by efficiently dropping the solid substance from between the catalyst particles.

Regarding the up-and-down speed of the catalyst, the average lowering speed is preferably greater than the average elevating speed. Particularly, when the holder is lowered at a speed greater than the free fall speed of the bottom part of the catalyst layer, more preferably, at a speed greater than the free fall speed of the catalyst at the bottom end of the catalyst layer, since the bottom end of the catalyst layer is separated from the holder, and the catalyst particles are gradually accumulated in the holder that has been stopped in advance at the location of the bottom end of the holder, it is possible to make the close-packed catalyst layer loosely packed through the rearrangement of the catalyst particles. At the same time, since there might be a moment in which the intervals between the catalyst particles become extremely large during the dropping of the catalyst particles, it is possible to efficiently remove the solid substance accumulated between the catalyst particles.

On the contrary, in a case in which the holder and the reaction container are moved up and down at a constant speed, since the entire catalyst layer is moved up and down at the same speed as those for the holder and the reaction container, there is no relative movement between the catalyst particles. Therefore, the effect to remove solid carbon or the like on the catalyst surface is low (the same effect as the hammering from the outside of the reaction container). In addition, the same result is also obtained in a case in which the entire catalyst is put into a basket or the like, and the basket and the catalyst layer are moved up and down at the same time.

Based on what has been described above, it was found that, to remove a solid accumulate generated and accumulated on the catalyst in the fixed-bed catalyst layer, it is preferable to relatively move the catalyst layer with respect to the reaction container together with the holder. This is the basic principle of the present embodiment. In addition, according to the embodiment, when the entire catalyst layer is stirred (the relative positions of the respective catalyst particles are moved) for a short period of time during the catalyst reaction from which a solid product such as solid carbon is generated, there is an outstanding effect that the solid product accumulated between the catalyst particles is efficiently dropped from between the catalyst particles throughout the entire catalyst layer, whereby the solid product can be removed from the catalyst layer. The solid product removed from the catalyst layer can be dropped through an opening section of the holder, and the solid product remaining in the bottom section after dropping can be exhausted to the outside of the system during, for example, the exchange or the like of the catalyst.

The embodiment can be preferably applied for the removal of the solid product generated and accumulated on the catalyst in the fixed-bed catalyst layer. For example, in the reformation reaction of tar-containing gas in which a complex metal oxide catalyst containing nickel, magnesium, cerium, zirconium and aluminum is used, compared with other reactions, a larger amount of solid carbon is accumulated on the catalyst surface, and the need for removing the solid carbon is also stronger. According to the embodiment, even in a case in which a catalyst for the reformation reaction of tar-containing gas in which a larger amount of solid carbon is accumulated on the catalyst surface compared with other reactions as described above is used, it becomes possible to efficiently remove the solid product generated and accumulated on the catalyst.

Unlike a catalyst fixed bed that is the subject of the embodiment, in a moving bed, it is a principle to continuously move (and stir) the catalyst during the reaction. On the contrary, in the embodiment, since the catalyst layer needs to be moved intermittently for a short period of time in the reaction container, it is not necessary to stir the catalyst during the reaction. Furthermore, in the moving bed, a constant amount of the catalyst is exhausted to the outside of the system during the reaction, and the same amount of the catalyst is supplied from the outside of the system. On the contrary, in the embodiment, the catalyst is not exchanged during the reaction (since the catalyst layer is a fixed bed).

In addition, as a fourth measure, it was tested that, using a "catalyst particle series" defined as a plurality of catalyst particles having a through-hole therein that is connected using a central rod and is arrayed in a row, a "catalyst bar" which is a part defined as a plurality of the catalyst particle series arrayed at certain intervals is disposed in a catalytic reaction container, spaces between the respective catalyst particle series are used as exclusive airflow paths, and the catalyst bar is reciprocally moved for a short period of time after a certain period of time elapses from the initiation of the operation of a catalytic reactor. As a result, the following was found.

(a) During a period of time from the initial state of the reaction to the accumulation of a predetermined amount of a solid reaction product on the catalyst surface,

[the size of each accumulated carbon]<[the void in the inter-catalyst space (the width of the exclusive airflow path)]

is realized. Therefore, the accumulated substance can be separated from the catalyst surface by reciprocally moving the catalyst bar until a predetermined amount of the solid product is accumulated on the catalyst. Furthermore, when the separated solid product is dropped or transported by air stream through the exclusive airflow paths, the solid product can be exhausted to the outside of the catalytic reaction container. Since it is possible to return the product accumulation state on the catalyst surface to the same state as the initial state of the reaction by removing the product on the catalyst surface in the above-described manner, the ventilation property of the reaction container can be maintained favorable at all times by repeating the above-described reciprocal movement operation each time the accumulation of the product progresses.

Here, according to the embodiment, it is possible to enlarge the cross-section of each exclusive airflow path (for example, to the same level of the height of the catalyst container in the main stream direction and the cross-sectional area of the catalyst in a direction perpendicular to the main stream direction) while maintaining the same level of the catalyst packing ratio as in the catalyst layer having a simple laminate structure of the related art. Therefore, the product accumulated in a small amount in the airflow paths does not hinder the ventilation property of the reaction container, and therefore it is possible to decrease the required frequency of the above-described reciprocal action (for example, once an hour). This results from the fact that, in the embodiment, voids between the catalyst particles which were a number of small spaces dispersed among individual catalyst particles in the catalyst layer of the related art having a simple laminate structure are concentrated into a small number of large airflow paths, whereby both a high ventilation property and a high packing ratio can be satisfied. On the other hand, the catalyst layer of the related art having a simple laminate structure has a structure in which individual catalyst particles support each other so as to form and hold the catalyst layer, and therefore airflow paths formed between adjacent catalyst particles are divided into fine segments for individual catalyst particles, and are likely to form narrowed parts. In the above-described catalyst layer, the cross-sectional area of the flow path that can be ensured at the narrowed parts of the airflow path is at most approximately 1/10 of the cross-sectional area of the catalyst, and therefore the ventilation resistance of the reaction container is abruptly increased even when a small amount of a product is accumulated in the airflow paths (the ventilation resistance of the airflow path is generally dependent on the cross-sectional area of the narrowed part). Furthermore, in addition to the above-described catalyst layer, in another catalyst layer of the related art, when a product was once accumulated in the airflow paths, since there was no method for removing the accumulated product, in a reaction container in which a product was highly likely to be generated by a reaction, the continuous up-time was extremely short due to a limitation caused by an increase in the ventilation resistance.

(b) During the reciprocal movement of the catalyst bar, since adjacent catalyst particles are not coupled with each other in the respective catalyst particle series, relative movement is highly likely to occur between the catalyst particles (for example, since the frictional force between the insidewall of catalyst and the surface of a central rod adjacent to the insidewall of catalyst differs depending on the catalyst, the speeds of the respective catalyst particles driven by the central rod vary even when the central rod is moved at a constant speed). Therefore, the catalyst particles easily collide with each other, and strong surface vibrations occur between the catalyst particles during the collision, whereby it is possible to separate the product from the catalyst surface.

On the contrary, in the case of a pipe wall-type catalytic reaction container of the related art in which the insides of pipes are used as the exclusive airflow paths, and a catalyst is carried by the inner surfaces of the pipes, since the catalyst carrier is a single structure, even when the catalyst carrier is reciprocally moved, the catalyst carrier is simply moved as a whole, and there is no relative movement in the carrier. Therefore, the surface vibration of the catalyst only has a limited effect (for example, even when an impact is partially supplied, the vibration on the catalyst surface is abruptly attenuated as it moves away from the impact point. In addition, even when the entire pipe wall is uniformly impacted, the mechanism becomes excessively complex in terms of structure, which is not preferable), the effect to separate the product from the catalyst surface is small. In a reaction container provided with other exclusive airflow paths (for example, a monolith-type reaction container) as well, since the catalyst structure is a single structure, it is difficult to efficiently vibrate the entire catalyst for the same reason as in the pipe wall-type reaction container.

(c) Since the periodic reciprocal movement of the catalyst bar decreases the accumulation of a bulk-shaped product on the catalyst surface, the raw material gas can reach the catalyst surface at all times in the catalyst reaction container. Therefore, the catalytic reaction efficiency decreases only slightly.

(d) Since the exclusive airflow paths between the catalyst particle series are coupled with each other, gas is likely to diffuse (substance exchange and the accompanying heat exchange) in a direction perpendicular to the main stream of a fluid. Therefore, a sufficient amount of heat can be supplied from a heated surface to the catalyst present far away from the outer wall surface of the catalytic reaction container which is the heated surface (in a case in which the catalytic reaction is an endothermic reaction) through gas diffusion, and the blow-by does not easily occur.

(e) Particularly, since a highly thermal conductive material is used for the central rod for the catalyst particle series, and the end sections of the central rod are heated, the absorption of heat by the reaction is compensated by heating the catalyst present far away from the wall surface through the central axis, whereby a decrease in the catalyst temperature and a decrease in the reformation efficiency caused by the decrease in the catalyst temperature can be avoided, and therefore it is possible to further prevent the occurrence of the blow-by.

When a plurality of the catalyst particle series in which individual catalyst particles are connected using the central rod and are arrayed in a row is used, the spaces between the respective catalyst particle series are used as the exclusive airflow paths, and the catalyst bar that is a collection of the catalyst particle series is reciprocally moved in the catalytic reaction container, it is possible to exhibit an outstanding effect that a solid product accumulated on the catalyst surface in the entire area of the catalyst layer (the entire catalyst bar) is efficiently dropped, and is removed from the catalyst layer (the catalyst bar).

Therefore, the embodiment can be preferably applied for the removal of the solid product generated and accumulated on the catalyst in the fixed-bed catalyst layer. For example, in the reformation reaction of tar-containing gas in which a complex metal oxide catalyst containing nickel, magnesium, cerium, zirconium and aluminum is used, compared with other reactions, a larger amount of solid carbon is accumulated on the catalyst surface, and the need for removing the solid carbon is also stronger. According to the embodiment, even in a case in which a catalyst for the reformation reaction of tar-containing gas in which a larger amount of solid carbon is accumulated on the catalyst surface compared with other reactions as described above is used, it becomes possible to efficiently remove the solid product generated and accumulated on the catalyst.

Unlike a catalyst fixed bed, in a moving bed, it is a principle to continuously move (and stir) the catalyst during the reaction. On the contrary, in the embodiment, since the catalyst layer needs to be moved intermittently for a short period of time in the reaction container, it is not necessary to stir the catalyst during the reaction. Furthermore, in the moving bed, a constant amount of the catalyst is exhausted to the outside of the system during the reaction, and the same amount of the catalyst is supplied from the outside of the system. On the contrary, in the embodiment, the catalyst is not exchanged during the reaction (since the catalyst layer is a fixed bed).

First to Third Embodiments

First to third embodiments of the invention will be described in detail with reference to the accompanying drawings. Meanwhile, in the following description and drawings, components having substantially the same function will be provided with the same reference signs, and the duplicate description thereof will not be made.

First Embodiment

Overall Structure

Figure 1B:
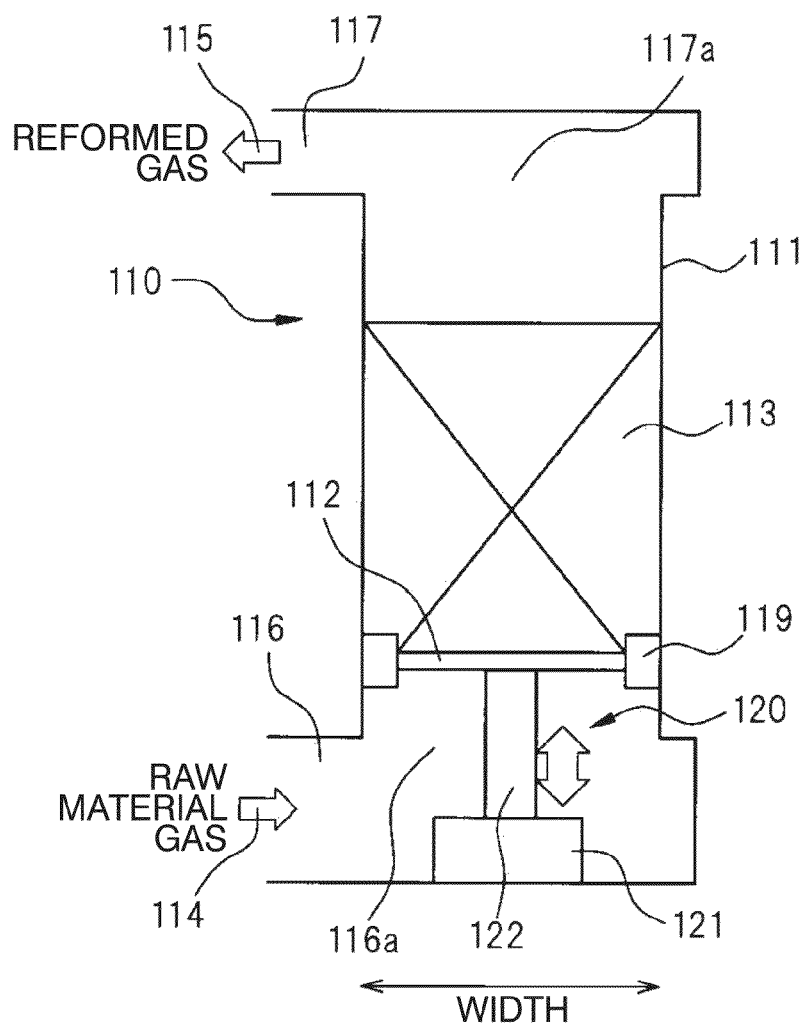
FIG. 1B is a front view of the continuous fixed-bed catalytic reactor according to the first embodiment of the invention.
Figure 1C:
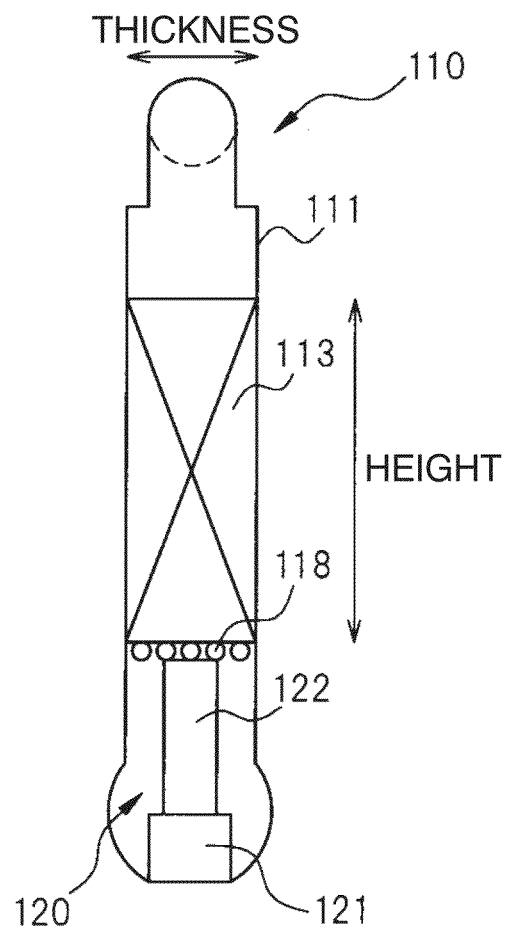
FIG. 1C is a side view of the continuous fixed-bed catalytic reactor according to the first embodiment of the invention.

FIGS. 1A, 1B and 1C illustrate a continuous fixed-bed catalytic reactor 110 according to a first embodiment of the invention. FIG. 1A is a plan view, FIG. 1B is a front view, and FIG. 1C is a side view. The continuous fixed-bed catalytic reactor 110 of the embodiment includes a reaction container 111. The reaction container 111 accommodates a catalyst layer 113 which is a group of clumpy catalyst particles and is supported by a holder 112 having a ventilation property at the bottom section. Among catalyst particles in the catalyst layer 113, catalyst particles adjacent to the inner wall of the reaction container (not illustrated) are in contact with the inner wall of the reaction container. In the embodiment, since the catalyst layer is moved up and down by bringing the catalyst particles into contact with the inner wall of the reaction container, the inner surface of the reaction container 111 is preferably planar so as to prevent the hindrance of the movement of the catalyst during the up-and-down movement. A driving mechanism 120 for moving the catalyst layer 113 up and down by moving the holder up and down is located below the holder 112, and the driving mechanism 120 is configured of an up-and-down movement apparatus 121 and a conduction axis 122 connecting the up-and-down movement apparatus 121 to the holder 112.

In the reaction container 111, raw material gas 114 is supplied from the bottom section and is reacted in the catalyst layer 113, and reformed gas 115 from the catalyst layer 113 is exhausted through the top section of the reaction container 111. Examples of the raw material gas 114 include hydrocarbon-containing gas, tar and hydrocarbon-containing gas, and the like. Examples of the reformed gas 115 include reformed gas obtained by reforming hydrocarbon-containing gas. Examples of the catalyst include a clumpy catalyst for the reformation of hydrocarbon and the like, and a solid substance, for example, solid carbon or the like is accumulated on the surface of the catalyst as a byproduct of the catalytic reaction. In a case in which the catalytic reaction is an endothermic reaction, a temperature and heat necessary for the reaction may be supplied by disposing the catalytic reaction container 111 in, for example, a heating furnace (not illustrated). In a case in which the catalytic reaction is an exothermic reaction, the reaction heat may be removed by making a refrigerant flow through a refrigerant flow path (not illustrated) provided on the outside of the catalytic reaction container. Depending on cases, the raw material gas may be supplied to the reaction container 111 so as to flow from the top side to the bottom side of the catalyst layer 113 which is opposite to the flow in FIGS. 1A, 1B and 1C.

(Shape of the Reaction Container)

The reaction container 111 may have any shape as long as the reaction container has openings 116a and 117a and is capable of storing the catalyst in a space between the openings. The opening 116a is communicated with a supply pipe configuring an inflow path 116 for a catalytic reaction fluid (raw material gas), and is equivalent to an inflow opening of the reaction container 111 for the raw material gas for the catalytic reaction. The opening 117a is communicated with an exhaust pipe configuring an outflow path 117 for the reformed gas from the reaction container 111, and is equivalent to an outflow opening of the reaction container 111 for the reformed gas. The reaction container 111 may have, for example, a cylindrical shape, a rectangular duct shape or the like, and hereinafter, a rectangular duct-shaped reaction container will be described as an example.

In the following description, the "central axis of the container" is defined as an axis connecting the centers of horizontal cross-sectional views of the container in series in the perpendicular direction. The "reaction container thickness" is equivalent to the minimum length of the typical lengths of the reaction container on a horizontal cross-section, and the "reaction container width" is equivalent to the maximum length of the typical lengths of the reaction container on a horizontal plane. In a case in which the container is a cylinder, the "width" and "thickness" of the container may be replaced by the "diameter".

(Material for the Reaction Container)

Any material can be used as a material for the reaction container 111 as long as the material has a strength large enough to hold the catalyst, thermal resistance and corrosion resistance against a fluid participating in the catalytic reaction, and contamination resistance against a reaction product. Examples of the material that can be used include metallic materials such as carbon steel, stainless steel, a nickel alloy, copper, a copper alloy, aluminum, an aluminum alloy, titanium and a titanium alloy; ceramic materials (including ceramic materials processed to bricks) such as silica, alumina, silicon nitride and silicon carbide; and glass materials such as soda glass and fused silica.

(Dimensions of the Reaction Container)

The lower limit of the thickness of the reaction container is required to be equal to or greater than the typical dimension (for example, diameter) of the clumpy catalyst (for example, 10 mm or more). Generally, in the catalytic reaction, heat is generated or absorbed and the heat is communicated with the outside through the surface of the reaction container, and therefore there is an upper limit for the thickness of the catalytic reaction to ensure the conduction of heat to the inside of the catalytic reaction container. The upper limit value may be determined from the engineering viewpoint depending on the reaction heat, the flow rate, the thermal conduction characteristics, and the like (for example, 200 mm).

There is no particular limitation with the width of the reaction container in terms of the function. The width may be determined from the engineering viewpoint based on the volume of the catalyst layer to be held and the thickness of the reaction container in consideration of structural and strength limitations (for example, 5000 mm).

The height of the reaction container is required to be equal to or larger than the height of the catalyst layer. Meanwhile, there is no particular limitation on the upper limit with the height of the reaction container in terms of the function, and may be determined from the engineering viewpoint in consideration of structural and strength limitations (for example, 5000 mm).

(Holder of the Catalyst Layer)

As the holder 112 supporting the catalyst layer 113, it is possible to use a net, punching metal, a holder obtained by arraying a plurality of rods in parallel to each other in a horizontal direction so as to form spaces between the rods, and fixing both ends of the rods, or the like. The holder 112 illustrated in FIGS. 1A, 1B and 1C is an example of a holder produced by fixing both ends of a plurality of rods 118 using fixing tools 119.

When the aperture ratio of the holder 112 is decreased, the ventilation property or the transmission property of solid carbon or the like deteriorates. At a high aperture ratio, since the portion of the holder holding the catalyst is decreased, the strength of the holder becomes insufficient. In any types of the above-described holders, the aperture ratio of the holder 112 is preferably in a range of approximately 30% to 70%.

The material for the holder 112 is preferably a metallic material having thermal resistance, corrosion resistance and strength. Examples of the above-described metallic material include stainless steel, a Ni alloy such as HASTELLOY (registered trademark) or INCONEL (registered trademark), titanium, a titanium alloy, and the like.

(Driving Mechanism of the Catalyst Layer)

In the embodiment, the catalyst layer 113 on the holder is moved up and down in the reaction container 111 by moving the holder 112 up and down. Therefore, the reaction container 111 of the embodiment is equipped with the driving mechanism 120 that moves the catalyst holder 112 up and down. As the driving mechanism 120, it is possible to use an ordinary driving mechanism such as an air cylinder or the up-and-down movement apparatus 121 in which a gear such as a rack and pinion is used. The holder 112 is coupled with the up-and-down movement apparatus 121 using the conduction axis 122. When the up-and-down movement apparatus 121 is operated, the entire holder 112 is moved along the axial line of the reaction container 111, thereby moving the entire catalyst layer 113 up and down along the axial line of the reaction container 111 as well.

At least a part of the conduction axis 122 on the holder 112 side is required to be inside the reaction container 111 or the raw material gas inflow path 116 or the reformed gas outflow path 117 that may be present in the bottom section of the reaction container 111. The up-and-down movement apparatus 121 can be provided on the outside of the reaction container 111. In a case in which the reaction container 111 is disposed in a heating apparatus (not illustrated) such as a heating furnace, it is also possible to provide the up-and-down movement apparatus 121 on the outside of the heating apparatus. In this case, a commercially available up-and-down movement apparatus can be used, and it is preferable to seal a portion at which the conduction axis 122 penetrates the reaction container 111 through packing or the like for high-temperature use.

In a case in which the entire driving mechanism 120 is provided in the reaction container 111 as illustrated in FIGS. 1A, 1B and 1C, the up-and-down movement apparatus 121 preferably has thermal resistance and corrosion resistance to protect the up-and-down movement apparatus from, for example, a high-temperature or corrosive substance in the reaction container 111. What has been described above can be realized by, as an example, producing the entire air cylinder of the driving mechanism 120 using a thermal resistant alloy such as HASTELLOY (registered trademark). In this case, an air supply pipe (not illustrated) to the air cylinder penetrates the reaction container 111; however, since the air supply pipe is an immobile section, the air supply pipe may be sealed by welding the entire circumference of the pipe.

During the elevating of the holder, there is a case in which a part of the holder 112 cuts into the catalyst layer 113 (particularly, in a case in which a pin-type holder is used as in a second embodiment that will be subsequently described), and therefore it is preferable to drive the holder 112 not only during the elevating of the holder but also during the lowering of the holder.

(Up-and-Down Stroke of the Holder)

To make the catalyst particles sufficiently move relative to each other, the up-and-down stroke of the holder 112 is preferably large. For example, while it can be said that, even at an up-and-down stroke of approximately 10% of the typical dimension (for example, diameter) of the external catalyst surface, a vibrating effect can be obtained, and therefore a certain degree of an effect that removes the accumulated substance on the catalyst surface such as solid carbon can be obtained, the up-and-down stroke of the holder 112 is preferably 50% or more and more preferably 100% or more of the typical dimension of the external catalyst surface to obtain a sufficient accumulated substance-removing effect.

Meanwhile, in a case in which the up-and-down stroke is extremely large, an increase in the sizes of the reaction container 111 and the driving mechanism 120 is caused, which is not efficient. In addition, the repetition of the up-and-down movement with a small stroke (100% or more) also produces the same effect of a larger up-and-down stroke. Therefore, the up-and-down stroke is preferably 10% or less of the typical dimension of the external catalyst surface.

(Up-and-Down Movement Speed)

The necessary elevating force required to elevate the catalyst layer 113 together with the holder 112 decreases as the elevating speed decreases. As a result of the investigation of the inventors, it was found that the necessary elevating force required to elevate the catalyst layer together with the holder at 10 mm/s is preferably set to twice or more the necessary elevating force required to elevate the catalyst layer together with the holder at 1 mm/s. In addition, at a large elevating speed, the catalyst is likely to be broken. Therefore, the elevating speed is preferably small. However, since there is only a small difference in the necessary elevating force between the elevating speed of 1 mm/s and the elevating speed of 0.5 mm/s, it is not always necessary to set the elevating speed to less than 1 mm/s. In addition, the elevating speed of 10 mm/s may be applied as long as the catalyst does not break.

The average lowering speed of the holder is preferably larger than the average elevating speed as described above. Particularly, when the holder is lowered at a speed that is greater than the free fall speed of the catalyst particles at the bottom end (for example, 100 mm/s), some of the catalyst particles are separated from the holder so as to decrease the bond between the catalyst particles, and the relative movement between the catalyst particles can be increased, which is preferable. However, even when the holder is lowered at a speed that is extremely greater than the free fall speed of the catalyst particles, the same effect can be obtained.

(Size of the Catalyst Particles)

Generally, the catalyst produced by carrying a substance having a catalytic action in a porous carrier is required to remain in the catalyst layer 113 located on the holder 112. Therefore, the catalyst particles are required to have a size that is incapable of penetrating the openings in the holder 112.

(Shape of the Catalyst Particles)

As described above, there is a lower limit value for the minimum dimension of the typical dimensions of the same external catalyst surface when the catalyst is held in a specific holder. In a case in which the volume of the catalyst layer 113 is constant, it is common for the total surface area of the catalyst to increase as the number of the catalyst particles increases, and it is possible to improve the reaction rate of the reaction container 111. Therefore, spherical or substantially spherical catalyst particles are preferable since it is easy to increase the number of the catalyst particles in a constant volume. It is also preferable for the catalyst particles to have a shape that can produce a greater surface area while producing the same volume surrounded by the outer circumferences of the catalyst particles, such as a cylindrical shape or a ring shape. On the other hand, a rod shape or a disc shape is not preferable since it is difficult to hold the catalyst particles.

During the elevating of the catalyst layer 113, the force acting between the catalyst particles becomes more isotropic in the catalyst layer as the catalyst layer moves upward, forces as strong as the force acting in the vertical direction to press the catalyst layer 113 up are generated in other directions, and a frictional force is generated between the catalyst particles in proportion with the above-described forces. The downward component of the frictional force acts as a resisting force against the catalyst layer being pressed up. When the catalyst layer 113 is pressed up from the bottom end, the reaction force between the catalyst particles and the force acting between the catalyst particle and the inner wall of the reaction container are large in the bottom section of the catalyst layer. Since the force acting in the vertical direction in the elevating catalyst layer is required to be equal to or greater than the total of the vertical direction components of the resisting force above the location of the force, the force necessary to press the catalyst layer up increases abruptly as the location moves downward in the catalyst layer. The pressing force becomes the maximum at the bottom end of the catalyst layer, and when the pressing force is excessive, the breakage of the catalyst or the reaction container is caused.

Figure 5:
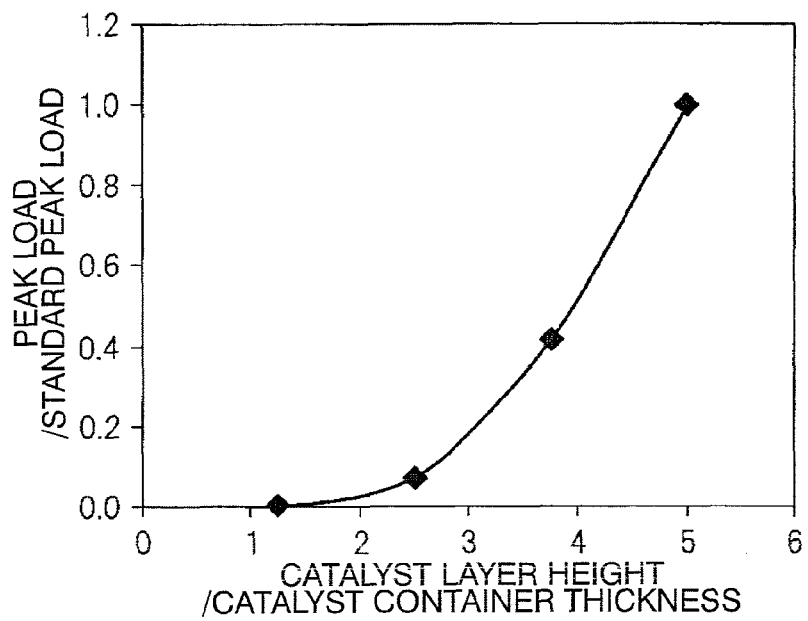
FIG. 5 is a graph illustrating a relationship between an aspect ratio of the catalyst layer and a peak load/standard peak load.
Figure 6:
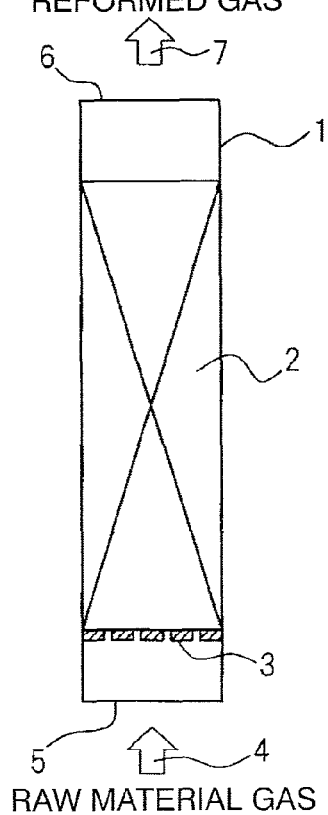
FIG. 6 is a schematic view describing a catalytic reaction container of the related art.

From the viewpoint of what has been described above, the height of the catalyst layer is preferably low. A test was conducted in which an ordinary (cylindrical) catalyst having a crushing strength of 100 N and an angle of repose of 35° was directly held using a pin-type holder of the second embodiment that will be subsequently described, and was moved up and down. The results are illustrated in FIG. 5. The horizontal axis of the drawing indicates the ratio of the height of the catalyst layer to the thickness of the reaction container (the aspect ratio of the catalyst layer), and the vertical axis indicates the peak load for pressing the catalyst layer up that is normalized based on the press-up peak load when the catalyst layer is pressed up under specific conditions. From this drawing, it is found that, when the aspect ratio (the ratio of the height of the catalyst layer to the thickness of the reaction container) of the catalyst layer exceeds two, the press-up load abruptly increases. In addition, it was found that, when the aspect ratio (the ratio of the height of the catalyst layer to the thickness of the reaction container) of the catalyst layer is two or less, the catalyst particles are rarely broken. In addition, as described above, the aspect ratio is preferably two or less to relatively move the catalyst particles in the entire catalyst layer.

On the other hand, in a case in which the height of the catalyst layer is extremely low, the relative movement between the catalyst particles by the relative movement between the inner wall of the reaction container and the catalyst particle occurs only in a limited range near the inner wall surface of the reaction container in the reaction container thickness direction, and the relative movement between the catalyst particles does not occur in the central part in the reaction container thickness direction, which is not preferable. Particularly, in a case in which the height of the catalyst is averagely equal to or less than the height of two layers of the catalyst particles (the maximum height of two catalyst particles overlaid in the vertical direction), since the bond between the catalyst particles in the upper layer is small, the catalyst particles are easily close-packed, and cannot be loosely packed, and therefore the relative movement is further hindered. Therefore, the height of the catalyst layer is preferably the height of three or more layers of the catalyst particles (the maximum height of three catalyst particles overlaid in the vertical direction), that is, three times or more the maximum value of the typical lengths of the external catalyst surface.

(Fluidity of the Catalyst)

In some cases, the catalyst particles moved up together with the holder 112 in the reaction container 111 cause hanging (a phenomenon in which the catalyst particles are not lowered due to the occurrence of self-locking between the catalyst particles even when the holder 112 is lowered after moving the catalyst layer 113 up using the holder 112) in the reaction container. From the viewpoint of the prevention of the hanging of the catalyst particles in the reaction container 111, the fluidity of the catalyst as a granular body group in the catalyst layer 113 is preferably low, and the angle of repose is preferably less than 50°.

Meanwhile, during the elevating of the holder 112, to hold the anisotropy (the upward force component is dominant) of the force supplied to the catalyst layer 113 from the holder in the catalyst layer up to a location higher than the catalyst layer 113, the fluidity of the catalyst is preferably not extremely low, and the angle of repose is preferably 10° or more. This is because, as the region in which the force is highly anisotropy becomes wider in the catalyst layer, the holder 112 can be moved up with a smaller thrust force, and therefore the catalyst particles are not easily broken.

(Material and Action of the Catalyst)

The material or catalytic action of the catalyst to which the continuous fixed-bed catalytic reactor of the embodiment can be applied are not particularly limited as long as the catalyst is a fluid, particularly, a catalyst used in a catalytic reaction in which gas is used as a raw material. The continuous fixed-bed catalytic reactor of the embodiment can be preferably used for a catalyst used in a catalytic reaction in which the fluid is gas and the products of the catalytic reaction are gas and a solid or liquid substance, preferably in a catalytic reaction in which the catalytic reaction fluid is gas containing hydrocarbon and the products of the catalytic reaction are gas and a solid or liquid substance, and particularly in a catalytic reaction in which the catalytic reaction fluid is gas containing tar and the products of the catalytic reaction include solid hydrocarbon or solid carbon.

Generally, the continuous fixed-bed catalytic reactor of the embodiment can be widely used for an oxide catalyst used in the above-described catalytic reaction, and particularly, can be preferably used for an oxide catalyst used in the catalytic reaction in which the catalytic reaction fluid is gas containing tar and the products of the catalytic reaction include solid hydrocarbon or solid carbon.

A specific example of the catalyst that can be preferably used in the continuous fixed-bed catalytic reactor of the embodiment is a catalyst for reforming tar-containing gas which is an oxide containing nickel, magnesium, cerium and aluminum, includes at least one complex oxide, and does not include alumina as a sole compound (WO2010/134326). A preferable example of the complex oxide is a complex oxide made up of crystal phases of NiMgO, $MgAl_2O_4$ and $CeO_2$, in which, furthermore, in the respective crystal phases, the size of the crystallite of the NiMgO crystal phase in a (200) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $CeO_2$ crystal phase in a (111) plane is in a range of 1 nm to 50 nm. The above-described catalyst has a characteristic of a capability of converting even tar-containing gas which includes a large amount of hydrogen sulfide generated during the thermal decomposition of a carbonaceous raw material and mainly includes condensed polycyclic aromatic elements that are likely to cause carbon precipitation into light hydrocarbon mainly including hydrogen, carbon monoxide and methane by highly efficiently reforming the accompanying heavy hydrocarbon such as tar and a characteristic of, when the catalyst performance is deteriorated, removing precipitated carbon or adsorbed sulfur on the catalyst by brining at least any of water vapor and air into contact with the catalyst at a high temperature, thereby recovering the catalyst performance and enabling a stable operation for a long period of time.

In addition, another specific example of the catalyst that can be preferably used in the continuous fixed-bed catalytic reactor of the embodiment is a catalyst for reforming tar-containing gas which is made of a complex oxide containing nickel, magnesium, cerium, zirconium and aluminum (Japanese Unexamined Patent Application, First Publication No. 2011-212574). A preferable example of the complex oxide is a complex oxide including crystal phases of NiMgO, $MgAl_2O_4$ and $Ce_xZr_{1-x}O_2$ ($0<x<1$), in which, furthermore, in the respective crystal phases, the size of the crystallite of the NiMgO crystal phase in a (220) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $Ce_xZr_{1-x}O_2$ crystal phase in a (111) plane is in a range of 1 nm to 50 nm. According to the above-described catalyst, it is possible to stably convert tar-containing gas generated when thermally decomposing coal or biomass into a light chemical substance such as carbon monoxide or hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

Furthermore, another specific example of the catalyst that can be preferably used in the continuous fixed-bed catalytic reactor of the embodiment is a catalyst for reforming tar-containing gas that is a complex oxide represented by aM.b-Ni.cMg.dO in which a, b and c satisfy a+b+c=1, $0.02 \leq a \leq 0.98$, $0.01 \leq b \leq 0.97$ and $0.01 \leq c \leq 0.97$, d represents a value at which oxygen and a positive element becomes electrically neutral, and M represents at least one element selected from Li, Na and K (Japanese Unexamined Patent Application, First Publication No. 2011-212552, and Japanese Unexamined Patent Application, First Publication No. 2011-212598). A preferable example of the complex oxide is a complex oxide formed by adding at least one oxide selected from silica, alumina and zeolite, in which, furthermore, the amount of at least one oxide selected from silica, alumina and zeolite is preferably in a range of 1% by mass to 90% by mass with respect to all the complex oxide. According to the above-described catalyst, it is possible to stably convert tar-containing gas generated when thermally decomposing coal or biomass into a light chemical substance such as carbon monoxide or hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

Other Applicable Examples

The invention can be preferably used in the following continuous fixed-bed catalytic reactor in which coking or the like occurs in addition to the above-exemplified continuous fixed-bed catalytic reactor and catalyst.

1) Methane-reforming catalytic reactor: "Comparative Examples" in Japanese Unexamined Patent Application, First Publication No. 2006-35172 describe that a large amount of coking (carbon precipitation) occurs using methane gas which is hydrocarbon as raw material gas.

2) Commercially available gas-reforming catalytic reactor: Patent Document 2 describes examples of coking.

3) Additionally, the invention can be applied to a catalytic reactor for reforming a variety of petroleum-purified gases such as LPG or natural gas, a catalytic reactor for a fuel battery in which hydrogen-containing gas and a gaseous oxidant are made to act, thereby generating power and water as a byproduct (for example, Japanese Unexamined Patent Application, First Publication No. 2009-48797), and the like.

Second Embodiment

Figure 2A:
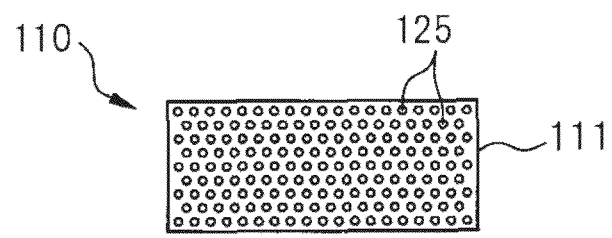
FIG. 2A is a plan view of a continuous fixed-bed catalytic reactor according to a second embodiment of the invention.
Figure 2B:
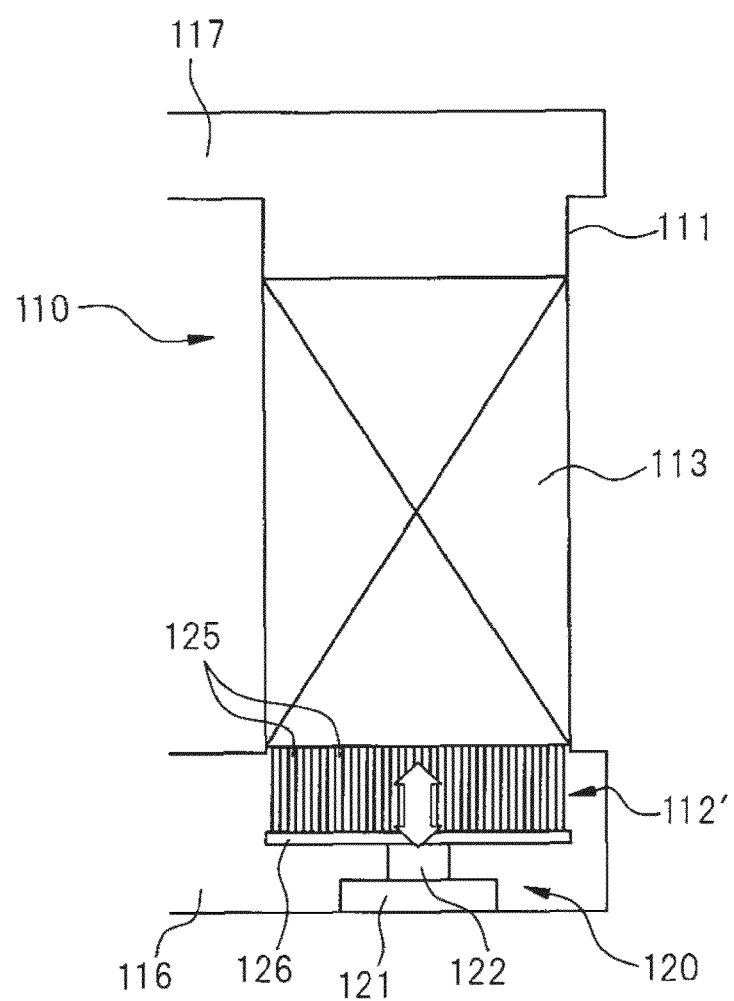
FIG. 2B is a front view of the continuous fixed-bed catalytic reactor according to the second embodiment of the invention.
Figure 2C:
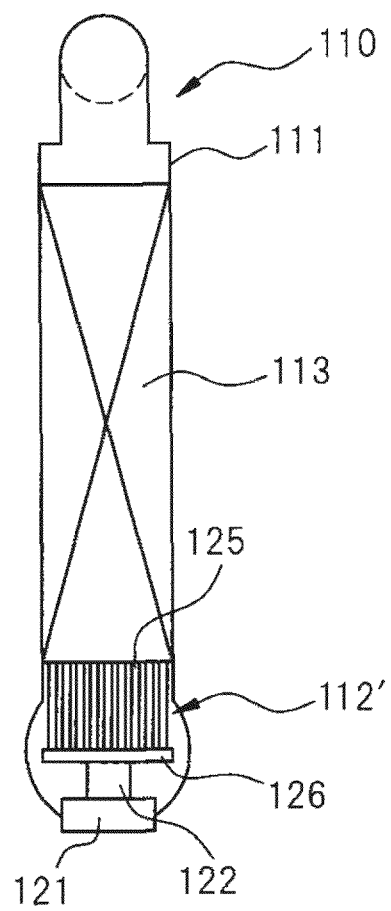
FIG. 2C is a side view of the continuous fixed-bed catalytic reactor according to the second embodiment of the invention.
Figure 7:
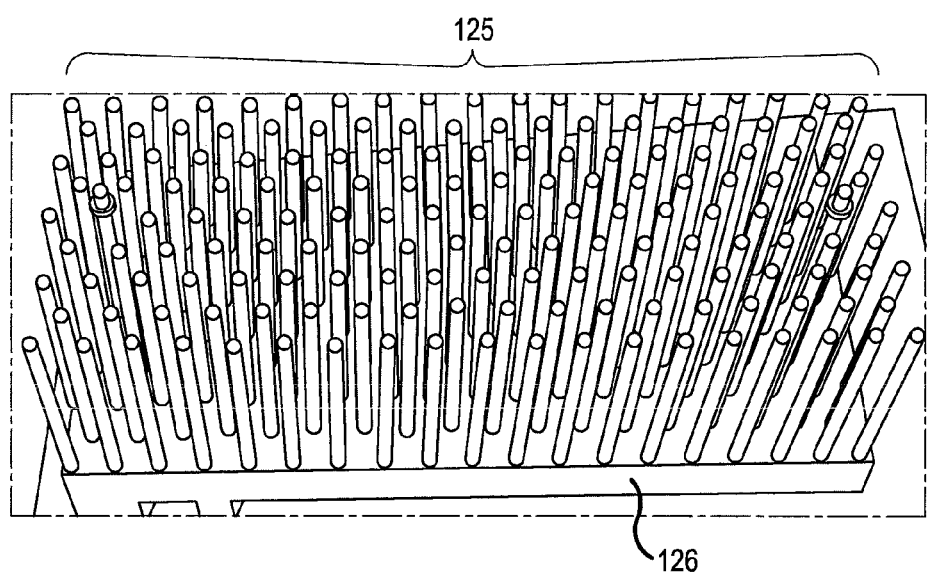
FIG. 7 is a schematic view of a holder used in the continuous fixed-bed catalytic reactor according to the second embodiment of the invention.

Next, a continuous fixed-bed catalytic reactor according to a second embodiment will be described with reference to FIGS. 2A, 2B and 2C. FIG. 2A is a plan view, FIG. 213 is a front view, and FIG. 2C is a side view. A continuous fixed-bed catalytic reactor 110 of FIGS. 2A, 2B and 2C is the same as the continuous fixed-bed catalytic reactor of the first embodiment described with reference to FIGS. 1A, 1B and 1C except for the fact that a number of pins are used in a catalyst holder as illustrated in FIG. 7.

In the present embodiment, the reaction container 111 includes a catalyst holder 112' at a bottom section which is an inflow opening to the reaction container 111. The catalyst holder 112' is a structure having a number of pins 125 held in a bottom plate 126, and is a catalyst-holding unit that directly holds a clumpy catalyst in the catalyst layer 113 at the front end sections of the pins 125. When the pins 125 are provided at intervals that are smaller than the size of the clumpy catalyst, it is possible to hold the clumpy catalyst at the front end sections of the pins 119, and the intervals between the pins function as inflow openings for the catalytic reaction fluid or outflow openings for a generated fluid.

In the illustrated catalyst holder 112', the pins 125 can be produced using, for example, round rods. The pins 125 generally have the same shape, but do not necessarily have the same shape. The pins may have different shapes as long as the clumpy catalyst is directly held at the front end sections of the pins 125, and a fluid can be communicated through the intervals between the pins 125. The pins may have different sizes, lengths and angles, and the shape of the pin is not limited to a linear shape. In the illustrated catalyst holder 112', the front ends of the pins 125 are formed on the same plane, but the front ends of the pins 125 may be formed on a curved surface, and exceptionally, some of the pins may protrude from the surface forming the front ends. According to the above-described catalyst holder 125, a high aperture ratio and the prevention of blockage are realized. Further, in the embodiment, the clumpy catalyst is directly held by the front end sections of the pins 125, but the clumpy catalyst may be substantially directly held by the front end sections of the pins by, for example, holding the catalyst with pins covered with a cover having a pin-like shape.

Regarding the disposition of the pins 125 in the catalyst holder 112', when the center of the pin on a plane perpendicular to the axis of the pin is considered as a tip, all the triangles formed by the centers of adjacent three pins are preferably identical isosceles triangles, and particularly equilateral triangles. Then, it is possible to realize a catalyst-holding structure with a minimum number of pins with respect to the necessary cross-sectional area of the catalyst held by the pins.

All the pins 125 are preferably disposed so that the central axes of the pins are in parallel with each other. This is because the openings at the side surfaces of the pins becomes uniform, and becomes more difficult to block. In a portion in which the pin shafts are extremely close to each other, blockage is likely to occur between the side surfaces of the pins, The lengths of portions in the pins in parallel with each other are determined so that spaces allowing the free communication of a raw material fluid or a reformed fluid without blocking voids between the pins are formed.

In a case in which design convenience or the like is required, the axis lines of the pins 25 may not be parallel to each other by setting the distance between the central axes to gradually increase or decrease toward the catalyst. Similarly, the intervals between the pins may be set to gradually increase or decrease while the central axes of the pins are in parallel with each other. The lengths of portions in the pins in substantially parallel with each other are determined so that spaces allowing the free communication of a reaction fluid without blocking the voids between the pins are formed.

Regarding the intervals between the pins, the distance between the axes excluding the diameter (outer diameter dimension) of all the pins is required to be smaller than the minimum mesh size dimension (sieve opening dimension) allowing the communication of the catalyst particularly in the tip (the front end sections of the pins) of the catalyst holder. Then, the clumpy catalyst can be supported by the pins with no clumpy catalyst being dropped into spaces between the pins. While there might be a case in which the dimensions of some catalyst exceptionally become smaller than the distance between the axes excluding the diameters of the pins such that the catalyst is dropped into the spaces between the pins like small pieces of the catalyst generated due to the breakage of the catalyst, when a sufficient storage space for a dropped substance is provided at the bottom section of the catalyst holder 112' and below the catalyst holder, that is, a space for storing solid or liquid misplaced substances (including a reaction product, dust from the upper stream, and the like) generated in the catalyst layer is provided in the catalyst layer, there is no particular problem at least from the viewpoint of the blockage in the catalytic reaction container. Further, in a case in which the above-described storage space is provided, the misplaced substances can be more easily removed from the apparatus. From the viewpoint of the ventilation property and the blockage resistance of the holder, the aperture ratio (1−[the total cross-sectional area of the pins]/[the apparent cross-sectional area of the flow paths]) on a cross-section perpendicular to the main stream direction of ventilation is preferably 90% or more. The upper limit of the aperture ratio is limited by the cross-sectional area of individual pins determined based on the buckling resistance of the pins or the like.

The lengths of the pins are preferably set to satisfy

[the apparent flow cross-sectional area of a gas inflow opening (outflow opening) for a fluid]≥[the apparent flow cross-sectional area for a fluid in the catalyst layer].

When the thickness and width (diameter) of the catalytic reaction container are given, the apparent flow cross-sectional area of the inflow opening (outflow opening) for a fluid can be adjusted by changing the height of the pins. However, in a case in which the apparent flow cross-sectional area for a fluid is extremely great in the catalyst layer (the reaction container is flat in the main stream direction, or the like), the above-described method is not always true. Here, the "apparent flow cross-sectional area for a fluid" refers to the area of a region surrounded by the side walls of the catalytic reaction container on a plane perpendicular to the main stream of the raw material fluid or the reformed fluid.

The value of the aspect ratio (the ratio of length to diameter) of the pin is preferably 100 or less, and more preferably 20 or less from the viewpoint of the prevention of buckling. However, in a case in which the maximum load applied to the pin is sufficiently small, the aspect ratio may be greater than the above-described values. In addition, to set a sufficiently large apparent flow cross-sectional area for a fluid at the inflow opening (outflow opening), the aspect ratio of the pin is preferably 1 or more, and more preferably 5 or more.

Any material can be used as a material for the pin as long as the material has a strength large enough to hold the catalyst, thermal resistance and corrosion resistance against a fluid with which the material is brought into contact, and contamination resistance against a reaction product. Examples of the material that can be used include metallic materials such as carbon steel, stainless steel, a nickel alloy, copper, a copper alloy, aluminum, an aluminum alloy, titanium and a titanium alloy; ceramic materials such as silica, alumina, silicon nitride and silicon carbide; and glass materials such as soda glass and fused silica. Since the catalytic reaction container for reforming tar is generally operated at a high temperature of 800° C. or higher, stainless steel or a nickel alloy such as HASTELLOY (registered trademark) or INCONEL (registered trademark) is particularly preferable.

The method for fixing the pins to the bottom plate is not particularly limited, and, for example, all the pins can be fixed to the bottom plate through welding.

Since the use of the above-described catalyst holder enables the maintaining of the strength even when a large aperture ratio is set unlike a case in which punching metal or a net is used, it is possible to set the substantial aperture ratio (the ratio of spaces in a plane perpendicular to the pin axes in the contact portions of the pin arrays with the catalyst) to a high value of 90% or more which is a value that could not be realized in the related art. A value of 95% or more is also possible.

In addition, since the respective pins 125 in the catalyst holder 112' are all isolated in the cross-section perpendicular to the central axes of the pins, and spaces extending between the pin arrays are coupled together, even when a solid substance such as carbon is precipitated on the surfaces of the pins, the solid substance is bridged between adjacent pins, thereby preventing the easy occurrence of the blockage in the opening.

The clumpy catalyst in the catalyst layer 113 in the reaction container 110 of the embodiment is required to satisfy the dimensional limitations of the pins. For example, a catalyst of the following example 1 can be used.

Example 1

In a case in which spherical clumpy catalyst particles having a diameter of 10 mm are loaded into a cylindrical catalytic reaction container having an apparent cross-section diameter of 100 mm, the height of the pin simply needs to be 100 mm. Meanwhile, since the diameter of the pin can be set to 5 mm, at this time, the aspect ratio of the pin is approximately 20, which is realizable.

On the other hand, a catalyst of the following example 2 is not preferable since the dimensional limitations of the pins cannot be satisfied.

Example 2

In a case in which spherical clumpy catalyst particles having a diameter of 0.1 mm are loaded into a cylindrical catalytic reaction container having an apparent cross-section of 100 mm, the heights of the pins are required to be at least several tens of millimeters. Meanwhile, the diameter of the pin is required to be smaller than the diameter of the clumpy catalyst particle. Therefore, the aspect ratio of the pin exceeds 100, which is not preferable.

The dimensions of the catalyst are determined depending on the efficiency of the catalytic reaction and are thus not constant. The intervals between the pins in the catalyst holder may be determined in consideration of the dimensions of the catalyst; however, depending on the necessity, it is also possible to determine the dimensions of the catalyst in consideration of the intervals between the pins in the catalyst holder.

As described above, when the catalyst is held in a specific catalyst holder, there is a lower limit value for the minimum dimension of the typical dimensions of the same external catalyst surface. In a case in which the volume of the catalytic reaction container is constant, it is common for the total surface area of the catalyst to increase as the number of the catalyst particles increases, and it is possible to improve the reaction rate of the reaction container. Therefore, spherical or substantially spherical catalyst particles are preferable since it is easy to increase the number of the catalyst particles in a constant volume. In addition, it is also preferable for the catalyst particles to have a shape that can produce a greater surface area while producing the same volume surrounded by the outer circumferences of the catalyst particles, such as a cylindrical shape or a ring shape.

On the other hand, a shape such as a disc shape in which only a typical length in a single direction is extremely small is, generally, not preferable since it is difficult to hold the catalyst particles (comparison: in a net or punching metal of the related art, a disc that was slightly larger than the mesh size dimension was a shape that may most increase the number of catalyst particles). In addition, a rod shape is also not preferable since it is difficult to hold the catalyst particles like the related art.

The external dimensions of the clumpy catalyst is preferably in a range of approximately 5 mm to 50 mm from the viewpoint of the ease of holding the catalyst in the catalyst holder and the ensuring of a high specific surface area for reactivity.

In the embodiment as well, the material or action of the catalyst is the same as in the previously described first embodiment.

The catalyst holder 112' of the embodiment can be moved up and down using the driving mechanism 120 like the holder 112 in the first embodiment previously described with reference to FIGS. 1A, 1B and 1C, and consequently, the catalyst layer 113 in the reaction container 111 can be moved up and down. As the driving mechanism 120, it is possible to use an ordinary driving mechanism such as an air cylinder or the up-and-down movement apparatus 121 in which a gear such as a rack and pinion is used which has been previously described in the first embodiment, and the holder 112' is coupled with the up-and-down movement apparatus 121 using the conduction axis 122.

Third Embodiment

Figure 3A:
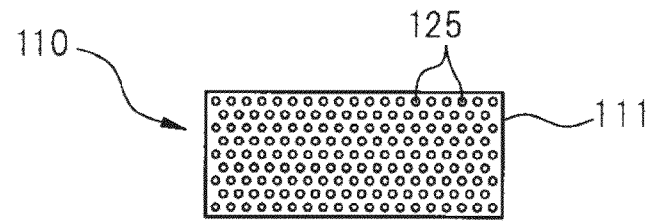
FIG. 3A is a plan view of a continuous fixed-bed catalytic reactor according to a third embodiment of the invention.
Figure 3B:
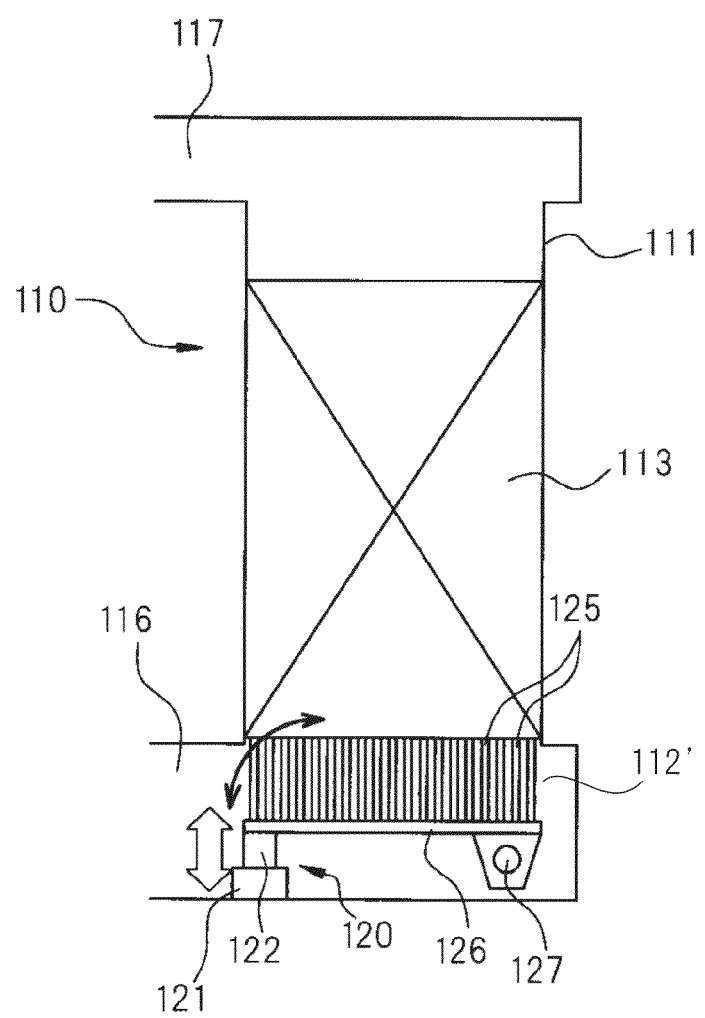
FIG. 3B is a front view of the continuous fixed-bed catalytic reactor according to the third embodiment of the invention.
Figure 3C:
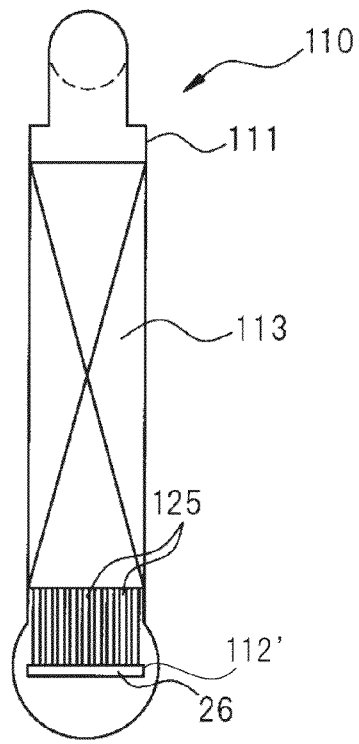
FIG. 3C is a side view of the continuous fixed-bed catalytic reactor according to the third embodiment of the invention.

Next, a continuous fixed-bed catalytic reactor according to a third embodiment will be described with reference to FIGS. 3A, 3B and 3C. FIG. 3A is a plan view, FIG. 3B is a front view, and FIG. 3C is a side view. A continuous fixed-bed catalytic reactor 110 of FIGS. 3A, 3B and 3C is the same as the continuous fixed-bed catalytic reactor of the second embodiment described with reference to FIGS. 2A, 2B and 2C except for the driving mechanism for moving the catalyst holder up and down.

In the second embodiment, while the driving mechanism 120 for moving the catalyst holder 112' up and down moves the entire holder 112' along the axis line of the reaction container 111, in the third embodiment, the holder 112' employs a cantilever configuration in which one end of the bottom plate 126 is connected with a rotation axis 127 and the other end is connected with the conduction axis 122 of the driving mechanism 120. When the catalyst particles are made to move relative to each other by moving a single side (the left side in FIG. 3B) of the holder 112' up and down using the driving mechanism 120, it is possible to efficiently remove a solid product generated and accumulated in the catalyst layer 113. In the embodiment, due to an effect that shear-deforms the entire catalyst layer, it is possible to supply a large relative displacement between the catalyst particles with the same up-and-down stroke compared with the up-and-down movement method of the second embodiment and the like. Further, during the elevating of the holder, all the front end sections of the pins in the holder move toward the rotation axis 127. Therefore, to prevent the dropping of the catalyst particles from the pins caused by the interference between the pins and the adjacent inner wall of the reaction container or an increase in the void using the movement of the front ends of the pins, the pins in the holder can be previously disposed inclined toward the driving mechanism 120.

Fourth to Sixth Embodiments

Hereinafter, fourth to sixth embodiments of the invention will be described in detail with reference to the accompanying drawings. Meanwhile, in the following description and drawings, components having substantially the same function will be provided with the same reference signs, and the duplicate description thereof will not be made.

Fourth Embodiment

Overall Structure

Figure 8A:
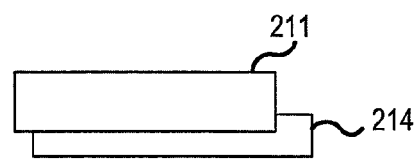
FIG. 8A is a plan view of a continuous fixed-bed catalytic reactor according to a fourth embodiment of the invention.
Figure 8B:
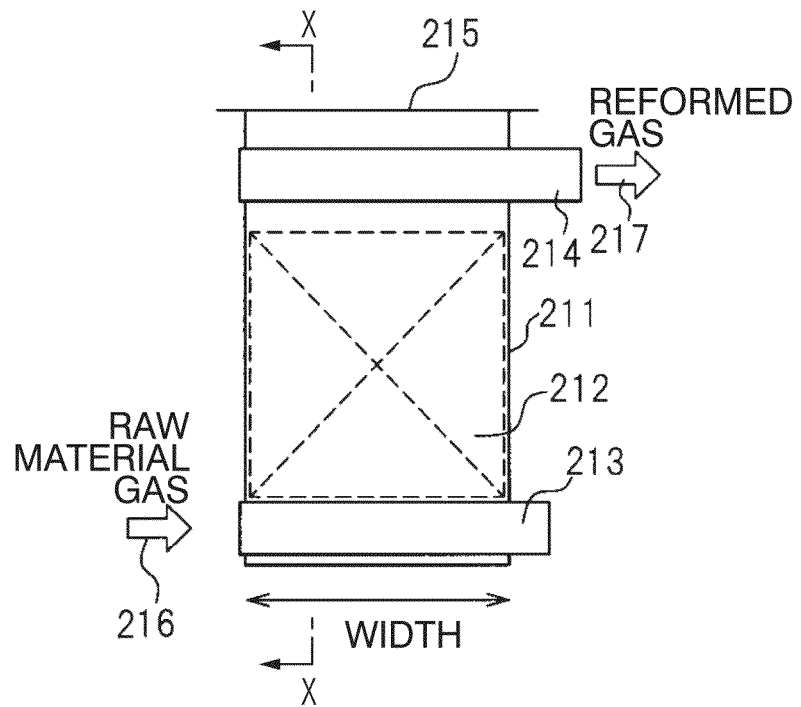
FIG. 8B is a front view of the continuous fixed-bed catalytic reactor according to the fourth embodiment of the invention.
Figure 8C:
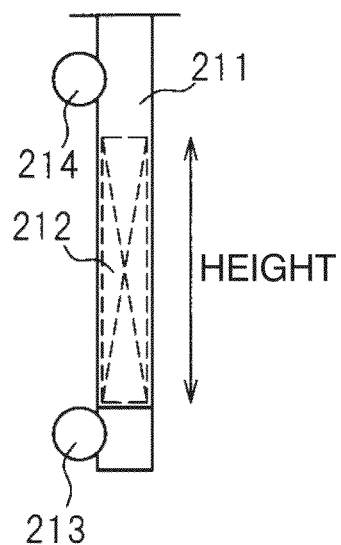
FIG. 8C is a side view of the continuous fixed-bed catalytic reactor according to the fourth embodiment of the invention.
Figure 8D:
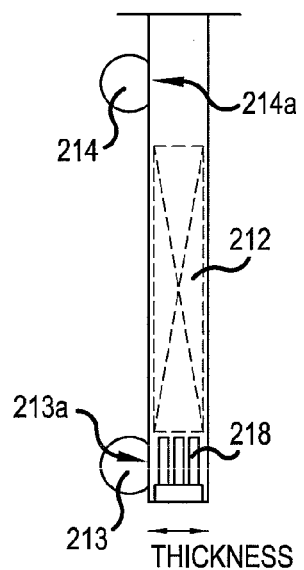
FIG. 8D is an enlarged cross-sectional view obtained along X-X line in FIG. 8B.

As an example of a continuous fixed-bed catalytic reactor, a plan view, a front view, and a side view are illustrated in FIGS. 8A, 8B and 8C, and an enlarged cross-sectional view obtained along X-X line in FIG. 8B is illustrated in FIG. 8D.

The catalytic reaction container 211 has a rectangular cross-section on a horizontal plane, while not limited thereto, accommodates the catalyst layer 212 in which the clumpy catalyst particles are randomly laminated, is connected to an inflow pipe 213 for a reaction fluid 216 through an inflow opening 213a at the bottom section, and is connected to an outflow pipe 214 for a reformed fluid 217 through an outflow opening 214a at the top section. Reference sign 215 represents a lid of the catalyst reaction container for feeding the catalyst into the reaction container and removing the catalyst from the catalyst container offline. The catalytic reaction container 211 has a catalyst holder 218 in the inflow opening 213a portion at the bottom as illustrated in the X-X cross-section. While not illustrated in the drawings, it is also possible to dispose the continuous fixed-bed catalytic reactor in a heating furnace and supply a necessary temperature and necessary heat to the catalytic reaction.

Figure 9:
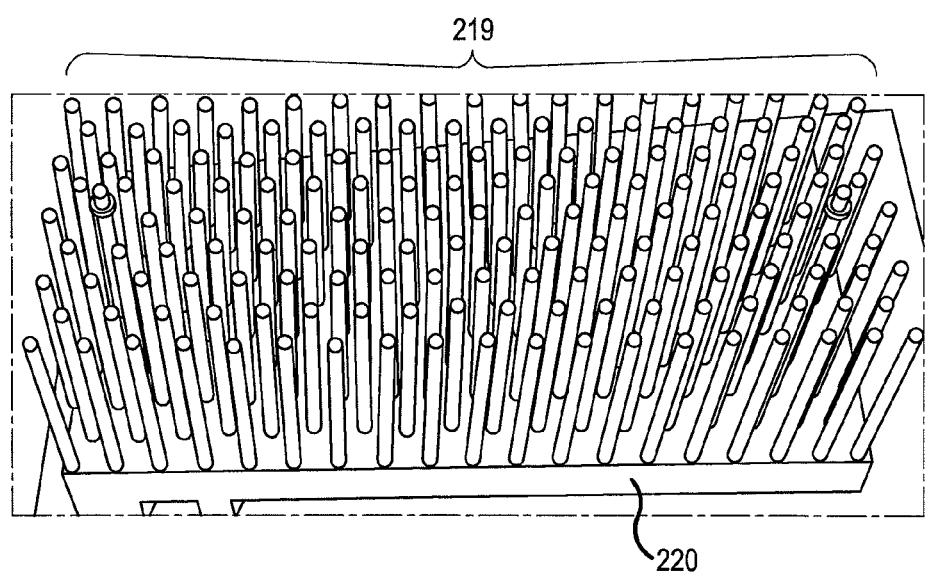
FIG. 9 is a schematic view of a holder used in the continuous fixed-bed catalytic reactor according to the fourth embodiment of the invention.

The catalyst holder 218 is a structure having a number of pins 219 held in a bottom plate 220 in the bottom sections of the pins as illustrated in FIG. 9, and is a catalyst-holding unit that holds a clumpy catalyst 212 at the front end sections of the pins 219. When the pins 219 are provided at intervals that are smaller than the size of the clumpy catalyst 212, it is possible to hold the clumpy catalyst 212 at the front end sections of the pins 219, and the intervals between the pins function as inflow openings for the raw material fluid or outflow openings for a reformed fluid.

In the catalyst holder 218, the pins 219 have the same shape, but do not necessarily have the same shape. As long as the clumpy catalyst can be held at the front end sections of the pins, and a fluid can be communicated through the voids between the pins, the pins may have different sizes, lengths and angles, and the shape of the pin is not limited to a linear shape.

In the catalyst holder 218, the front ends of the pins 219 are formed on the same plane, but the front ends of the pins 219 may be formed on a curved surface, and exceptionally, some of the pins may protrude from the surface forming the front ends.

According to the above-described catalyst holder 218, a high aperture ratio and the prevention of blockage are realized.

(Disposition of the Pins in the Catalyst Holder)

Figure 10:
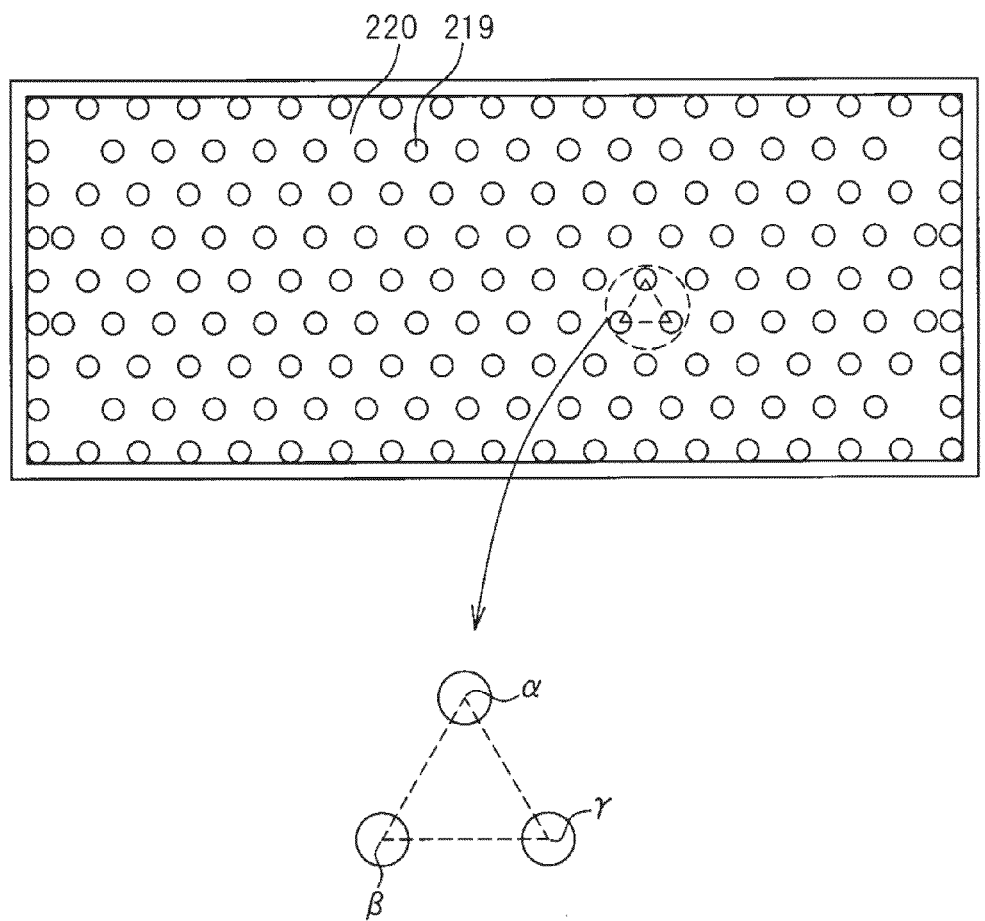
FIG. 10 is a view illustrating a disposition of pins in the holder.

FIG. 10 illustrates a view of the disposition of the pins 219 in the catalyst holder illustrated in FIG. 9 seen from the side of the front ends of the pins (a plane perpendicular to the axis of the pin) and an enlarged view of a part of the disposition. When the center of the pin on a plane perpendicular to the axis of the pin is considered as a tip, the triangles formed by the centers (α, β and γ in FIG. 9) of adjacent three pins are preferably identical isosceles triangles, and particularly equilateral triangles. Then, it is possible to realize a catalyst-holding structure with a minimum number of pins with respect to the necessary cross-sectional area of the catalyst held by the pins.

All the pins are preferably disposed so that the central axes of the pins are in parallel with each other. This is because the openings at the side surfaces of the pins becomes uniform, and becomes more difficult to block. In portions in which the pin axes are extremely close to each other, spaces between the pin side surfaces are highly likely to be blocked. The lengths of portions in the pins in parallel with each other are determined so that spaces allowing the free communication of a raw material fluid or a reformed fluid without blocking voids between the pins are formed.

In a case in which design convenience or the like is required, the axis lines of the pins 25 may not be parallel to each other by setting the distance between the central axes to gradually increase or decrease toward the catalyst. Similarly, the intervals between the pins may be set to gradually increase or decrease while the central axes of the pins are in parallel with each other.

The lengths of portions in the pins in substantially parallel with each other are determined so that spaces allowing the free communication of a reaction fluid without blocking the voids between the pins are formed.

(Intervals Between the Pins)

It is preferable to dispose the pins as illustrated in FIG. 9, and in this case, the intervals between the pins desirably satisfy the following formula:

[the distance between the axes of the pins]−[the outer diameter dimension of the pin]<[the minimum mesh size dimension allowing the communication of the catalyst]

[the outer diameter dimension of the pin]: the outer diameter dimension of the pin refers to the total of radiuses (the distance from the axis of the pin to the outer diameter) between the axes of two pins, and refers to the diameter of the pin in the array of preferable cylindrical pins.

"mesh": an opening in a sieve

"mesh size dimension": while the mesh size dimension is based on an ordinary definition such as JIS having an assumption that "the opening has a square shape", in the embodiment, the mesh size dimension is equivalent to the minimum dimension of the typical dimensions (diameter, height and the like) of the outer shape of a single clumpy catalyst particle.

That is, the distance between the axes excluding the diameter (outer diameter dimension) of all the pins is smaller than the minimum mesh size dimension allowing the communication of the catalyst particularly at the tip (the front end sections of the pins) of the catalyst holder, the clumpy catalyst can be supported by the pins with no clumpy catalyst being dropped into spaces between the pins. While there might be a case in which the dimensions of some catalyst exceptionally become smaller than the distance between the axes excluding the diameters of the pins such that the catalyst is dropped into the spaces between the pins like small pieces of the catalyst generated due to the breakage of the catalyst, when a sufficient storage space for a dropped substance is provided at the bottom section of the catalyst holder 218 and below the catalyst holder, that is, a space for storing solid or liquid misplaced substances (including a reaction product, dust from the upper stream, and the like) is provided in the catalyst layer, there is no particular problem at least from the viewpoint of the blockage in the catalytic reaction container. Further, in a case in which the above-described storage space is provided, the misplaced substances can be more easily removed from the apparatus. From the viewpoint of the ventilation property and the blockage resistance of the holder, the aperture ratio (1−[the total cross-sectional area of the pins]/[the apparatus cross-sectional area of the flow paths]) on a cross-section perpendicular to the main stream direction of ventilation is preferably 90% or more. The upper limit of the aperture ratio is limited by the cross-sectional area of individual pins determined based on the buckling resistance of the pins.

Since the use of the above-described catalyst holder enables the maintaining of the strength even when a large aperture ratio is set unlike a case in which punching metal or a net is used, it is possible to set the substantial aperture ratio (the ratio of spaces in a plane perpendicular to the pin axes in the contact portions of the pin arrays with the catalyst) to a high value of 90% or more which is a value that could not be realized in the related art. A value of 95% or more is also possible.

In addition, since the respective pins 219 in the catalyst holder 218 are all isolated in the cross-section perpendicular to the central axes of the pins, and spaces extending between the pin arrays are coupled together, even when a solid substance such as carbon is precipitated on the surfaces of the pins, the solid substance is bridged between adjacent pins, thereby preventing the easy occurrence of the blockage in the opening.

(Shape of the Pin)

The pin preferably has a round rod shape (a column shape) since the round rod shape has a smooth surface and does not easily damage the catalyst. The shape of the pin may be a square column shape or other shapes for the reason of manufacturing convenience. From the viewpoint of the prevention of buckling, the central axis is preferably linear. The pin may have a curved bar shape for the reason of manufacturing convenience or design convenience.

(Shape of the Pin at the Contact Portion of the Pin with the Catalyst)

The shape of the pin at the contact portion of the pin with the catalyst, that is, substantially, the shape of the front end of the pin is desirably a shape that suppresses the breakage of the catalyst during the contact with the catalyst.

The front end of the pin may be planar. In a case in which the clumpy catalyst particles have a spherical shape, the contact area becomes largest (that is, the surface pressure becomes smallest) when the holding surface in a catalyst holding mechanism is a flat plate, and the catalyst particles are least likely to be broken (in actual cases, the contact area becomes larger when the clumpy catalyst particles come into contact with a concave surface; however, when a number of clumpy catalyst particles come into contact with the holding surface at the same time, it is not possible to realize a shape providing a concave surface at all places). In a case in which the planar section of the front end of the pin which is the holding surface comes into contact with the clumpy catalyst particle, when the width of the planar section is sufficiently wide (for example, 0.1 mm$^2$ or more), the contact surface pressure at this time is equal to the contact surface pressure in a case in which the catalyst particles come into contact with a flat plate, and it is possible to make the catalyst particles least likely to break. In a case in which the front end of the pin is made to be planar, when connection sections of the planar section of the pin and the side surface of the pin are faced, it is possible to reduce the surface pressure in a case in which the catalyst particles come into contact with the connection sections.

In addition, it is possible to provide the front end of the pin with a semispherical shape having the same diameter as the pin. In the case of columnar clumpy catalyst particles, since there is an extremely large curvature (angle (corner)) at the connection section between the bottom surface and the side surface of the column, in the catalyst particles having the above-described shape, there is a concern that a defect at a corner section may act as the largest cause for catalyst damage, and therefore it is possible to prevent catalyst damage by providing the catalyst particles with a semispherical shape. Furthermore, when

[the maximum curvature of the clumpy catalyst]>[the curvature of the front end of the pin]

is satisfied, more specifically, when the curvature of the contact portion of the pin with the clumpy catalyst particle is smaller than the maximum curvature of the outermost surface of the clumpy catalyst particle, the contact surface pressure of the catalyst becomes not significantly different from the contact surface pressure when the catalyst particles come into contact with a plane, and it is possible to make the catalyst particles least likely to break.

(Dimensions of the Pin)

The size of the pin is preferably less than [the minimum mesh size dimension allowing the communication of the catalyst], and more preferably ⅓ or less of [the minimum mesh size dimension allowing the communication of the catalyst] from the viewpoint of ensuring the aperture ratio. In a case in which the catalyst particles have a shape including a hole such as a ring shape or a cylindrical shape, the size of the pin is set to be larger than the diameter of the catalyst hole.

The length of the pin is preferably set to satisfy

[the apparent flow cross-sectional area of a gas inflow opening (outflow opening) for a fluid]≥[the apparent flow cross-sectional area for a fluid in the catalyst layer].

When the thickness and width (diameter) of the catalytic reaction container are given, the apparent flow cross-sectional area of the inflow opening (outflow opening) for a fluid can be adjusted by changing the height of the pins. However, in a case in which the apparent flow cross-sectional area for a fluid is extremely great in the catalyst layer (the reaction container is flat in the main stream direction, or the like), the above-described method is not always true. Here, the "apparent flow cross-sectional area for a fluid" refers to the area of a region surrounded by the side walls of the catalytic reaction container on a plane perpendicular to the main stream of the raw material fluid or the reformed fluid.

The value of the aspect ratio (the ratio of length to diameter) of the pin is preferably 100 or less, and more preferably 20 or less from the viewpoint of the prevention of buckling. However, in a case in which the maximum load applied to the pin is sufficiently small, the value of the aspect ratio may be greater than the above-described values. In addition, to set a sufficiently large apparent flow cross-sectional area for a fluid at the inflow opening (outflow opening), the aspect ratio of the pin is preferably 1 or more, and more preferably 5 or more.

(Material for the Pin)

Any material can be used as a material for the pin as long as the material has a strength large enough to hold the catalyst, thermal resistance and corrosion resistance against a fluid with which the material is brought into contact, and contamination resistance against a reaction product. Examples of the material that can be used include metallic materials such as carbon steel, stainless steel, a nickel alloy, copper, a copper alloy, aluminum, an aluminum alloy, titanium and a titanium alloy; ceramic materials such as silica, alumina, silicon nitride and silicon carbide; and glass materials such as soda glass and fused silica. Since the catalytic reaction container for reforming tar is generally operated at a high temperature of 800° C. or higher, stainless steel or a nickel alloy such as HASTELLOY (registered trademark) or INCONEL (registered trademark) is particularly preferable.

(Method for Fixing the Pins)

The method for fixing the pins to the bottom plate is not particularly limited, and, for example, a substrate of the catalyst holder, to which all the pins may be fixed through welding, is provided.

(Disposition of the Pins)

In the catalyst holder of the embodiment, the pins are preferably disposed in parallel with each other as illustrated in FIG. 9, but are not necessarily parallel to each other, and even when the intervals between the pins are different, a desired effect can be obtained. For example, as described above, the pins may be uniformly or separately curved (in the latter case, the pins are not in parallel with each other) instead of being linear. Additionally, the pins may stand from the bottom plate at different inclination angles or in different inclination directions, and even in this case, a desired effect can be obtained.

Figure 11:
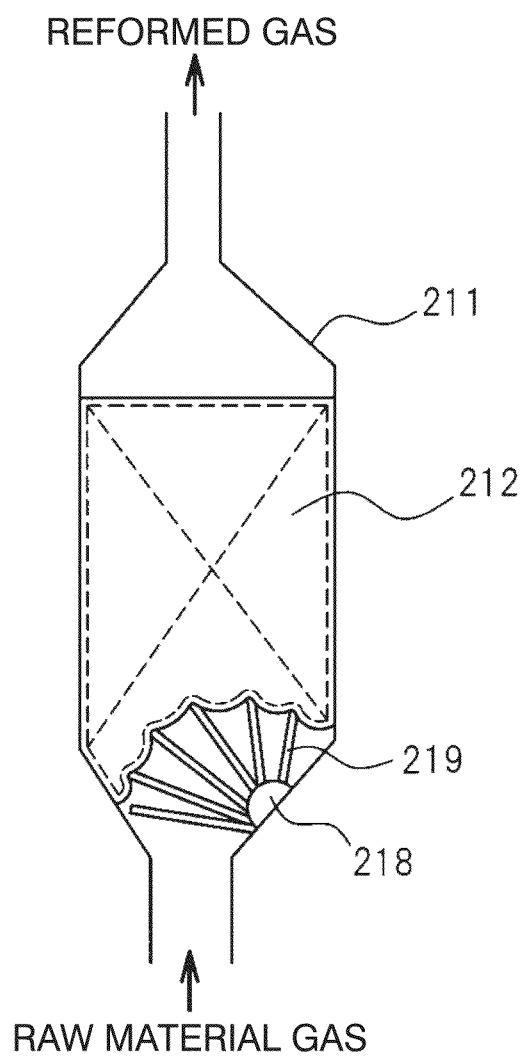
FIG. 11 is a schematic view illustrating a modification example of the catalyst holder.

For example, as in a modification example illustrated in FIG. 11, the pins 219 may stand radially in the catalyst holder 218. Meanwhile, in FIG. 11, reference sign 211 represents the continuous fixed-bed catalytic reactor, reference sign 212 represents the catalyst layer, and the holding member of the pins does not have a plate shape, and is installed at a different location from that in FIGS. 8A, 8B, 8C and 8D.

(Shape of the Catalytic Reaction Container)

Any shape can be applied as long as the catalytic reaction container has openings at both ends and is capable of storing the catalyst (that is, a tubular shape) between the openings. For example, the catalytic reaction container may have a cylindrical shape, a rectangular duct shape or the like. Hereinafter, description will be conducted with an assumption that the container has a rectangular duct shape.

The central axis of the container is defined as an axis connecting the centers of horizontal cross-sectional views of the container in series in the perpendicular direction. In a case in which the container is a cylinder, in the following description, the "width" and "thickness" of the container may be replaced by the "diameter".

(Material for the Catalytic Reaction Container)

Any material can be used as long as the material has a strength large enough to hold the catalyst, thermal resistance and corrosion resistance against a fluid participating in the catalytic reaction, and contamination resistance against a reaction product. Examples of the material that can be used include metallic materials such as carbon steel, stainless steel, a nickel alloy, copper, a copper alloy, aluminum, an aluminum alloy, titanium and a titanium alloy; ceramic materials (including ceramic materials processed to bricks) such as silica, alumina, silicon nitride and silicon carbide; and glass materials such as soda glass and fused silica.

(Dimensions of the Catalytic Reaction Container)

In a case in which no heat is generated or absorbed due to the catalytic reaction, or in a case in which a heat source, a cooler and a heat exchanger are separately provided in the catalytic reaction container, there are no particular upper limits for the dimensions in the direction perpendicular to the main stream of a fluid.

In a case in which heat is generated or absorbed due to the catalytic reaction, and there is no heat exchanger in the catalytic reaction container, it is necessary to communicate heat on the surface of the catalytic reaction container and to transfer heat up to the inside of the catalytic reaction container. Therefore, there are upper limits for the dimensions in the direction perpendicular to the main stream of a fluid. The upper limit value may be determined from the engineering viewpoint depending on the reaction heat, the flow rate, the thermal conduction characteristics, and the like.

Needless to say, the dimensions of the catalytic reaction container in the direction perpendicular to the main stream of a fluid are required to be greater than the diameter of the clumpy catalyst particles. There is no particular limitation with the dimensions in the main stream direction of the catalytic reaction container as long as the dimensions are equal to or greater than the necessary length of the catalyst layer in the main stream direction.

(Dimensions of the Clumpy Catalyst)

The clumpy catalyst used in the embodiment is required to satisfy the dimensional limitations of the pins. For example, a catalyst of the following example 1 can be used.

Example 1

In a case in which spherical clumpy catalyst particles having a diameter of 10 mm are loaded into a cylindrical catalytic reaction container having an apparent cross-section of 100 mm, the height of the pin simply needs to be 100 mm. Meanwhile, since the diameter of the pin can be set to 5 mm, at this time, the aspect ratio of the pin is approximately 20, which is realizable.

On the other hand, a catalyst of the following example 2 is not preferable since the dimensional limitations of the pins cannot be satisfied.

Example 2

In a case in which spherical clumpy catalyst particles having a diameter of 0.1 mm are loaded into a cylindrical catalytic reaction container having a diameter of 100 mm, the heights of the pins are required to be at least several tens of millimeters. Meanwhile, the diameter of the pin is required to be smaller than the diameter of the clumpy catalyst particle. Therefore, the aspect ratio of the pin exceeds 100, which is not preferable.

The dimensions of the catalyst are determined depending on the efficiency of the catalytic reaction and are thus not constant. The intervals between the pins in the catalyst holder may be determined in consideration of the dimensions of the catalyst; however, depending on the necessity, it is also possible to determine the dimensions of the catalyst in consideration of the intervals between the pins in the catalyst holder.

(Shape of the Clumpy Catalyst Particles)

As described above, when the catalyst is held in a specific catalyst holder, there is a lower limit value for the minimum dimension of the typical dimensions of the same external catalyst surface. In a case in which the volume of the catalytic reaction container is constant, it is common for the total surface area of the catalyst to increase as the number of the catalyst particles increases, and it is possible to improve the reaction rate of the reaction container. Therefore, spherical or substantially spherical catalyst particles are preferable since it is easy to increase the number of the catalyst particles in a constant volume. In addition, it is also preferable for the clumpy catalyst particles to have a shape that can produce a greater surface area while producing the same volume surrounded by the outer circumferences of the catalyst particles, such as a cylindrical shape or a ring shape.

On the other hand, a shape such as a disc shape in which only a typical length in a single direction is extremely small is not preferable since it is difficult to hold the catalyst particles (comparison: in a net or punching metal of the related art, a disc that was slightly larger than the mesh size dimension was a shape that may most increase the number of catalyst particles). In addition, a rod shape is also not preferable since it is difficult to hold the catalyst particles like the related art.

The external dimensions of the clumpy catalyst is preferably in a range of approximately 5 mm to 50 mm from the viewpoint of the ease of holding the catalyst in the catalyst holder and the ensuring of a high specific surface area for reactivity.

(Material and Action of the Catalyst)

The material or catalytic action of the catalyst to which the continuous fixed-bed catalytic reactor of the embodiment can be applied are not particularly limited as long as the catalyst is a fluid, particularly, a catalyst used in a catalytic reaction in which gas is used as a raw material. The continuous fixed-bed catalytic reactor of the embodiment can be preferably used for a catalyst used in a catalytic reaction in which the fluid is gas and the products of the catalytic reaction are gas and a solid or liquid substance, preferably in a catalytic reaction in which the catalytic reaction fluid is gas containing hydrocarbon and the products of the catalytic reaction are gas (and a solid or liquid substance), and particularly in a catalytic reaction in which the catalytic reaction fluid is gas containing tar and the products of the catalytic reaction include solid hydrocarbon or solid carbon.

Generally, the continuous fixed-bed catalytic reactor of the embodiment can be widely used for an oxide catalyst used in the above-described catalytic reaction, and particularly, can be preferably used for an oxide catalyst used in the catalytic reaction in which the catalytic reaction fluid is gas containing tar and the products of the catalytic reaction include solid hydrocarbon or solid carbon.

A specific example of the catalyst that can be preferably used in the continuous fixed-bed catalytic reactor of the embodiment is a catalyst for reforming tar-containing gas which is an oxide containing nickel, magnesium, cerium and aluminum, includes at least one complex oxide, and does not include alumina as a sole compound (WO2010/134326). A preferable example of the complex oxide is a complex oxide made up of crystal phases of NiMgO, $MgAl_2O_4$ and $CeO_2$, in which, furthermore, in the respective crystal phases, the size of the crystallite of the NiMgO crystal phase in a (200) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $CeO_2$ crystal phase in a (111) plane is in a range of 1 nm to 50 nm. The above-described catalyst has a characteristic of a capability of converting even tar-containing gas which includes a large amount of hydrogen sulfide generated during the thermal decomposition of a carbonaceous raw material and mainly includes condensed polycyclic aromatic elements that are likely to cause carbon precipitation into light hydrocarbon mainly including hydrogen, carbon monoxide and methane by highly efficiently reforming the accompanying heavy hydrocarbon such as tar and a characteristic of, when the catalyst performance is deteriorated, removing precipitated carbon or adsorbed sulfur on the catalyst by brining at least any of water vapor and air into contact with the catalyst at a high temperature, thereby recovering the catalyst performance and enabling a stable operation for a long period of time.

In addition, another specific example of the catalyst that can be preferably used in the continuous fixed-bed catalytic reactor of the embodiment is a catalyst for reforming tar-containing gas which is made of a complex oxide containing nickel, magnesium, cerium, zirconium and aluminum (Japanese Unexamined Patent Application, First Publication No. 2011-212574). A preferable example of the complex oxide is a complex oxide including crystal phases of NiMgO, $MgAl_2O_4$ and $Ce_xZr_{1-x}O_2$ (0<x<1), in which, furthermore, in the respective crystal phases, the size of the crystallite of the NiMgO crystal phase in a (220) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $Ce_xZr_{1-x}O_2$ crystal phase in a (111) plane is in a range of 1 nm to 50 nm. According to the above-described catalyst, it is possible to stably convert tar-containing gas generated when thermally decomposing coal or biomass into a light chemical substance such as carbon monoxide or hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

Furthermore, another specific example of the catalyst that can be preferably used in the continuous fixed-bed catalytic reactor of the embodiment is a catalyst for reforming tar-containing gas that is a complex oxide represented by aM.b-Ni.cMg.dO in which a, b and c satisfy a+b+c=1, 0.02≤a≤0.98, 0.01≤b≤0.97 and 0.01≤c≤0.97, d represents a value at which oxygen and a positive element becomes electrically neutral, and M represents at least one element selected from Li, Na and K (Japanese Unexamined Patent Application, First Publication No. 2011-212552, and Japanese Unexamined Patent Application, First Publication No. 2011-212598). A preferable example of the complex oxide is a complex oxide formed by adding at least one oxide selected from silica, alumina and zeolite, in which, furthermore, the amount of at least one oxide selected from silica, alumina and zeolite is preferably in a range of 1% by mass to 90% by mass with respect to all the complex oxide. According to the above-described catalyst, it is possible to stably convert tar-containing gas generated when thermally decomposing coal or biomass into a light chemical substance such as carbon monoxide or hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

(Effect of Limiting the Type of the Catalyst to the Tar-Reforming Catalyst)

In the past, the reason for the blockage in the catalyst holder was not clear. Generally, there were many cases in which the catalyst holder was provided at the uppermost section of the catalyst layer (the bottom section of the catalyst layer was supported by the catalyst holder, and raw material gas was supplied from below. Then, the inflow of coarse dust in the raw material gas into the catalyst layer could be avoided, which made this layout preferable), and when the catalyst holder was blocked, it was considered that the blockage in the catalyst holder resulted from dust flown from the upper stream such as coal dust or from the fact that mist-shaped tar generated at the upper stream was attached to the catalyst holder, and the tar was transformed into high-melting-point hydrocarbon, thereby causing the blockage. That is, it was considered that the blockage in the catalyst holder resulted not from the catalyst but from the raw material gas.

However, as a result of intensive investigation by the inventors, it was clarified that the product of a tar-reforming reaction using a catalyst layer that was the above-described series of catalyst types was a mixture of approximately 70% or more of amorphous carbon (solid carbon) and solid hydrocarbon such as coke. Generally, dust in the raw material gas rarely contains amorphous-form carbon, and under the temperature condition of lower than 900° C. as in the above-described reforming reaction test, there is little chance of the mist-shaped tar transforming into amorphous-form carbon without coming into contact with the catalyst. Therefore, it was clarified that the old description was not true, and the blockage in the catalyst holder resulted from the catalytic reaction. As a result of additional investigation of the physical properties of the solid mixture, it was found that a catalyst made of the above-described material has a relatively small attaching property to the catalyst surface. In addition, since the tar-reforming performance is extremely favorable in the tar-reforming reaction in which the above-described catalyst is used, the amount of coke generated in accordance with the reforming reaction is also extremely great compared with reforming reactions for which other methods are used. Therefore, in the tar-reforming reaction in which the above-described catalyst is used, since at least a part of the solid mixture is separated from the catalyst surface and is compensated into the catalyst holder and the like due to the force of gravity or the action of air stream, it was found that, when the catalyst holder of the related art is used in the tar-reforming reaction in which the above-described catalyst is used, the catalyst holder is easily blocked.

According to the embodiment, a high aperture ratio and a mutually-coupled opening shape are realized, and when applied to this type of catalytic reaction, there is an outstanding effect that it is possible to reduce the adverse influence on ventilation of the solid product that can be separated from the catalyst surface and be compensated into the catalyst holder during the reaction.

Other Applicable Examples

The embodiment can be preferably used in the following catalytic reactor in which coking or the like occurs in addition to the above-exemplified continuous fixed-bed catalytic reactor and catalyst.

1) Methane-reforming catalytic reactor: "Comparative Examples" in Japanese Unexamined Patent Application, First Publication No. 2006-35172 describe that a large amount of coking (carbon precipitation) occurs using methane gas which is hydrocarbon as raw material gas.

2) Commercially available gas-reforming catalytic reactor: Patent Document 2 describes examples of coking.

3) Additionally, the invention can be applied to a catalytic reactor for reforming a variety of petroleum-purified gases such as LPG or natural gas, a catalytic reactor for a fuel battery in which hydrogen-containing gas and a gaseous oxidant are made to act, thereby generating power and water as a byproduct (for example, Japanese Unexamined Patent Application, First Publication No. 2009-48797), and the like.

Fifth Embodiment

Figure 12:
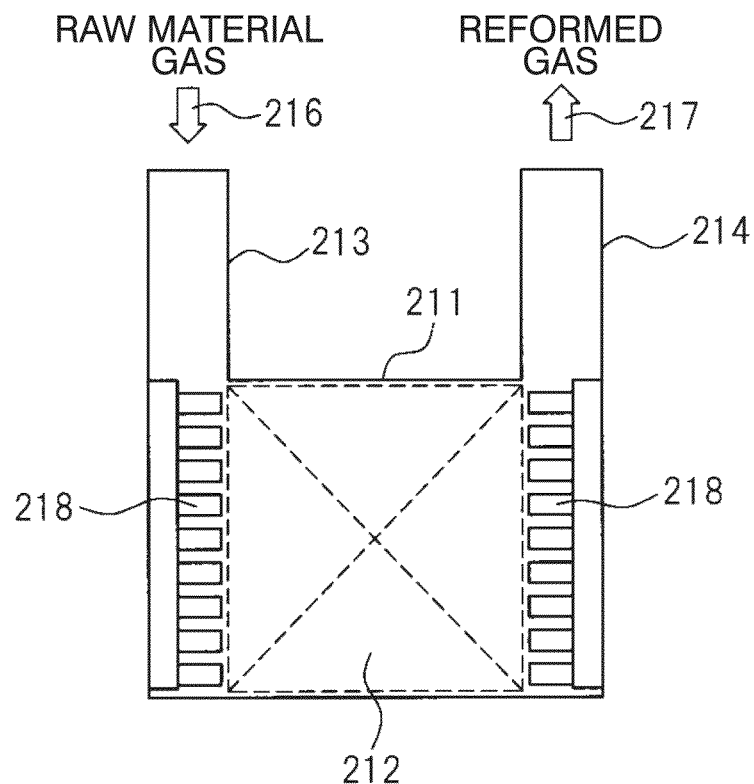
FIG. 12 is a schematic view of a continuous fixed-bed catalytic reactor according to a fifth embodiment of the invention.

The continuous fixed-bed catalytic reactor of the invention is not limited to the example illustrated in FIGS. 8A, 8B, 8C and 8D, and may have a catalytic holder and the disposition of the catalyst layer as illustrated in FIG. 12.

In the present example, while reference signs represent the same members as in FIGS. 8A, 8B, 8C and 8D, the catalytic reaction container 211 has the inflow pipe 213 for raw material gas 216 and the outflow pipe 214 for reformed gas 217 on both side surfaces on the top section of the catalytic reaction container 211, and the catalyst holders 218 are disposed on both side surfaces of the catalytic reaction container 211 so as to hold the catalyst from the side surfaces. The catalyst holder 218 may have the same structure as illustrated in FIG. 9. The raw material gas 216 flows into the catalyst 212 held by the catalyst holders 218 through spaces between the pins in the (left) catalyst holder 218 as flow paths from the inflow pipe 213. Reformed gas reacted and generated using the catalyst 212 in the catalytic reaction container 211 flows into the outflow pipe 214 through spaces between the pins 218 in the (right) catalyst holder 218 holding the catalyst 212 as flow paths, and is exhausted outside.

Sixth Embodiment

There are cases in which a part of a solid or liquid product generated from the catalyst reaction is separated from the catalyst surface, is dropped or transported to the downstream side of the main stream, and is accumulated on spaces between the pins in the catalyst holder provided on the downstream side of the main stream, thereby hindering ventilation between the pins. Therefore, a storage space can be provided at the bottom section of the catalytic reaction container or at the downstream section of the main stream to compensate the solid or liquid product separated from the catalyst surface.

Figure 13A:
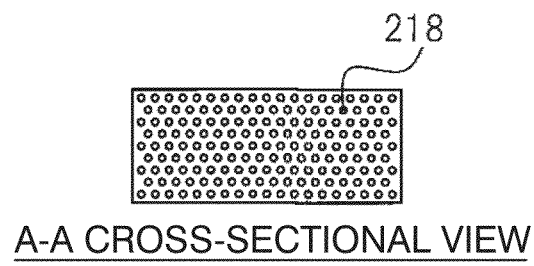
FIG. 13A is an A-A cross-sectional view of a continuous fixed-bed catalytic reactor according to a sixth embodiment of the invention.
Figure 13B:
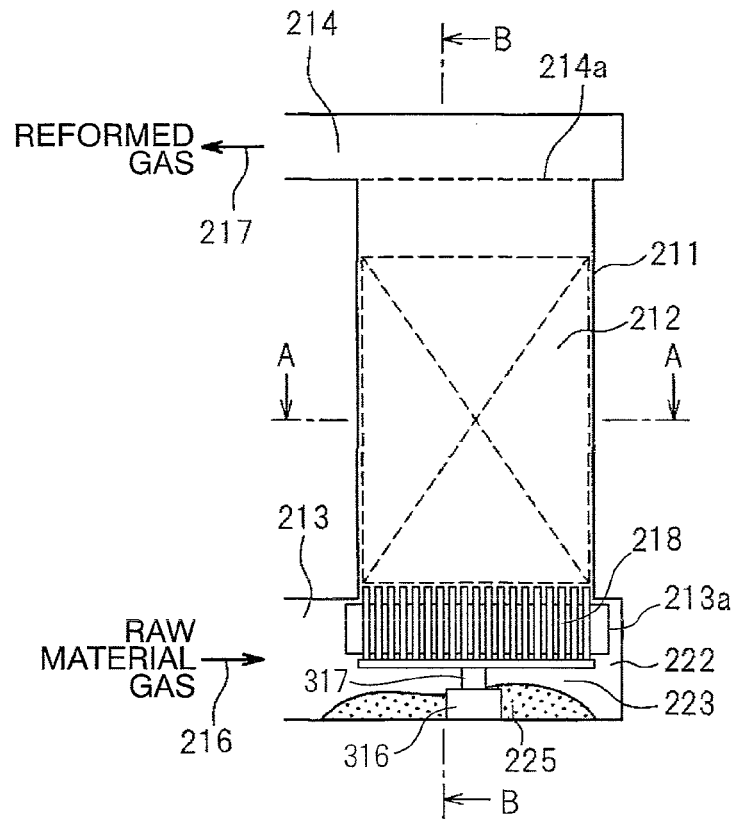
FIG. 13B is a cross-sectional view of a front surface of the continuous fixed-bed catalytic reactor according to the sixth embodiment of the invention.
Figure 13C:
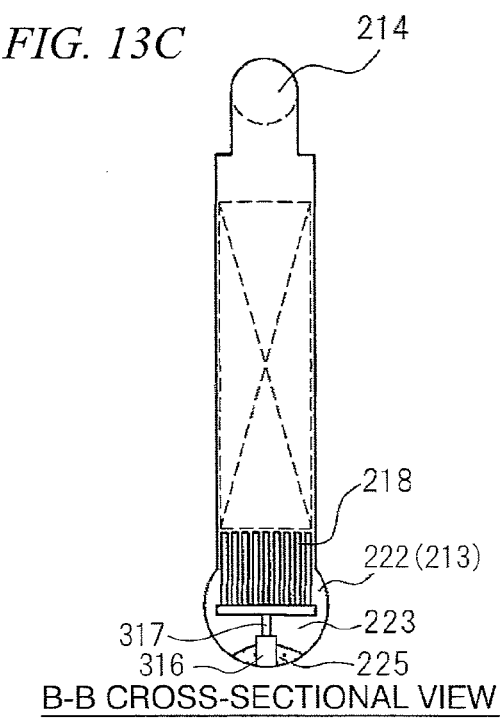
FIG. 13C is a B-B cross-sectional view of the continuous fixed-bed catalytic reactor according to the sixth embodiment of the invention.

FIGS. 13A, 13B and 13C illustrate an example of the storage space. FIG. 13B is a cross-sectional view of a front surface of the continuous fixed-bed catalytic reactor, FIG. 13A is an A-A cross-sectional view of FIG. 13B, and FIG. 13C is a B-B cross-sectional view of FIG. 13B. While the basic configuration of the continuous fixed-bed catalytic reactor is the same as that of the continuous fixed-bed catalytic reactor illustrated in FIGS. 8A, 8B, 8C and 8D, in this example, the inflow pipe and the outflow pipe are installed at the top and bottom sections (the top surface and the bottom surface) of the catalytic reaction container 211. In the bottom side (the bottom surface) of the catalytic reaction container 211, for example, the catalyst holder 218 is installed in a round pipe 222 larger than the catalyst holder 218 so as to allow a reaction byproduct dropped into the catalyst holder 218 to additionally drop into a space 223 below from the side section of the catalyst holder 218, and the space below the catalyst holder 218 formed by the round pipe 222 can be used as the storage space 223. In FIGS. 13A and 1313, reference sign 225 represents a dropped substance. The round pipe 222 is used as a part of the inflow pipe. The member forming the storage space is not limited to the round pipe. Further, in the continuous fixed-bed catalytic reactor illustrated in FIGS. 13B and 13C, for example, an up-and-down movement apparatus 316 as described in an embodiment that will be subsequently described and a conduction axis 317 connecting the up-and-down movement apparatus 316 to the catalyst holder may be installed.

Figure 14A:
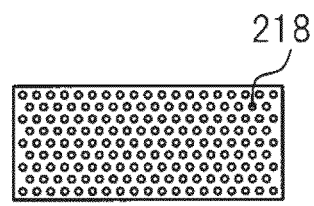
FIG. 14A is a cross-sectional view of a continuous fixed-bed catalytic reactor according to a modification example of the sixth embodiment of the invention.
Figure 14B:
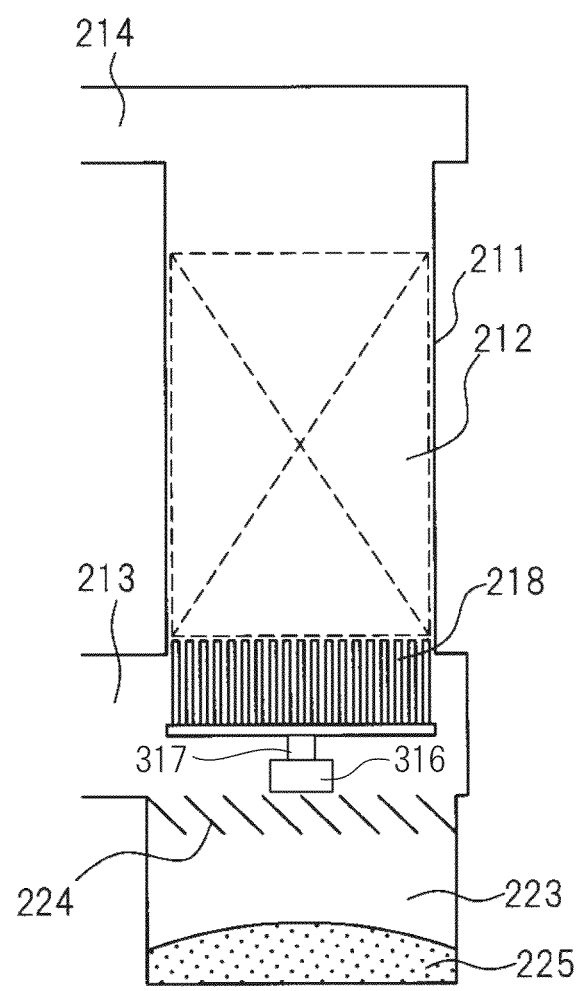
FIG. 14B is a cross-sectional view of a front surface of the continuous fixed-bed catalytic reactor according to the modification example of the sixth embodiment of the invention.
Figure 14C:
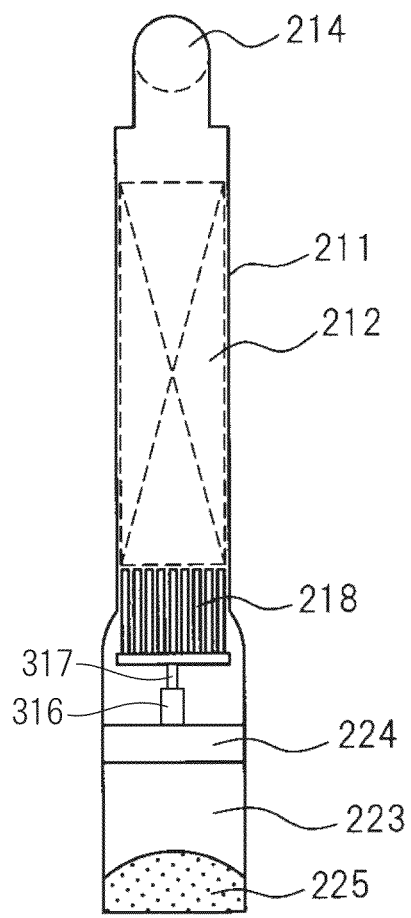
FIG. 14C is a cross-sectional view of the continuous fixed-bed catalytic reactor according to the modification example of the sixth embodiment of the invention.

At this time, a louver 224 may be additionally provided above the storage device 223 as illustrated in FIGS. 14A, 14B and 14C, thereby preventing the re-scattering of the compensated product. In the continuous fixed-bed catalytic reactor illustrated in FIGS. 14B and 14C as well, for example, the up-and-down movement apparatus 316 as described in an embodiment that will be subsequently described and the conduction axis 317 connecting the up-and-down movement apparatus 316 to the catalyst holder may be installed.

[Catalytic Reaction Method]

In the continuous fixed-bed catalytic reactor and the catalytic reaction method of the invention, the type of the catalytic reaction is not particularly limited. Preferable examples of the subject of the continuous fixed-bed catalytic reactor of the invention include a method for reforming tar-containing gas using the tar-containing gas-reforming catalyst as described above. An example thereof is a catalytic reaction in which hydrogen, carbon dioxide and water vapor in tar-containing gas generated when thermally decomposing a carbonaceous raw material are brought into contact with the above-described tar-containing gas-reforming catalyst in the presence of the catalyst or in the presence of the reduced catalyst, thereby reforming and thus gasifying the tar-containing gas.

In addition, another example thereof is a catalytic reaction in which at least any of hydrogen, carbon dioxide and water vapor are added to tar-containing gas generated when thermally decomposing a carbonaceous raw material in the presence of the tar-containing gas-reforming catalyst or in the presence of the reduced catalyst, thereby reforming and thus gasifying the tar-containing gas.

Here, while the reaction path of the tar-gasifying reaction in which tar in tar-containing gas is gasified through catalytic reforming is complex and unclear, it is considered that, between tar and hydrogen in tar-containing gas or hydrogen introduced from outside, for example, a shift reaction into light hydrocarbon including methane through the hydrogenolysis of a condensed polycyclic aromatic element in tar as expressed in Formula 1 proceeds (Formula 1 describes a case in which only methane is generated). In addition, between tar and carbon dioxide in tar-containing gas or carbon dioxide introduced from outside, a shift reaction into hydrogen and carbon monoxide through dry reforming using condensed polycyclic aromatic carbon dioxide in tar as expressed in Formula 2 proceeds. Furthermore, between tar and water vapor in tar-containing gas or water vapor introduced from outside, a steam reforming and aqueous gas shift reaction as expressed in Formula 3 proceeds. In addition, reactions proceed in the same manner for hydrocarbon components other than tar in tar-containing gas.

$$C_nH_m + (2n - m/2)H_2 \rightarrow nCH_4 \quad \text{(Formula 1)}$$

$$C_nH_m + n/2CO_2 \rightarrow nCO + m/2H_2 \quad \text{(Formula 2)}$$

$$C_nH_m + 2nH_2O \rightarrow nCO_2 + (m/2+n)H_2 \quad \text{(Formula 3)}$$

Therefore, in a case in which high BTU gas such as methane is produced, it is desirable to add hydrogen from outside. In addition, in a case in which hydrogen or carbon monoxide is produced, it is desirable to add carbon dioxide from outside. Furthermore, in a case in which a larger amount of hydrogen is produced, it is desirable to add water vapor from outside. Further, reactions also proceed according to Formulae 1 to 3 for the hydrocarbon components other than tar.

Here, it is preferable to reduce the catalyst for reforming tar-containing gas; however, since the catalyst is reduced during the reaction, the catalyst may remain unreduced. In a case in which the tar-containing gas-reforming catalyst is particularly required to be reduced before the reaction, the reduction conditions are not particularly limited as long as the temperature is relatively high and the atmosphere is a reducing atmosphere since particles of nickel that is an active metal are precipitated in a fine cluster shape from the catalyst. For example, the atmosphere may be a gaseous atmosphere including at least any of hydrogen, carbon monoxide and methane, a gaseous atmosphere obtained by mixing water vapor with the above-described reducing gas, or an atmosphere obtained by mixing an inert gas such as nitrogen with the above-described gas. In addition, the reduction temperature is preferably, for example, in a range of 500° C. to 1000° C. The reduction time is dependent on the amount of the catalyst to be loaded as well, and is preferably, for example, in a range of 30 minutes to 4 hours, but there is no particular limitation with this condition as long as the time is long enough to reduce all the loaded catalyst particles.

The inlet temperature of the catalyst layer in the catalytic reaction container is preferably in a range of 500° C. to 1000° C. In a case in which the inlet temperature of the catalyst layer is lower than 500° C., the catalyst activity is rarely exhibited when tar and hydrocarbon is reformed to light hydrocarbon mainly containing hydrogen, carbon monoxide and methane, which is not preferable. On the other hand, in a case in which the inlet temperature of the catalyst layer exceeds 1000° C., a thermal resistant structure is required such that the reforming apparatus becomes expensive, which is economically disadvantageous. In addition, the inlet temperature of the catalyst layer is more preferably in a range of 550° C. to 1000° C. Further, it is also possible to progress the reaction at a relatively high temperature in a case in which the carbonaceous raw material is silica, and at a relatively low temperature in a case in which the carbonaceous raw material is biomass.

Here, even when the tar-containing gas generated from the thermal decomposition or partial oxidation of the carbonaceous raw material is tar-containing gas having an extremely high hydrogen sulfide concentration such as crude COG exhausted from a coke furnace, it is also possible to reform and gasify tar or hydrocarbon in the gas. In addition, the above-described tar-containing gas can be transformed into a useful substance in addition to being used for fuel use as of the related art, and the tar-containing gas can be transformed into synthetic gas suitable for the direct reduction of iron ore, which may lead to a higher degree of energy use.

According to the continuous fixed-bed catalytic reactor of the embodiment, even in a continuous fixed-bed catalytic reaction which has a concern that the catalytic reaction container (particularly, between the catalyst particles, the catalyst) may be blocked due to a solid byproduct such as the reforming reaction of tar-containing gas, since the aperture ratio is significantly high compared with the catalyst holder in which punching metal or a net of the related art is used, the fluid resistance is low so that the operation cost is low and the blockage in the catalyst holder by a solid byproduct can be substantially prevented, and therefore the catalyst holder is washed if necessary only when the catalyst is washed to solve the blockage of the catalyst, and thus it is possible to prevent the operation of the continuous reactor from being stopped to wash the blocked catalyst holder as in the related art.

According to the above-described embodiments, a continuous fixed-bed catalytic reactor which realizes both a high aperture ratio and the prevention of blockage in the catalyst holder is provided. In addition, since it is possible to reduce the ventilation resistance of the catalyst holder, ventilation into the catalyst layer becomes possible only with a small blowing force. In addition, it is possible to highly efficiently reform tar-containing gas using the above-described continuous fixed-bed catalytic reactor.

Seventh to Ninth Embodiments

Hereinafter, seventh to ninth embodiments of the invention will be described in detail with reference to the accompanying drawings. Meanwhile, in the following description and drawings, components having substantially the same function will be provided with the same reference signs, and the duplicate description thereof will not be made.

Seventh Embodiment

Overall Structure

Figure 15A:
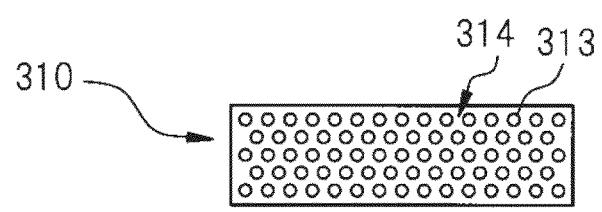
FIG. 15A is a plan view of a continuous fixed-bed catalytic reactor according to a seventh embodiment of the invention.
Figure 15B:
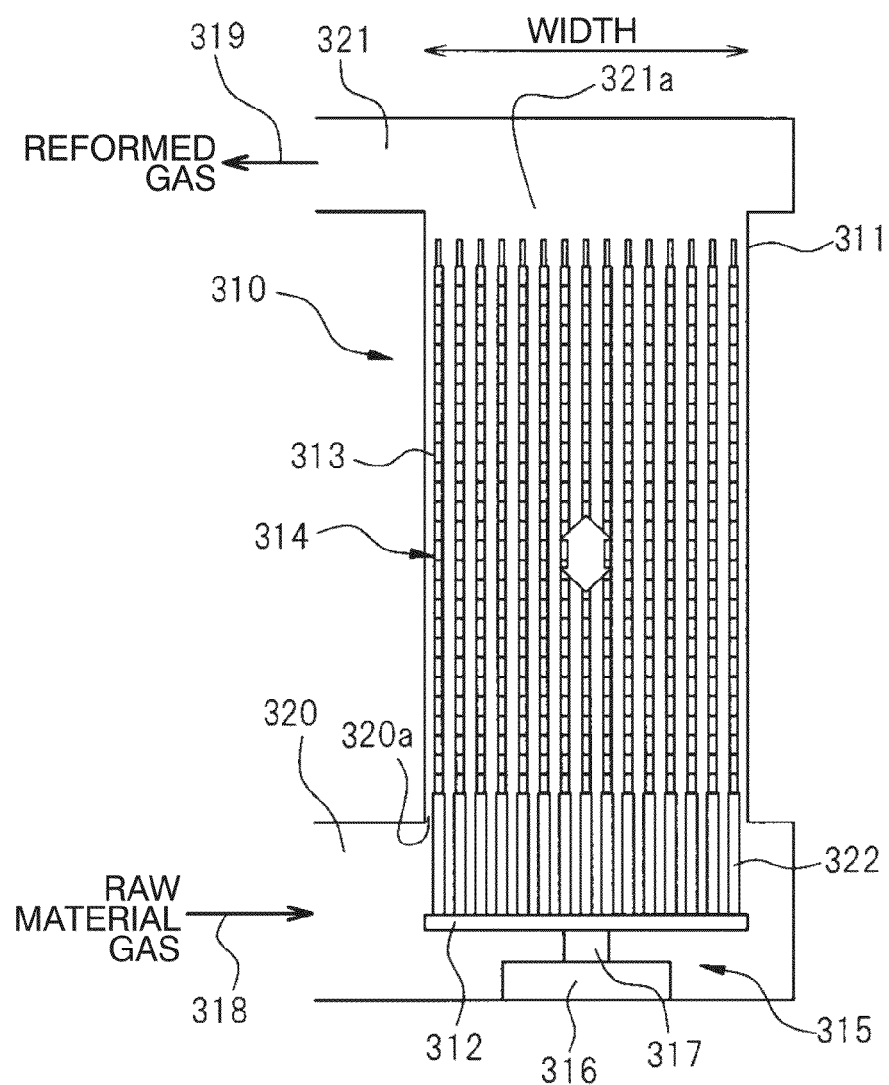
FIG. 15B is a front view of the continuous fixed-bed catalytic reactor according to the seventh embodiment of the invention.
Figure 15C:
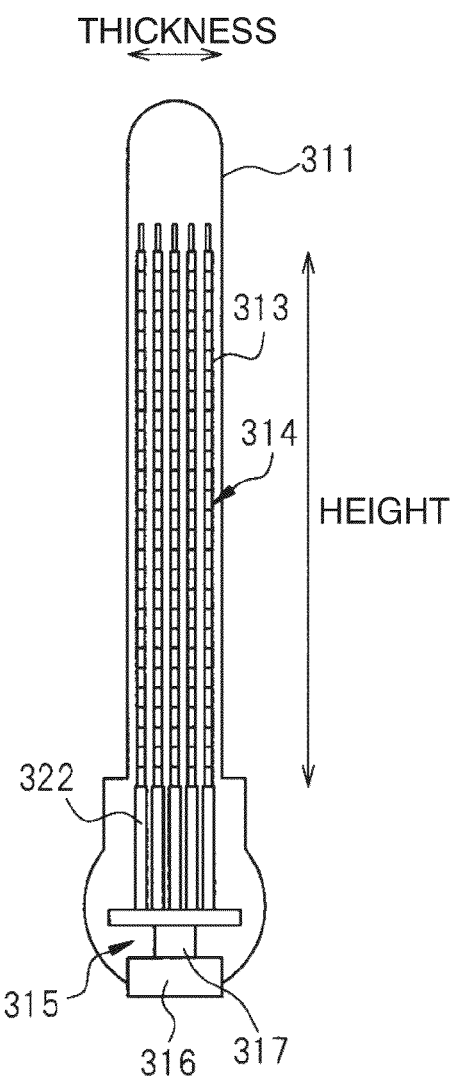
FIG. 15C is a side view of the continuous fixed-bed catalytic reactor according to the seventh embodiment of the invention.

FIGS. 15A, 15B and 15C illustrate a continuous fixed-bed catalytic reactor 310 according to a seventh embodiment of the invention. FIG. 15A is a plan view, FIG. 15B is a front view, and FIG. 15C is a side view. The continuous fixed-bed catalytic reactor 310 of the present embodiment includes a reaction container 311, and the reaction container accommodates a catalyst bar 314 which is a collection of catalyst particle series 313 held by a holding plate 312.

Figure 19A:
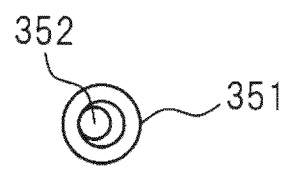
FIG. 19A is a plan view for describing a serial catalyst.
Figure 19B:
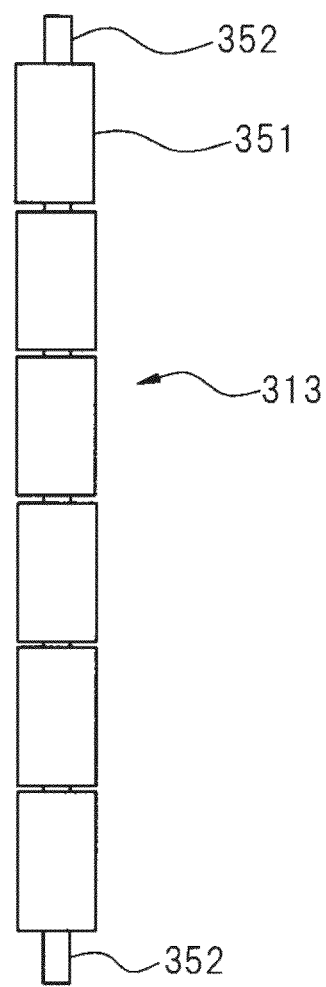
FIG. 19B is a side view for describing the serial catalyst.
Figure 20A:
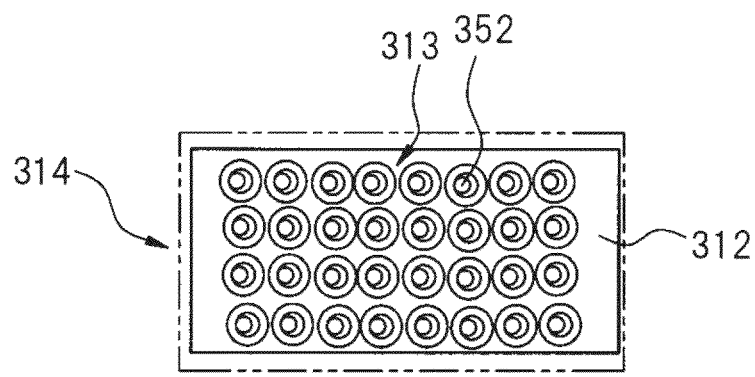
FIG. 20A is a plan view for describing a catalyst fence.
Figure 20B:
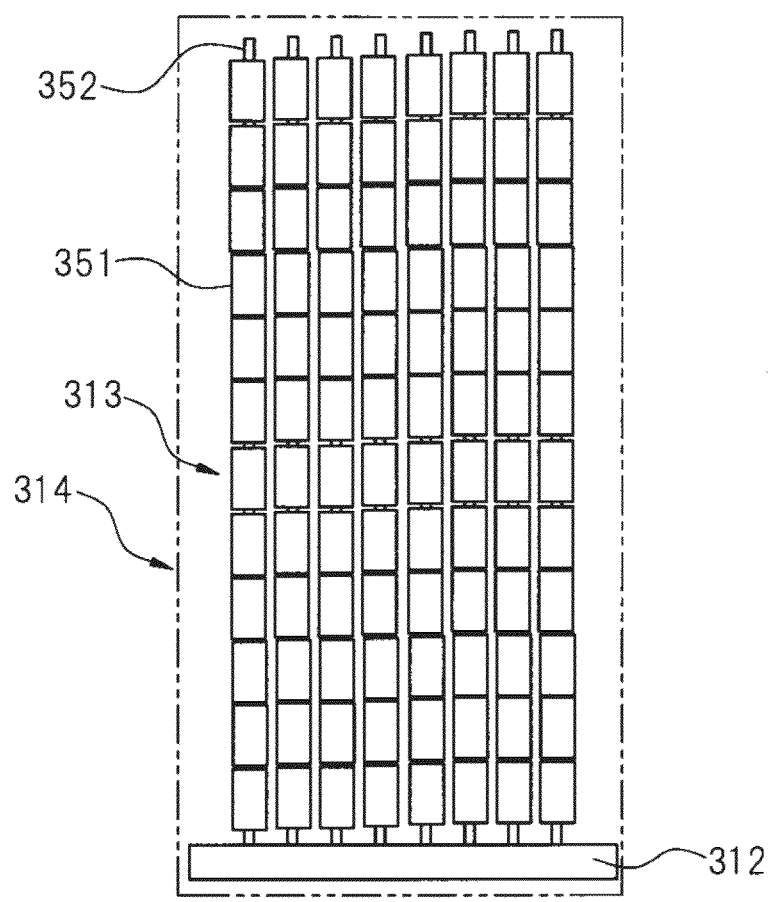
FIG. 20B is a side view for describing the serial fence.

As described above, a characteristic of the embodiment is the use of the catalyst particle series 313 and the catalyst bar 314 which is the collection of the catalyst particle series. The catalyst particle series 313 is formed of a plurality of catalyst particles 351 and a central rod 352 that penetrates the catalyst particles without impairing the movability of the catalyst particles so as to form the catalyst particle series as illustrated in FIGS. 19A and 19B. The catalyst bar 314 is formed of a plurality of the catalyst particle series 313 and the holding plate 312 that installs the central rods 352 upright, that is, fixes the central rods in a standing state as illustrated in FIGS. 20A and 20B. In the seventh embodiment illustrated in FIGS. 15A, 15B and 15C, collars 322 are disposed between the holding plate 312 and the catalyst particle series 313.

Another characteristic of the embodiment is that a driving mechanism 315 for reciprocally moving the catalyst bar in the vertical direction by moving the holding plate up and down is installed below the holding plate 312. The driving mechanism 315 is configured of the up-and-down movement apparatus 316 and the conduction axis 317 connecting the up-and-down movement apparatus 316 to the holding plate 312.

In the reaction container 311, raw material gas 318 is supplied from the bottom section, is reacted when the main stream of the raw material gas passes through the catalyst bar 314 in parallel with the catalyst particle series 313, and reformed gas 319 from the catalyst layer 314 is exhausted through the top section of the reaction container 311. Examples of the raw material gas 318 include hydrocarbon-containing gas, tar and hydrocarbon-containing gas, and the like. Examples of the reformed gas 319 include reformed gas obtained by reforming hydrocarbon-containing gas, and the like. Examples of the catalyst include a catalyst for reforming hydrocarbon, and the like, and a solid substance, for example, solid carbon or the like is accumulated on the surface of the catalyst as a byproduct of the catalytic reaction. In a case in which the catalytic reaction is an endothermic reaction, a temperature and heat necessary for the reaction may be supplied by disposing the catalytic reaction container 311 in, for example, a heating furnace (not illustrated). In a case in which the catalytic reaction is an exothermic reaction, the reaction heat may be removed by making a refrigerant flow through a refrigerant flow path (not illustrated) provided on the outside of the catalytic reaction container. Depending on cases, the raw material gas may be supplied to the reaction container 311 so as to flow from the top side to the bottom side of the catalyst bar 314 which is opposite to the flow in FIGS. 15A, 15B and 15C.

(Shape of the Reaction Container)

The reaction container 311 may have any shape as long as the reaction container has openings 320a and 321a and is capable of storing the catalyst bar in a space between the openings. The opening 320a is communicated with a supply pipe configuring an inflow path 320 for a catalytic reaction fluid (raw material gas), and is equivalent to an inflow opening of the reaction container 311 for the catalytic reaction fluid. The opening 321a is communicated with an exhaust pipe configuring an outflow path 321 for the reformed gas from the reaction container 311, and is equivalent to an outflow opening of the reaction container 311 for the reformed gas. The reaction container 311 may have, for example, a cylindrical shape, a rectangular duct shape or the like, and hereinafter, a rectangular duct-shaped reaction container will be described as an example.

In the following description, the "central axis of the container" is defined as an axis connecting the centers of horizontal cross-sectional views of the container in series in the perpendicular direction. The "reaction container thickness" is equivalent to the minimum length of the typical lengths of the reaction container on a horizontal cross-section, and the "reaction container width" is equivalent to the maximum length of the typical lengths of the reaction container on a horizontal plane. In a case in which the container is a cylinder, the "width" and "thickness" of the container may be replaced by the "diameter".

(Material for the Reaction Container)

Any material can be used as a material for the reaction container 311 as long as the material has a strength large enough to hold the catalyst, thermal resistance and corrosion resistance against a fluid participating in the catalytic reaction, and contamination resistance against a reaction product. Examples of the material that can be used include metallic materials such as carbon steel, stainless steel, a nickel alloy, copper, a copper alloy, aluminum, an aluminum alloy, titanium and a titanium alloy; ceramic materials (including ceramic materials processed to bricks) such as silica, alumina, silicon nitride and silicon carbide; and glass materials such as soda glass and fused silica.

(Dimensions of the Reaction Container)

Both the reaction container thickness and the reaction container width are required to be greater than the catalyst diameter. When the reaction container has a large thickness, a large amount of the catalyst can be accommodated in the catalyst reaction container by efficiently using the space. Generally, in the catalytic reaction, since heat is generated or absorbed and the heat is communicated with the outside through the surface of the reaction container, it becomes more difficult to transfer heat in the thickness direction as the thickness of the reaction container increases. Therefore, the thickness (the diameter in a case in which the reaction container has a round cross-section) of the reaction container is preferably 500 mm or less. In addition, needless to say, the thickness of the reaction container is required to be greater than the typical dimension (for example, the catalyst diameter) of the catalyst being accommodated.

There is no particular limitation with the width of the reaction container in terms of the function. The width may be determined from the engineering viewpoint based on the volume of the catalyst layer to be held and the thickness of the reaction container in consideration of structural and strength limitations (for example, 5000 mm).

The height of the reaction container is required to be equal to or larger than the height of the catalyst particle series when moved up. Meanwhile, there is no particular limitation with the height of the reaction container in terms of the function, and may be determined from the engineering viewpoint in consideration of structural and strength limitations (for example, 5000 mm).

(Catalyst Particle Series and Catalyst Bar)

As illustrated in FIGS. 19A and 19B, the catalyst particle series 313 is configured of catalyst particles 351 having a through-hole at the cylindrical or the like inside and a central rod 352 penetrating a group of the catalyst particles 351. As illustrated in FIGS. 20A and 20B, the catalyst bar 314 is produced by fixing a group of the catalyst particle series 313 to the holding plate 312.

In a case in which the catalyst bar 314 is disposed in the reaction container 311 so that the catalyst particle series 313 are along the vertical direction as illustrated in FIGS. 15A, 15B and 15C, it is possible to provide the collars for preventing the dropping of the collars 322 (FIGS. 15A, 15B and 15C) at the bottom section (portions at which the catalyst particle series and the holding plate are joined together) of the central rods 352. The dropping of the catalyst particles can be prevented by providing the collar 322 with a diameter larger than the diameter of the catalyst hole. In addition, in this case, a space below the collars 322 serves as a space for the inflow and outflow of a fluid and a space in which the product generated on the catalyst surface is dropped and accumulated.

In a case in which the catalyst bar 314 is disposed in the reaction container 311 so that the catalyst particle series 313 are along the horizontal direction as in an eighth embodiment that will be subsequently described, both ends of the central rod 352 are joined to the holding plate 312.

(Aperture Ratio of the Catalyst Bar)

The aperture ratio of the catalyst bar can be defined as the aperture ratio=(1−[the cross-sectional area of a cross-section perpendicular to the main stream of the catalyst bar]/[the apparent cross-sectional area in a direction perpendicular to the main stream of the catalytic reaction container])×100(%). The "main stream" is defined as a flow of a fluid supplied to the reaction container 311 which moves from the inflow opening 320a to the outflow opening 320b in the reaction container 311, and in the case of FIGS. 15A, 15B and 15C, the main stream is the flow of a fluid in a direction parallel to the catalyst particle series 313. As the aperture ratio of the catalyst bar increases, the ventilation resistance decreases. Meanwhile, when the aperture ratio is excessive, the necessary volume of the catalytic reaction container increases, and the ventilation resistance is small, and therefore the blow-by is likely to occur. Therefore, the aperture ratio is preferably in a range of 30% to 60%.

(Central Rod in the Catalyst Particle Series)

The central rod in the catalyst particle series is preferably a round rod since the round rod can penetrate the catalyst particles without causing the damage of the catalyst particle series. However, for the reason of processing convenience and the like, the central rod may be a rod having a polygonal cross-section.

In addition, the central rod preferably has a linear shape to allow the catalyst particles to move around the central rod. However, for the reason of processing convenience, the central rod may be a curved rod.

The diameter of the central rod is required to be smaller than the hole diameter of the catalyst. In addition, the central rod preferably has an appropriate diameter to have a strength large enough to hold the catalyst or withstand the up-and-down movement and to avoid buckling caused by creep and the like at a high temperature. For example, a diameter in a range of 1 mm to 30 mm can be applied.

As a material for the central rod, metal, particularly, stainless steel, a nickel alloy such as INCONEL (registered trademark), titanium or a titanium alloy can be used from the viewpoint of strength, stiffness, thermal resistance and the like and for a reason that a material with a high thermal conductivity is preferable. In addition, copper, a copper alloy, aluminum, an aluminum alloy and the like are particularly preferable as the material with a high thermal conductivity.

(Length of the Catalyst Particle Series)

There is no particular limitation with the length of the catalyst particle series as long as the catalyst bar reciprocally moving in the vertical direction can be accommodated in the reaction container and the length of the catalyst particle series is within a range of the height of the catalytic reaction container. The length of the catalyst particle series can be freely determined by increasing the number of the catalyst particles penetrated by the central rod. However, in the case of a long catalyst particle series, since the concentration of the raw material fluid decreases on the downstream side, the reaction rate of the catalytic reaction decreases. Therefore, the optimal length needs to be appropriately determined in consideration of the ratio between the flow rate of the raw material fluid to be treated and the total amount of the catalyst.

(Method for Producing the Catalyst Particle Series)

The catalyst particle series can be produced by manually penetrating the central rod through the catalyst particles.

(Holding Plate of the Catalyst Particle Series)

The holding plate supporting the catalyst particle series is produced using a material allowing the attachment of the central rod with a method of welding, screwing or the like. The material for the holding plate may be, similar to the central rod, stainless steel, a nickel alloy such as INCONEL (registered trademark), titanium, a titanium alloy or the like from the viewpoint of strength, stiffness, thermal resistance and the like. In a case in which the collars are used, it is also possible to produce the collars using the same material as for the holding plate.

(Driving Mechanism of the Catalyst Bar)

In the embodiment, the holding plate 312 is moved up and down, thereby moving the catalyst bar 314 on the holding plate up and down in the reaction container 311. To move the holding plate up and down, the driving mechanism 315 moving the holding plate 312 up and down is mounted in the reaction container 311 of the embodiment. As the driving mechanism 315, it is possible to use an ordinary driving mechanism such as an air cylinder or the up-and-down movement apparatus 316 in which a gear such as a rack and pinion is used. The holding plate 312 is coupled with the up-and-down movement apparatus 316 using the conduction axis 317. When the up-and-down movement apparatus 316 is operated, the entire holding plate 312 is moved along the axial line of the reaction container 311, thereby moving the entire catalyst bar 314 up and down along the axial line of the reaction container 311 as well.

At least a part of the conduction axis 317 on the holding plate 312 side is required to be inside the reaction container 311 or the raw material inflow path 320 or the reformed gas outflow path 321 that may be present in the bottom section of the reaction container 311. The up-and-down movement apparatus 316 can be provided on the outside of the reaction container 311. In a case in which the reaction container 311 is disposed in a heating apparatus (not illustrated) such as a heating furnace, it is also possible to provide the up-and-down movement apparatus 316 on the outside of the heating apparatus. In this case, a commercially available up-and-down movement apparatus can be used, and it is necessary to seal a portion at which the conduction axis 317 penetrates the reaction container 311 through packing for high-temperature use.

In a case in which the entire driving mechanism 315 is provided in the reaction container 311 as illustrated in FIGS. 15A, 15B and 15C, the up-and-down movement apparatus 316 is required to have thermal resistance and corrosion resistance to protect the up-and-down movement apparatus 316 from, for example, a high-temperature or corrosive substance in the reaction container 311. What has been described above can be realized by, as an example, producing the entire air cylinder of the driving mechanism 315 using a thermal resistant alloy such as HASTELLOY (registered trademark). In this case, an air supply pipe (not illustrated) to the air cylinder penetrates the reaction container 311; however, since the air supply pipe is an immobile section, the air supply pipe may be sealed by welding the entire circumference of the pipe.

(Up-and-Down Stroke of the Holding Plate)

To make the catalyst particles sufficiently move relative to each other, the up-and-down stroke of the holding plate 312 is preferably large. For example, even at an up-and-down stroke of approximately 10% of the typical dimension (for example, diameter) of the external catalyst surface, a vibrating effect can be obtained, and therefore a certain degree of an effect that removes the accumulated substance on the catalyst surface such as solid carbon can be obtained. However, to obtain a sufficient accumulated substance-removing effect, the up-and-down stroke of the holding plate 312 is preferably 50% or more and more preferably 100% or more of the typical dimension of the external catalyst surface.

Meanwhile, in a case in which the up-and-down stroke is extremely large, an increase in the sizes of the reaction container 311 and the driving mechanism 315 is caused, which is not efficient. In addition, the repetition of the up-and-down movement with a small stroke (100% or more) also produces the same effect of a larger up-and-down stroke. Therefore, the up-and-down stroke is preferably 1000% or less of the typical dimension of the external catalyst surface.

(Up-and-Down Movement Speed of the Holding Plate)

There is no particular limitation with the elevating speed. The lowering speed needs to be set so as to enable the sufficient relative movement between the catalyst particles to separate the solid accumulated substance from the catalyst surface. At an extremely slow lowering speed, the catalyst particles do not move relative to each other, which is not preferable. The lowering speed can be set to be slower than the free fall speed of the catalyst particles (for example, 100 mm/s). Then, the lowering speeds of the catalyst particles vary depending on the contact state between the catalyst particles and the central rod when individual catalyst particles lower, and it is possible to cause relative movement and collision among the catalyst particles.

Alternatively, when the speed of the central rod is made to be slower than the speed of the catalyst particles at the terminal portion of the reciprocal movement by the driving mechanism, it is also possible to supply an impact by causing the catalyst particles to collide with the holding plate using inertia. This method is particularly effective in a case in which the catalyst bar is moved in the horizontal direction as in the eighth embodiment that will be subsequently described with reference to FIGS. 16A, 16B and 16C.

(Shape of the Catalyst Particles)

It is necessary to prevent the catalyst particles from dropping from the catalyst particle series. Therefore, the catalyst particle advantageously has a shape having a hole allowing the penetration of the central rod. For example, a catalyst particle having a ring shape, a cylindrical shape, a duct shape or the like can be used. In addition, the catalyst particles may have a horseshoe-like shape having an opening width smaller than the diameter of the central rod as a shape that satisfies the requirement of preventing the dropping of the catalyst particles.

The hole dimension of the catalyst particle is required to be sufficiently larger than the diameter of the central rod so that the catalyst particle is capable of freely moving against the central rod. Particularly, in a case in which the catalyst particle series is horizontally disposed and the catalyst bar reciprocally moves in the perpendicular direction as in the eighth embodiment that will be subsequently described, since the relative movement (with respect to the central rod) distance of individual catalyst particles in the perpendicular direction is limited in a range of [central hole diameter]−[central rod diameter], it is preferable to set this difference to be sufficiently large. For example, [central hole diameter] can be set to [central rod diameter]+1 mm.

(Material and Action of the Catalyst)

The material or catalytic action of the catalyst to which the continuous fixed-bed catalytic reactor of the embodiment can be applied are not particularly limited as long as the catalyst is a fluid, particularly, a catalyst used in a catalytic reaction in which gas is used as a raw material. The continuous fixed-bed catalytic reactor of the embodiment can be preferably used for a catalyst used in a catalytic reaction in which the fluid is gas and the products of the catalytic reaction are gas and a solid or liquid substance, preferably in a catalytic reaction in which the catalytic reaction fluid is gas containing hydrocarbon and the products of the catalytic reaction are gas and a solid or liquid substance, and particularly in a catalytic reaction in which the catalytic reaction fluid is gas containing tar and the products of the catalytic reaction include solid hydrocarbon or solid carbon.

Generally, the continuous fixed-bed catalytic reactor of the embodiment can be widely used for an oxide catalyst used in the above-described catalytic reaction, and particularly, can be preferably used for an oxide catalyst used in the catalytic reaction in which the catalytic reaction fluid is gas containing tar and the products of the catalytic reaction include solid hydrocarbon or solid carbon.

A specific example of the catalyst that can be preferably used in the continuous fixed-bed catalytic reactor of the embodiment is a catalyst for reforming tar-containing gas which is an oxide containing nickel, magnesium, cerium and aluminum, includes at least one complex oxide, and does not include alumina as a sole compound (WO2010/134326). A preferable example of the complex oxide is a complex oxide made up of crystal phases of NiMgO, $MgAl_2O_4$ and $CeO_2$, in which, furthermore, in the respective crystal phases, the size of the crystallite of the NiMgO crystal phase in a (200) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $CeO_2$ crystal phase in a (111) plane is in a range of 1 nm to 50 nm. The above-described catalyst has a characteristic of a capability of converting even tar-containing gas which includes a large amount of hydrogen sulfide generated during the thermal decomposition of a carbonaceous raw material and mainly includes condensed polycyclic aromatic elements that are likely to cause carbon precipitation into light hydrocarbon mainly including hydrogen, carbon monoxide and methane by highly efficiently reforming the accompanying heavy hydrocarbon such as tar and a characteristic of, when the catalyst performance is deteriorated, removing precipitated carbon or adsorbed sulfur on the catalyst by brining at least any of water vapor and air into contact with the catalyst at a high temperature, thereby recovering the catalyst performance and enabling a stable operation for a long period of time.

In addition, another specific example of the catalyst that can be preferably used in the continuous fixed-bed catalytic reactor of the embodiment is a catalyst for reforming tar-containing gas which is made of a complex oxide containing nickel, magnesium, cerium, zirconium and aluminum (Japanese Unexamined Patent Application, First Publication No. 2011-212574). A preferable example of the complex oxide is a complex oxide including crystal phases of NiMgO, $MgAl_2O_4$ and $Ce_xZr_{1-x}O_2$ ($0<x<1$), in which, furthermore, in the respective crystal phases, the size of the crystallite of the NiMgO crystal phase in a (220) plane obtained from an X-ray diffraction measurement is in a range of 1 nm to 50 nm, the size of the crystallite of the $MgAl_2O_4$ crystal phase in a (311) plane is in a range of 1 nm to 50 nm, and the size of the crystallite of the $Ce_xZr_{1-x}O_2$ crystal phase in a (111) plane is in a range of 1 nm to 50 nm. According to the above-described catalyst, it is possible to stably convert tar-containing gas generated when thermally decomposing silica or biomass into a light chemical substance such as hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

Furthermore, another specific example of the catalyst that can be preferably used in the continuous fixed-bed catalytic reactor of the embodiment is a catalyst for reforming tar-containing gas that is a complex oxide represented by aM.b-Ni.cMg.dO in which a, b and c satisfy $a+b+c=1$, $0.02 \leq a \leq 0.98$, $0.01 \leq b \leq 0.97$ and $0.01 \leq c \leq 0.97$, d represents a value at which oxygen and a positive element becomes electrically neutral, and M represents at least one element selected from Li, Na and K (Japanese Unexamined Patent Application, First Publication No. 2011-212552, and Japanese Unexamined Patent Application, First Publication No. 2011-212598). A preferable example of the complex oxide is a complex oxide formed by adding at least one oxide selected from silica, alumina and zeolite, in which, furthermore, the amount of at least one oxide selected from silica, alumina and zeolite is preferably in a range of 1% by mass to 90% by mass with respect to all the complex oxide. According to the above-described catalyst, it is possible to stably convert tar-containing gas generated when thermally decomposing coal or biomass into a light chemical substance such as carbon monoxide or hydrogen. Particularly, it is possible to stably convert even tar-containing gas containing a high concentration of hydrogen sulfide into a light chemical substance such as carbon monoxide or hydrogen by bringing the tar-containing gas into contact with the catalyst without carrying out a desulfurization treatment so as to reform tar in the crude gas or reform a hydrocarbon component in the purified gas.

Other Applicable Examples

The invention can be preferably used in the following continuous fixed-bed catalytic reactor in which coking or the like occurs in addition to the above-exemplified continuous fixed-bed catalytic reactor and catalyst.

1) Methane-reforming catalytic reactor: "Comparative Examples" in Japanese Unexamined Patent Application, First Publication No. 2006-35172 describe that a large amount of coking (carbon precipitation) occurs using methane gas which is hydrocarbon as raw material gas.

2) Commercially available gas-reforming catalytic reactor: Patent Document 2 describes examples of coking.

3) Additionally, the invention can be applied to a catalytic reactor for reforming a variety of petroleum-purified gases such as LPG or natural gas, a catalytic reactor for a fuel battery in which hydrogen-containing gas and a gaseous oxidant are made to act, thereby generating power and water as a byproduct (for example, Japanese Unexamined Patent Application, First Publication No. 2009-48797), and the like.

Eighth Embodiment

Figure 16A:
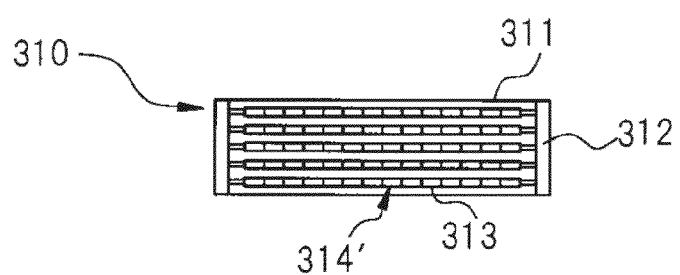
FIG. 16A is a plan view of a continuous fixed-bed catalytic reactor according to an eighth embodiment of the invention.
Figure 16B:
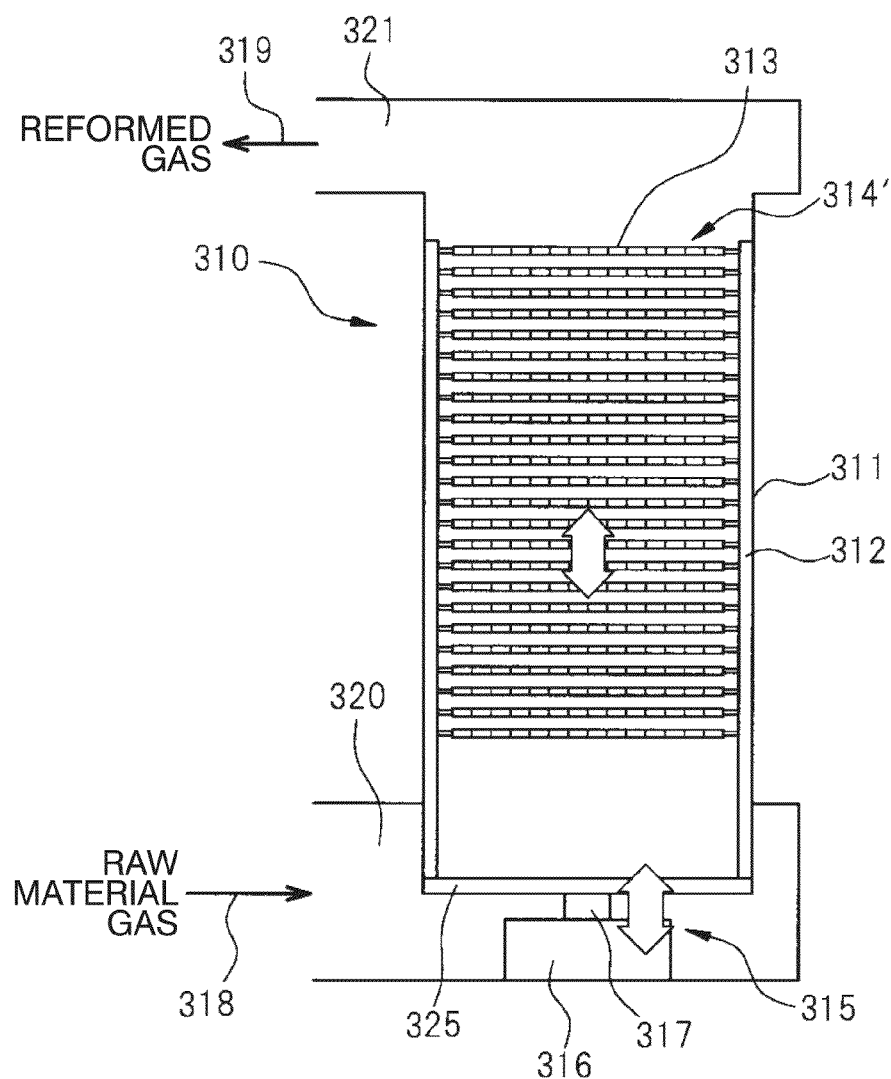
FIG. 16B is a front view of the continuous fixed-bed catalytic reactor according to the eighth embodiment of the invention.
Figure 16C:
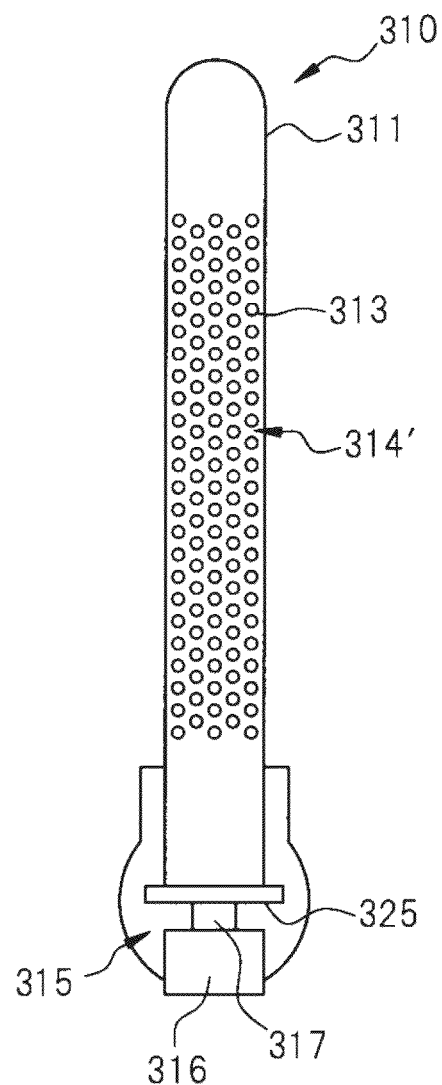
FIG. 16C is a side view of the continuous fixed-bed catalytic reactor according to the eighth embodiment of the invention.

Next, a continuous fixed-bed catalytic reactor according to an eighth embodiment will be described with reference to FIGS. 16A, 16B and 16C. FIG. 16A is a plan view, FIG. 16B is a front view, and FIG. 16C is a side view. The continuous fixed-bed catalytic reactor 310 in FIGS. 16A, 16B and 16C is the same as the continuous fixed-bed catalytic reactor of the seventh embodiment described with reference to FIGS. 15A, 15B and 15C except for the fact that the catalyst bar is disposed in the reaction container so that the catalyst particle series are along the horizontal direction.

In the present embodiment, the catalyst bar is formed by fixing both ends of the catalyst particle series to the holding plate 312. It is not necessary to provide the collars used in the catalyst bar of the seventh embodiment at the joining portions between the catalyst particle series and the holding plate 312. The holding plate 312 extends toward the bottom of a catalyst bar 314', is connected to a supporting member 325, and the supporting member 325 is coupled with the conduction axis 317 in the up-and-down movement mechanism 315.

The eighth embodiment has the following characteristics.

(1) The catalyst bar is disposed in the reaction container so that the catalyst particle series are along the horizontal direction, that is, the catalyst particle series are disposed so as to orthogonally cross the main stream. Particularly, the catalyst particle series can be disposed in a zigzag shape when observed from the main stream. Then, the flow of the main stream collides with the catalyst surface which is the side surface of the catalyst particle series, and the orientation of the flow is bent so as to pass through both sides of the catalyst particle series. At this time, a strong advection flow and a strong turbulent flow scatter in a direction perpendicular to the main stream, thereby accelerating mass transfer and thermal migration in a direction perpendicular to the main stream. As a result, the amount of heat supplied to the surface of the reaction container from outside in a case in which the inside of the reaction container is heated is transported deep into the reaction container, and even when the catalytic reaction rate differs in the thickness direction of the reaction container, the concentration of the fluid in the thickness direction becomes uniform due to the effect of the material transport, and the blow-by is not easily caused. Particularly, in a case in which the catalyst particle series are disposed in a zigzag shape, since the flow of the main stream is continuously bent due to the collision with the catalyst particle series, the mass transfer and thermal migration in the thickness direction are further accelerated, and the above-described effects become more significant.

(2) It is possible to reciprocally move the catalyst bar in the vertical direction. Therefore, the inner holes of the respective catalyst particles and the central rod are made to move relative to each other, and collide with each other. The use of vibration occurring during the collision enables the detachment and removal of the bulk-shaped solid product generated on the surfaces of the respective catalyst particles.

(3) It is possible to couple the central rods for the respective catalyst particle series to the holding plate holding the catalyst bar and to heat the entire holding plate through thermal conduction from the catalytic reaction container. Then, the thermal conduction between the holding plate and the central rods for the catalyst particle series are accelerated, and it is possible to heat the catalyst particles present in a region away from the wall of the reaction container through the thermal conduction by the central rods in contact with the catalyst particles since the holding plate is held at a high temperature at all times.

(4) It is also possible to reciprocally move the catalyst bar horizontally by providing a driving apparatus for reciprocally moving the catalyst bar in the horizontal direction. Then, similar to the seventh embodiment, the bulk-shaped solid product generated on the surfaces of the respective catalyst particles can be detached and removed by causing the collision between the catalyst particles.

Ninth Embodiment

Figure 17:
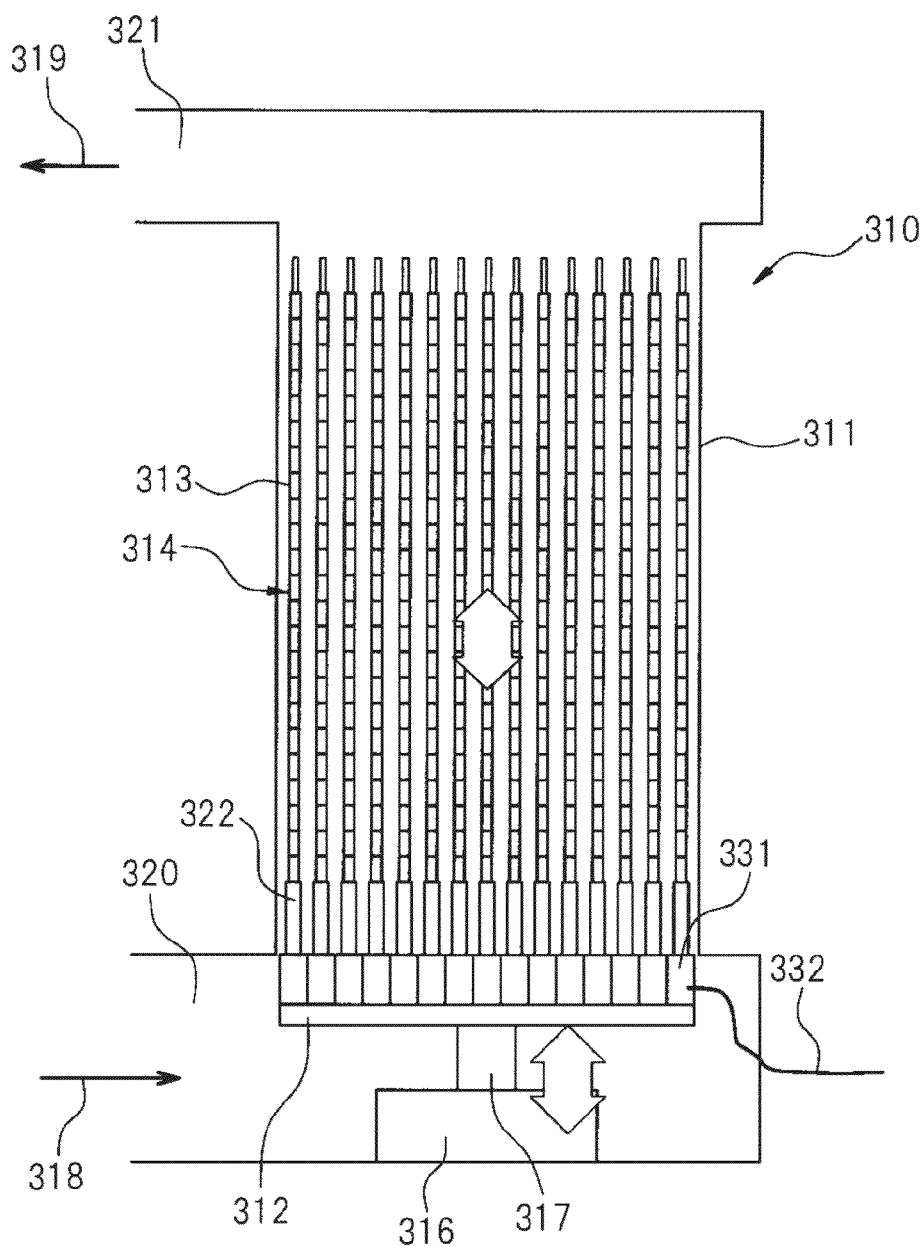
FIG. 17 is a schematic view of a continuous fixed-bed catalytic reactor according to a ninth embodiment of the invention.

Next, a continuous fixed-bed catalytic reactor according to a ninth embodiment will be described with reference to FIG. 17. A continuous fixed-bed catalytic reactor 310 of FIG. 17 is the same as the continuous fixed-bed catalytic reactor of the seventh embodiment described with reference to FIGS. 15A, 15B and 15C except for the fact that a heating apparatus 331 is provided at the ends of the catalyst particle series.

The heating apparatus 331 is provided between the collars 322 below the catalyst particle series 313 and the holding plate 312, whereby it is possible to heat the central rods by winding a heating element (not illustrated) such as a nickel wire around the central rod, and heating the central rods by applying electricity. Electricity can be supplied to the heating element using an electric wire 332. The catalyst particles in the respective catalyst particle series can be heated through thermal conduction from the heated central rods in contact with the catalyst particles. A reforming reaction accompanying an endothermic reaction can be realized with a high efficiency by mainly heating the catalyst particles through thermal conduction from the central rods.

The heating apparatus 331 may be provided for all the catalyst particle series in the catalyst bar, and can also be provided for a part of the catalyst particle series. Examples of the latter case include a case in which the heating apparatus is provided for the catalyst particle series in the central portion in the thickness direction of the reaction container. Then, even in a reaction container which has a large thickness and requires heating from outside through the wall, it is possible to sufficiently heat the catalyst particles in the central portion in the thickness direction of the reaction container in which it is difficult to sufficiently transfer heat from outside.

In the invention, feasible embodiments are not limited to the above-described embodiments. For example, in the eighth embodiment, the catalyst particle series may be disposed at an angle instead of being disposed horizontally. In the seventh and eighth embodiments, the catalyst particle series may be reciprocally moved in the horizontal direction. In addition, in the seventh and eighth embodiments, the catalyst particle series may be reciprocally moved both in the perpendicular direction and in the horizontal direction.

According to the continuous fixed-bed catalytic reactor of the embodiment, it is possible to efficiently remove the solid accumulated substance which is generated and accumulated on the catalyst particles in the fixed-bed catalyst layer so as to degrade the catalyst performance by reciprocally moving the entire catalyst layer. Furthermore, in the continuous fixed-bed catalytic reactor according to the embodiment, since the adjacent catalyst particle series are disposed at certain intervals in the catalytic reaction container, the blockage problem caused by the accumulation of the solid product in the spaces between the catalyst particles generated in the catalyst layer and the like which is configured by randomly loading the catalyst is essentially avoided. Therefore, it is not necessary to stop the operation to wash the catalyst or the catalyst holder as in the related art, and it becomes possible to continuously operate the reactor. In addition, it is possible to cause with a high efficiency a catalytic reaction generating a solid product such as solid carbon using the continuous fixed-bed catalytic reactor.

Thus far, the invention has been described based on the first to ninth embodiments, but the invention is not limited to the above-described embodiments, and within the scope of the technical idea of the invention, a combination of the above-described embodiments may be used, or some of the configuration may be modified.

EXAMPLES

The invention will be further described based on the following test examples and reference examples. However, the invention is not limited to the test examples and reference examples.

Test Example 1-1

A test was carried out using the apparatus illustrated in FIGS. 2A, 2B and 2C.

(Configuration of the Entire Reaction System)

Coal carbonized gas (containing water vapor derived from moisture in coal) was continuously generated by supplying coal to a heated kiln from a coal supplier (coal hopper constant quantity supplier) at a rate of 20 kg/hour. An inflow opening in a continuous fixed-bed catalytic reactor was connected to the kiln using a heat-retaining pipe, and an outflow opening in the continuous fixed-bed catalytic reactor was connected to an induced draft fan through a scrubber using a heat-retaining pipe. Tar in the coal carbonized gas was reformed in the catalytic reaction container so as to generate light gas (hydrogen or the like), and the light gas was diffused as the reformed gas in the atmosphere through a flare stack (that combusts the reformed gas) using the induced draft fan. The catalytic reaction container was accommodated in an electric heating furnace having a furnace temperature controlled to a constant temperature. The flow rate of the induced draft fan could be adjusted, and was controlled to a flow rate corresponding to the coal carbonized gas-generating rate.

(Catalyst)

A catalyst having a component system of $Ni_{0.1}Ce_{0.1}Mg_{0.8}O$ was used as the catalyst.

Nickel nitrate, cerium nitrate and magnesium nitrate were weighed so that the molar ratio of the respective metal elements became 1:1:8, nickel, magnesium and cerium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and cerium were aged by continuing the stirring for a certain period of time while holding nickel, magnesium and cerium were at 60° C., then, were suction-filtered, and were sufficiently washed using pure water (80° C.). After sediment obtained after the washing was dried at 120° C. and coarsely crushed, the crushed sediment was fired (calcined) in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium, cerium and alumina attached to the wall surface of the eggplant flask were moved into an evaporation dish, dried at 120° C., and calcined at 600° C. Powder was press-molded using a compression molder, thereby producing a cylindrical compact having an outer diameter of 15 mm, an inner diameter of 5 mm and a height of 15 mm.

The compact was fired in the air at 950° C., and a catalyst compact was prepared by mixing 50% by mass of alumina with $Ni_{0.1}Ce_{0.1}Mg_{0.8}O$. As a result of confirming the components of the compact through ICP analysis, it was confirmed that the compact had desired components. In addition, as a result of measuring the compact using a kiya-type hardness meter, it was found that the compact held a high strength of approximately 100 N.

(Continuous Fixed-Bed Catalytic Reactor)

The used continuous fixed-bed catalytic reactor was as described below.

Shape of the reaction container: a duct shape in which the cross-section perpendicular to the central axis had a rectangular shape and constant dimensions Material of the reaction container: stainless steel Thickness of the reaction container: 120 mm Width of the reaction container: 300 mm Height of the catalyst layer: 400 mm Aspect ratio of the catalyst layer: 3.3

Up-and-down stroke of the driving apparatus: 15 mm

Elevating speed of the driving apparatus: 2 mm/second

Lowering speed of the driving apparatus: 100 mm/second

Catalyst holder: stainless round rod pin-type catalyst holder

Pin: the height was 5.1 mm, the length was 90 mm, the top section was flat, and the corner section was 1 mm-faced Disposition of the pins: all the pins were welded to the bottom plate of the catalyst holder in a shape of an isosceles triangle having a bottom side of 16 mm (in the reaction container width direction) and a height of 13.5 mm (in the reaction container thickness side).

Aperture ratio of the pins: 92%

Amount of the catalyst used: 7 kg

The above-described catalyst was accommodated in the continuous fixed-bed catalytic reactor illustrated in FIGS. 2A, 2B and 2C, and a thermocouple was inserted into the central position of the catalyst layer.

Before the initiation of a reformation reaction, first, the temperature of the reactor was increased up to 800° C. in a nitrogen atmosphere, and a reduction treatment was carried out for 30 minutes while making hydrogen gas flow at 80 Nl/min. After that, coke furnace gas was adjusted and introduced, and the reaction was evaluated at normal pressure.

Regarding the operation timing of the driving apparatus, first and second up-and-down movements were made respectively at three hours and four hours after the initiation of the ventilation of coal carbonized gas by reciprocally moving the catalyst layer two times.

(Operation Conditions)

The operation conditions were as described below.

Temperature of the coal carbonized kiln: 750° C.

Temperature of the electric heating furnace: 800° C.

Flow rate of the coal carbonized gas: 10 Nm³/h on an average

Ventilation period of the coal carbonized gas: five hours (Results)

The test results were as described below.

Ventilation property (pressure loss)
  Immediately after the initiation of ventilation: 0.1 kPa
  At the first up-and-down movement: 4 kPa (immediately before)→0.3 kPa (immediately after)
  At the second up-and-down movement: 4 kPa (immediately before)→1.0 kPa (immediately after)

As described above, it was admitted that the ventilation property was recovered by the up-and-down movement of the catalyst layer.

Reformation characteristics (hydrogen amplification rate=the flow rate of hydrogen in the reformed gas/the flow rate of hydrogen in the raw material gas)
  Immediately after the initiation of ventilation: 3.5
  At the first up-and-down movement: 2.5 (immediately before)→2.3 (immediately after)
  At the second up-and-down movement: 1.8 (immediately before)→1.7 (immediately after)

As described above, in the present test example in which the aspect ratio of the catalyst layer was 3.3 (greater than two), it was found that the reformation characteristic recovery effect of the up-and-down movement of the catalyst layer was limited.

As a result of investigating the inside of the dissembled apparatus after the end of the test, while 40 g of solid carbon was accumulated on the bottom plate of the holder, on the surface of the holder, only a thin solid carbon film was generated, there was no attachment of bulk-shaped solid carbon to the pins, and the ventilation resistance of the holder was the same as the ventilation resistance when the holder had been installed.

Test Example 1-2

A test was carried out using an apparatus in which a catalytic reaction container not equipped with the driving mechanism of Test example 1-1 (the catalyst holder was fixed) was used and a hammering apparatus periodically striking the side wall of the catalytic reaction container using a weight.

Regarding the operation timing of the hammering apparatus, first and second hammerings were made respectively at three hours and 3.5 hours after the initiation of the ventilation of coal carbonized gas by reciprocally moving the catalyst layer ten times.

Other conditions were the same as in Test Example 1-1.

(Results)

The test results were as described below.

Ventilation property (pressure loss)
  Immediately after the initiation of ventilation: 0.1 kPa
  At the first hammering: 4 kPa (immediately before)→2.5 kPa (immediately after)
  At the second hammering: 4 kPa (immediately before)→4 kPa (immediately after)

As described above, there was no ventilation property recovery effect of hammering at the second hammering, and the effect of the first hammering was also smaller than the effect in Test Example 1-1. Since the pressure loss was not decreased, the catalyst layer was determined blocked, and the ventilation was stopped four hours after the initiation of the ventilation.

Test Example 1-3

A test was carried out in the same manner as in Test Example 1-1 except for the facts that the height of the catalyst layer was set to 150 mm, the weight of the catalyst was set to 2.5 kg, the volume ratio of the raw material gas (coal carbonized gas)/the catalyst was set to be the same as in Test Example 1-1, the driving apparatus was set to have the following conditions, that is,
  Up-and-down stroke of the driving apparatus: 20 mm
  Elevating speed of the driving apparatus: 2 mm/second
  Lowering speed of the driving apparatus: 10 mm/second, and regarding the operation timing, first and second up-and-down movements were made respectively at three hours and five hours after the initiation of the ventilation of coal carbonized gas by reciprocally moving the catalyst layer two times.

(Results)

The test results were as described below.

Ventilation property (pressure loss)
  Immediately after the initiation of ventilation: 0.1 kPa
  At the first up-and-down movement: 4 kPa (immediately before)→0.25 kPa (immediately after)
  At the second up-and-down movement: 4 kPa (immediately before)→0.6 kPa (immediately after)

As described above, it was admitted that the ventilation property was recovered by the up-and-down movement of the catalyst layer.

Reformation characteristics (hydrogen amplification rate=the flow rate of hydrogen in the reformed gas/the flow rate of hydrogen in the raw material gas)
  Immediately after the initiation of ventilation: 3.3
  At the first up-and-down movement: 2.4 (immediately before)→2.8 (immediately after)
  At the second up-and-down movement: 1.4 (immediately before)→2.0 (immediately after)

As described above, in the present test example in which the aspect ratio of the catalyst layer was 1.25 (smaller than two), it was admitted that the catalyst-reforming performance was recovered by the up-and-down movement. This can be said to be the effect of the capability of stirring all catalyst particles in the catalyst layer.

After the end of the test, while 70 g of solid carbon was accumulated on the bottom plate of the holder, on the surface of the holder, only a thin solid carbon film was generated, there was no attachment of bulk-shaped solid carbon to the pins, and the ventilation resistance of the holder was the same as the ventilation resistance when the holder had been installed.

Reference Example 1-1

Nickel nitrate, cerium nitrate, zirconium nitrate oxide and magnesium nitrate were weighed so that the molar ratio of the respective metal elements became 1:1:1:7, nickel, cerium, zirconium and magnesium were co-precipitated as hydroxides by adding a potassium carbonate aqueous solution heated to 60° C. to a mixed aqueous solution prepared at a heating temperature of 60° C., and were sufficiently stirred using a stirrer.

After that, nickel, cerium, zirconium and magnesium were aged by continuing the stirring for a certain period of time while holding nickel, cerium, zirconium and magnesium were at 60° C., then, were suction-filtered, and were sufficiently washed using pure water (80° C.). After sediment obtained after the washing was dried at 120° C. and coarsely crushed, the crushed sediment was calcined in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium and alumina attached to the wall surface of the eggplant flask were moved into an evaporation dish, dried at 120° C., and calcined at 600° C. And then, powder was press-molded into a tablet shape having a diameter of 3 mm using a compression molder, thereby producing a tablet compact. The compact was fired in the air at 950° C., and a catalyst compact was prepared by mixing 50% by mass of alumina with $Ni_{0.1}Ce_{0.1}Zr_{0.1}Mg_{0.7}O$.

As a result of confirming the components of the compact through ICP analysis, it was confirmed that the compact had desired components. In addition, as a result of an XRD measurement of the present prepared product, it was clarified that the prepared product was made of the phases of NiMgO, $MgAl_2O_4$ and $Ce_xZr_{1-x}O_2$, and the size of the respective crystallites were 14 nm, 11 nm and 22 nm.

The catalyst was fixed using silica wool so as to be located in the center of an SUS reaction pipe, a thermocouple was inserted into the central position of the catalyst layer, and the fixed-bed reaction pipe was set in a predetermined location.

Before the initiation of a reformation reaction, first, the temperature of the reaction container was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reaction container as a typical substance at a flow rate of 0.025 g/min, and was reacted at normal pressure.

As a result of collecting and observing the catalyst after the end of the test, a large amount of bulk-shaped carbon was accumulated between the catalyst particles. As a result of sieving the catalyst particles and the accumulated substance, a majority of the bulk-shaped carbon on the catalyst surface was separated from the catalyst surface due to several times of fine vibration, passed through the openings in the sieve, and dropped.

Therefore, it was found that, in a case in which the present catalyst was used, a majority of the solid carbon accumulated between the catalyst particles passed through the catalyst particles due to the slight stirring of the catalyst particles, and dropped. Based on the above-described result, it can be considered that, when the apparatus of Test Example 1-1 or 1-3 is used in a reformation reaction in which the present catalyst is used, it is possible to significantly avoid the attachment of the product to the holding section of the catalyst layer and the blockage in the catalyst layer.

Reference Example 1-2

Nickel, magnesium and sodium were weighed so that the atomic weights (%) thereof became 10%, 80% and 10% respectively, nickel, magnesium and sodium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and sodium were aged by continuing the stirring for a certain period of time while holding nickel, magnesium and sodium were at 60° C., then, were suction-filtered, and were sufficiently washed using pure water (80° C.).

After sediment obtained after the washing was dried at 120° C. and coarsely crushed, the crushed sediment was fired (calcined) in the air at 600° C., crushed, and then powder was press-molded into a tablet shape having a diameter of 3 mm using a compression molder, thereby producing a tablet compact. The compact was fired in the air at 950° C., and a $Ni_{0.1}M_{0.1}Mg_{0.8}O$ catalyst compact was prepared.

The catalyst was fixed using silica wool so as to be located in the center of an SUS reaction pipe, a thermocouple was inserted into the central position of the catalyst layer, and the fixed-bed reaction pipe was set in a predetermined location.

Before the initiation of a reformation reaction, the temperature of the reaction container was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reaction container as a typical substance at a flow rate of 0.025 g/min, and was reacted at normal pressure.

As a result of collecting and observing the catalyst after the end of the test, a large amount of bulk-shaped carbon was accumulated between the catalyst particles. As a result of sieving the catalyst particles and the accumulated substance, a majority of the bulk-shaped carbon on the catalyst surface was separated from the catalyst surface due to several times of vibration, passed through the openings in the sieve, and dropped.

Therefore, it was found that, in a case in which the present catalyst was used, a majority of the solid carbon accumulated between the catalyst particles passed through the catalyst particles due to the slight stirring of the catalyst particles, and dropped. Based on the above-described result, it can be considered that, when the apparatus of Test Example 1-1 or 1-3 is used in a reformation reaction in which the present catalyst is used, it is possible to significantly avoid the attachment of the product to the holding section in the catalyst layer and the blockage in the catalyst layer.

Test Example 2-1

Configuration of the Entire Reaction System

Coal carbonized gas (containing water vapor derived from moisture in coal) was continuously generated as raw material gas by supplying coal to a heated kiln from a coal supplier (coal hopper constant quantity supplier) at a rate of 20 kg/hour.

An inflow opening in a continuous fixed-bed catalytic reactor having a structure as illustrated in FIGS. 8A, 8B, 8C and 8D was connected to the kiln using a heat-retaining pipe, and an outflow opening in the continuous fixed-bed catalytic reactor was connected to an induced draft fan through a scrubber using a heat-retaining pipe.

Tar in the coal carbonized gas was reformed in the catalytic reaction container so as to generate light gas (hydrogen or the like), and the light gas was diffused in the atmosphere through a flare stack (that combusts the reformed gas) using the induced draft fan.

The catalytic reaction container was accommodated in an electric heating furnace having a furnace temperature controlled to a constant temperature. The flow rate of the induced draft fan could be adjusted, and was controlled to a flow rate corresponding to the coal carbonized gas-generating rate.

(Catalyst)

1) Material: a component system forming $Ni_{0.1}Ce_{0.1}Mg_{0.8}O$

Nickel nitrate, cerium nitrate and magnesium nitrate were weighed so that the molar ratio of the respective metal elements became 1:1:8, nickel, magnesium and cerium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and cerium were aged by continuing the stirring for a certain period of time while holding nickel, magnesium and cerium were at 60° C., then, were suction-filtered, and were sufficiently washed using pure water (80° C.). After sediment obtained after the washing was dried at 120° C. and coarsely crushed, the crushed sediment was fired (calcined) in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium, cerium and alumina attached to the wall surface of the eggplant flask were moved into an evaporation dish, dried at 120° C., and calcined at 600° C. Powder was press-molded using a compression molder, thereby producing a compact.

The compact was fired in the air at 950° C., and a catalyst compact was prepared by mixing 50% by mass of alumina with $Ni_{0.1}Ce_{0.1}Mg_{0.8}O$. As a result of confirming the components of the compact through ICP analysis, it was confirmed that the compact had desired components. In addition, as a result of measuring the compact using a kiya-type hardness meter, it was found that the compact held a high strength of approximately 100 N.

2) The shape and dimensions of the catalyst particles: cylindrical catalyst particles having an outer diameter of 15 mm, an inner diameter of 5 mm, and a height of 15 mm.

3) Amount of the catalyst used: 7 kg (Continuous Fixed-Bed Catalytic Reactor)

A test was carried out using a continuous fixed-bed catalytic reactor having the structure illustrated in FIGS. 8A, 8B, 8C and 8D. The continuous fixed-bed catalytic reactor illustrated in FIGS. 8A, 8B, 8C and 8D was disposed inside the electric heating furnace so as to be capable of being heated during a reaction.

Dimensions of the reaction container: 40 mm thick×450 mm wide×700 mm high

Inflow opening was made to ventilate gas from a rectangular opening having a height of 50 mm and a width of 400 mm to the inflow and outflow pipe of JIS80A Material: stainless steel Pin: a stainless steel round rod having a diameter of 5.1 mm and a length of 90 mm. The top section was flat, and the corner section was 1 mm-faced. All the pins were welded to the substrate of the catalyst holder in a shape of an isosceles triangle having a bottom side of 16 mm (in the width direction) and a height of 13.5 mm (in the thickness side).

Aperture ratio: 92%

(Operation Conditions)

Temperature of the kiln: 750° C.

Temperature of the electric heating furnace: 800° C.

Flow rate of the coal carbonized gas: 10 $Nm^3/h$ on an average

Ventilation period of the coal carbonized gas: five hours

The above-described catalyst was accommodated in the continuous fixed-bed catalytic reactor illustrated in FIGS. 8A, 8B, 8C and 8D, and a thermocouple was inserted into the central position of the catalyst layer.

Before the initiation of a reformation reaction, the temperature of the reactor was increased up to 800° C. in a nitrogen atmosphere, and a reduction treatment was carried out for 30 minutes while making hydrogen gas flow at 80 Nl/min. After that, coke furnace gas was adjusted and introduced, and the reaction was evaluated at normal pressure.

(Results)

After the end of the test, while 20 g of solid carbon was accumulated on the substrate of the catalyst holder, on the surface of the catalyst holder, only a thin solid carbon film was generated, there was no attachment of bulk-shaped solid carbon to the pins, and the ventilation resistance of the catalyst holder was the same as the ventilation resistance when the holder had been installed.

In addition, as a result of investigating the properties of the accumulated solid carbon, it was found that the majority of the solid carbon was amorphous.

Test Example 2-2

A test was carried out under the same conditions as in Test Example 2-1 except for the fact that the catalyst was held by providing punching metal having a hole diameter of 6 mm, a plate thickness of 0.8 mm and an aperture ratio of 20% at the inflow opening instead of the catalyst holder in Test Example 2-1.

(Results)

Since the pressure loss in the catalytic reaction container exceeded the threshold limit value (6 kPa) after three hours of ventilation of the coal carbonized gas, the test was stopped.

As a result of investigating the catalytic reaction container after cooling the apparatus and opening the inflow opening and the outflow opening after the test, all the holes in the punching metal were blocked with solid carbon.

In this state, 50 Pa (gauge pressure) of nitrogen (gas that did not cause a catalytic reaction) was supplied, and the gas flow rate at the outflow opening was measured. Next, the solid carbon in the holes in the punching metal are removed using a wire brush, and then the gas flow rate at the outflow opening was measured under the same conditions. As a result, the gas flow rate at the outflow opening after the removal of the solid carbon doubled the gas flow rate before the removal of the solid carbon. Therefore, it was found that, in the catalyst holding method of the related art, the precipitation of the solid carbon in the holding section had a significant adverse effect on the ventilation property; however, according to Test Example 2-1, the catalyst holder rarely had an adverse effect on the ventilation property.

Test Example 2-3

A test was carried out using a continuous fixed-bed catalytic reactor having the structure illustrated in FIG. 12.
Dimensions of the reaction container: 80 mm thick×220 mm wide×500 mm high
Inflow opening: the top end of the reaction container was open to the outflow pipe of JIS 80A, and the bottom end was open to the inflow pipe of JIS150A respectively. The pin holding plate was held at the central height of the inflow pipe, and the exposed portion on the outer circumference of the pin to the inflow pipe corresponded to the inflow opening.
Storage space for the solid carbon corresponded to the inflow pipe region below the pin holding plate.
Other conditions were the same as in Test Example 2-1, under which the test was carried out.
(Results)
There was no bulk-shaped solid carbon observed on the surfaces of the pins after the test. 10 g of solid carbon was accumulated on the pin holding plate, and 10 g of solid carbon was accumulated in the storage space. Therefore, it was found that it was possible to suppress an increase in the ventilation resistance caused by the pins buried by the solid carbon accumulated on the pin holding plate.

Reference Example 2-1

Nickel nitrate, cerium nitrate, zirconium nitrate oxide and magnesium nitrate were weighed so that the molar ratio of the respective metal elements became 1:1:1:7, nickel, cerium, zirconium and magnesium were co-precipitated as hydroxides by adding a potassium carbonate aqueous solution heated to 60° C. to a mixed aqueous solution prepared at a heating temperature of 60° C., and were sufficiently stirred using a stirrer.
After that, nickel, cerium, zirconium and magnesium were aged by continuing the stirring for a certain period of time while holding nickel, cerium, zirconium and magnesium were at 60° C., then, were suction-filtered, and were sufficiently washed using pure water (80° C.). After sediment obtained after the washing was dried at 120° C. and coarsely crushed, the crushed sediment was calcined in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium and alumina attached to the wall surface of the eggplant flask were moved into an evaporation dish, dried at 120° C., and calcined at 600° C. Powder was press-molded into a tablet shape having a diameter of 3 mm using a compression molder, thereby producing a tablet compact. The compact was fired in the air at 950° C., and a catalyst compact was prepared by mixing 50% by mass of alumina with $Ni_{0.1}Ce_{0.1}Zr_{0.1}Mg_{0.7}O$.
As a result of confirming the components of the compact through ICP analysis, it was confirmed that the compact had desired components. In addition, as a result of an XRD measurement of the present prepared product, it was clarified that the prepared product was made of the phases of NiMgO, $MgAl_2O_4$ and $Ce_xZr_{1-x}O_2$, and the size of the respective crystallites were 14 nm, 11 nm and 22 nm.
The catalyst was fixed using silica wool so as to be located in the center of an SUS reaction pipe, a thermocouple was inserted into the central position of the catalyst layer, and the fixed-bed reaction pipe was set in a predetermined location.
Before the initiation of a reformation reaction, first, the temperature of the reactor was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reaction container as a typical substance at a flow rate of 0.025 g/min, was reacted at normal pressure, and was evaluated.
In the present reference example, a net was provided at the bottom section of the catalyst in the reaction pipe, the catalyst was held by fixing the net using silica wool so as to prevent the dropping of the net, and after the end of the test, a large amount of solid carbon was attached to the entire net. Therefore, it was found that, when the catalyst was used, some of the solid carbon was easily dropped and attached to the net.
In addition, as a result of investigating the properties of a substance attached to the net after the test, it was found that, the substance was almost the same as the substance dropped from the catalyst in Test Example 2-1. Therefore, it can be considered that, when the apparatus of Test Example 2-1 is used in a reformation reaction in which the present catalyst is used, it is possible to significantly avoid the attachment of the product to the holding section in the catalyst layer and the blockage in the catalyst layer.

Reference Example 2-2

Nickel, magnesium and sodium were weighed so that the atomic weights (%) thereof became 10%, 80% and 10% respectively, nickel, magnesium and sodium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and sodium were aged by continuing the stirring for a certain period of time while holding nickel, magnesium and sodium were at 60° C., then, were suction-filtered, and were sufficiently washed using pure water (80° C.).
After sediment obtained after the washing was dried at 120° C. and coarsely crushed, the crushed sediment was fired (calcined) in the air at 600° C., crushed, and then powder was press-molded into a tablet shape having a diameter of 3 mm using a compression molder, thereby producing a tablet compact. The compact was fired in the air at 950° C., and a $Ni_{0.1}M_{0.1}Mg_{0.8}O$ catalyst compact was prepared.
The catalyst was fixed using silica wool so as to be located in the center of an SUS reaction pipe, a thermocouple was inserted into the central position of the catalyst layer, and the fixed-bed reaction pipe was set in a predetermined location.
Before the initiation of a reformation reaction, the temperature of the reactor was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reactor as a typical substance at a flow rate of 0.025 g/min, was reacted at normal pressure, and was evaluated.

In the present reference example, a net was provided at the bottom section of the catalyst in the reaction pipe, the catalyst was held by fixing the net using silica wool so as to prevent the dropping of the net, and after the end of the test, a large amount of solid carbon was attached to the entire net. Therefore, it was found that, when the catalyst was used, some of the solid carbon was easily dropped and attached to the net. In addition, as a result of investigating the properties of a substance attached to the net after the test, it was found that, the substance was almost the same as the substance dropped from the catalyst in Test Example 2-1. Therefore, it can be considered that, when the apparatus of Test Example 2-1 is used, it is possible to significantly avoid the attachment of the product to the holding section in the catalyst layer and the blockage in the catalyst layer in a reformation reaction in which the present catalyst is used.

Test Example 3-1

Configuration of the Entire Reaction System

Coal carbonized gas (containing water vapor derived from moisture in coal) was continuously generated by supplying coal to a heated kiln from a coal supplier (coal hopper constant quantity supplier) at a rate of 20 kg/hour. An inflow opening in a continuous fixed-bed catalytic reactor was connected to the kiln using a heat-retaining pipe, and an outflow opening in the continuous fixed-bed catalytic reactor was connected to an induced draft fan through a scrubber using a heat-retaining pipe. Tar in the coal carbonized gas was reformed in the catalytic reaction container so as to generate light gas (hydrogen or the like), and the light gas was diffused as the reformed gas in the atmosphere through a flare stack (that combusts the reformed gas) using the induced draft fan. The catalytic reaction container was accommodated in an electric heating furnace having a furnace temperature controlled to a constant temperature. The flow rate of the induced draft fan could be adjusted, and was controlled to a flow rate corresponding to the coal carbonized gas-generating rate.

(Continuous Fixed-Bed Catalytic Reactor)

A test was carried out using a continuous fixed-bed catalytic reactor illustrated in FIGS. 15A, 15B and 15C. The reaction container was made of stainless steel, had dimensions of 80 mm thick×300 mm wide×700 mm high, and had a duct shape having openings on the top and bottom. The top end of the duct in the reaction container was connected to the outflow pipe of JIS 80A, and the bottom end of the duct was connected to the inflow pipe of JIS150A, thereby ventilating gas.

(Operation Conditions)

The operation conditions were as described below.
Temperature of the coal carbonized kiln: 750° C.
Temperature of the electric heating furnace: 800° C.
Flow rate of the coal carbonized gas: 10 $Nm^3/h$ on an average
Ventilation period of the coal carbonized gas: five hours Before the initiation of a reformation reaction, first, the temperature of the reactor was increased up to 800° C. in a nitrogen atmosphere, and a reduction treatment was carried out for 30 minutes while making hydrogen gas flow at 80 Nl/min. After that, coke furnace gas was adjusted and introduced, and the reaction was evaluated at normal pressure.

7 kg of the following catalyst was accommodated in the continuous fixed-bed catalytic reactor illustrated in FIGS. 15A, 15B and 15C, and a thermocouple was inserted into the central position of the catalyst layer.

(Catalyst)

A catalyst having a component system of $Ni_{0.1}Ce_{0.1}Mg_{0.8}O$ was used as the catalyst.

Nickel nitrate, cerium nitrate and magnesium nitrate were weighed so that the molar ratio of the respective metal elements became 1:1:8, nickel, magnesium and cerium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and cerium were aged by continuing the stirring for a certain period of time while holding nickel, magnesium and cerium were at 60° C., then, were suction-filtered, and were sufficiently washed using pure water (80° C.). After sediment obtained after the washing was dried at 120° C. and coarsely crushed, the crushed sediment was fired (calcined) in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium, cerium and alumina attached to the wall surface of the eggplant flask were moved into an evaporation dish, dried at 120° C., and calcined at 600° C. Powder was press-molded using a compression molder, thereby producing a cylindrical compact having an outer diameter of 15 mm, an inner diameter of 5 mm and a height of 15 mm.

The compact was fired in the air at 950° C., and a catalyst compact was prepared by mixing 50% by mass of alumina with $Ni_{0.1}Ce_{0.1}Mg_{0.8}O$. As a result of confirming the components of the compact through ICP analysis, it was confirmed that the compact had desired components. In addition, as a result of measuring the compact using a kiya-type hardness meter, it was found that the compact held a high strength of approximately 100 N.

(Catalyst Bar)

Stainless round rods having a diameter of 4 mm and a length of 500 mm were used as the central rods, and cylindrical collars having a diameter of 10 mm were welded to a location 80 mm away from the bottom end, thereby preventing the dropping of the catalyst particles. The central rods in the catalyst particle series were welded to the bottom plate that was the holder, and 30 catalyst particles were made to penetrate through the portion on the collars, thereby manufacturing a catalyst bar. The catalyst particle series were disposed in a zigzag shape in five rows in the reaction container thickness direction and in 14 or 15 rows in the width direction.

(Driving Mechanism of the Holding Plate)

Up-and-down stroke of the driving apparatus: 20 mm
Elevating speed of the driving apparatus: 10 mm/second
Lowering speed of the driving apparatus: 80 mm/second
Operation timing: the holding plate was reciprocally moved up and down three times at 3.5 hours after the initiation of the ventilation of the coal carbonized gas.

(Results)

Figure 18:
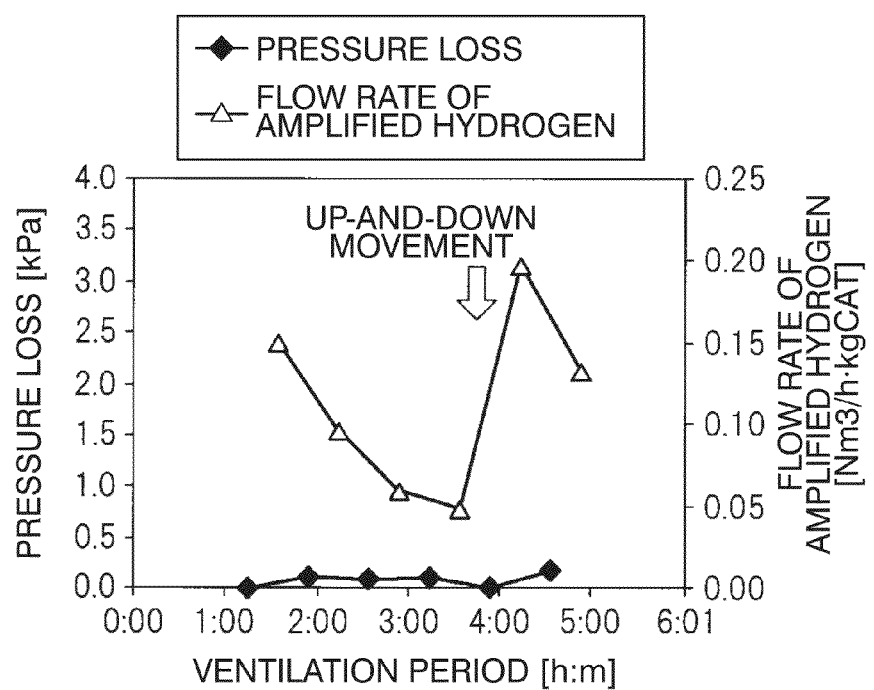
FIG. 18 is a graph illustrating test results of Example 3-1.

The test results will be described using FIG. 18. In FIG. 18, the horizontal axis represents the ventilation period, the left vertical axis represents the pressure loss in the reaction container, and the right vertical axis represents the flow rate of amplified hydrogen (the flow rate of hydrogen generated in the reaction container by the reformation reaction caused by the catalyst per unit mass of the catalyst). There was no particular increase in the ventilation resistance observed during the test. While the reformation performance slowly degraded after the initiation of the ventilation of coal carbonized gas, the reformation performance was abruptly recovered immediately after the execution of the reciprocal movement of the catalyst bar.

As a result of cooling and dissembling the reaction container after the end of the test and investigating the inside, while 50 g of solid carbon was accumulated on the bottom plate, there was no noticeable bulk-shaped product attached to the catalyst particles.

Test Example 3-2

A test was carried out using a continuous fixed-bed catalytic reactor of FIGS. 16A, 16B and 16C. The test was carried out in the same manner as in Test Example 3-1 except for the facts that stainless round rods having a diameter of 4 mm and a length of 280 mm were used as the central rods, the catalyst particle series were welded to the holder on one side at one ends and were detachably mounted on the holder on the other side at the other ends, each catalyst particle series had 19 cylindrical catalyst particles penetrated, the catalyst particle series were disposed in a zigzag shape in five rows in the thickness direction and in 22 rows in the height direction in the catalyst bar, the catalyst bar was reciprocally moved in the vertical direction (the catalyst particles in the catalyst bar were moved in a direction of the diameter of the catalyst particle), and the catalyst bar was reciprocally moved at 8 hours 30 minutes and 9 hours 30 minutes after the initiation of the ventilation.

(Results)

Figure 21:
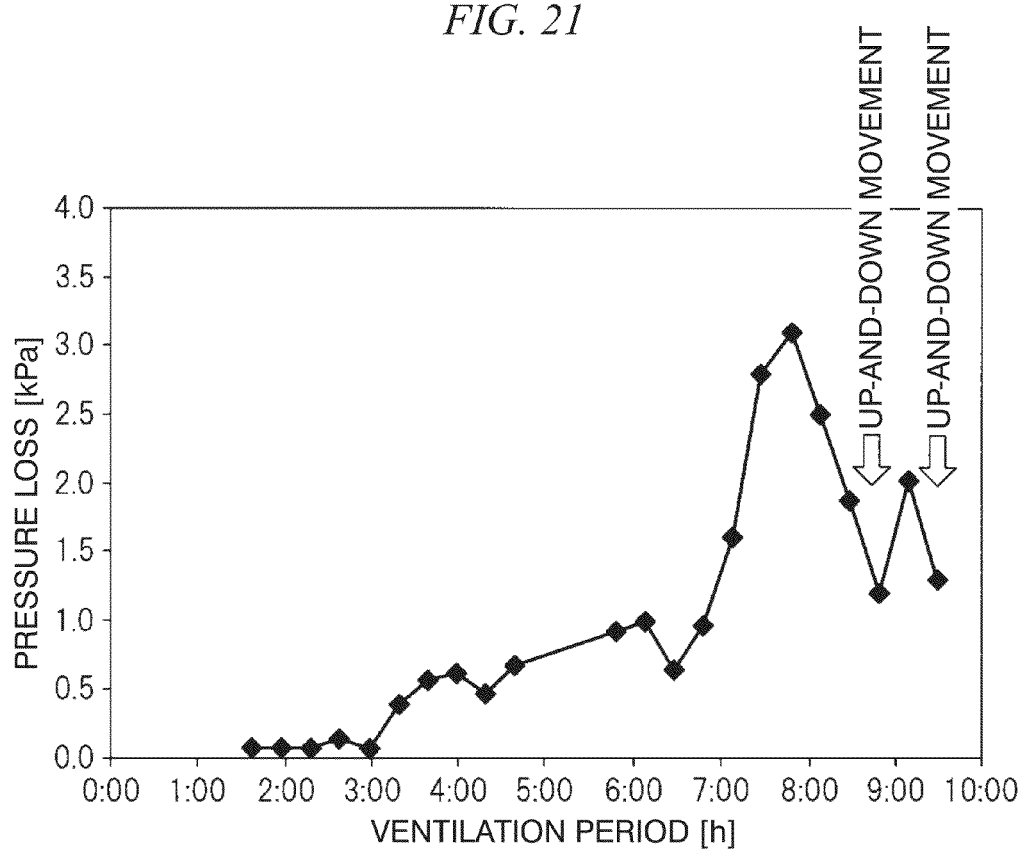
FIG. 21 is a graph illustrating test results of Example 3-2.

The test results will be described using FIG. 21. In FIG. 21, the horizontal axis represents the ventilation period, and the vertical axis represents the pressure loss in the reaction container. While the rate of the ventilation resistance increase was slightly higher than in Test Example 3-1 during the test, the pressure loss could be abruptly decreased immediately after the execution of two times of the reciprocal movement of the catalyst bar.

The amount of carbon collected by cooling and dissembling the reaction container after the end of the test was 800 g.

There was no damaged catalyst particles observed.

Reference Example 3-1

Nickel nitrate, cerium nitrate, zirconium nitrate oxide and magnesium nitrate were weighed so that the molar ratio of the respective metal elements became 1:1:1:7, nickel, cerium, zirconium and magnesium were co-precipitated as hydroxides by adding a potassium carbonate aqueous solution heated to 60° C. to a mixed aqueous solution prepared at a heating temperature of 60° C., and were sufficiently stirred using a stirrer.

After that, nickel, cerium, zirconium and magnesium were aged by continuing the stirring for a certain period of time while holding nickel, cerium, zirconium and magnesium were at 60° C., then, were suction-filtered, and were sufficiently washed using pure water (80° C.). After sediment obtained after the washing was dried at 120° C. and coarsely crushed, the crushed sediment was calcined in the air at 600° C., crushed, and then fed into a beaker. An alumina sol was added, the mixture was sufficiently mixed using a mixer equipped with a stirring blade and moved into an eggplant flask. The eggplant flask was mounted in a rotary evaporator, and the mixture was suctioned under stirring, thereby evaporating moisture. Compounds of nickel, magnesium and alumina attached to the wall surface of the eggplant flask were moved into an evaporation dish, dried at 120° C., and calcined at 600° C. Powder was press-molded into a tablet shape having a diameter of 3 mm using a compression molder, thereby producing a tablet compact. The compact was fired in the air at 950° C., and a catalyst compact was prepared by mixing 50% by mass of alumina with $Ni_{0.1}Ce_{0.1}Zr_{0.1}Mg_{0.7}O$.

As a result of confirming the components of the compact through ICP analysis, it was confirmed that the compact had desired components. In addition, as a result of an XRD measurement of the present prepared product, it was clarified that the prepared product was made of the phases of NiMgO, $MgAl_2O_4$ and $Ce_xZr_{1-x}O_2$, and the size of the respective crystallites were 14 nm, 11 nm and 22 nm.

The catalyst was fixed using silica wool so as to be located in the center of an SUS reaction pipe, a thermocouple was inserted into the central position of the catalyst layer, and the fixed-bed reaction pipe was set in a predetermined location.

Before the initiation of a reformation reaction, first, the temperature of the reaction container was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reaction container as a typical substance at a flow rate of 0.025 g/min, and was reacted at normal pressure.

As a result of collecting and observing the catalyst after the end of the test, a large amount of bulk-shaped carbon was accumulated between the catalyst particles. As a result of sieving the catalyst particles and the accumulated substance, a majority of the bulk-shaped carbon on the catalyst surface was separated from the catalyst surface due to several times of fine vibration, passed through the openings in the sieve, and dropped.

Therefore, it was found that, in a case in which the present catalyst was used, a majority of the solid carbon accumulated between the catalyst particles passed through the catalyst particles due to the slight vibration of the catalyst particles, and dropped. Based on the above-described result, it can be considered that, when the apparatus of Test Example 3-1 or 3-2 is used in a reformation reaction in which the present catalyst is used, it is possible to significantly avoid the attachment of the solid product to the catalyst particles.

Reference Example 3-2

Nickel, magnesium and sodium were weighed so that the atomic weights (%) thereof became 10%, 80% and 10% respectively, nickel, magnesium and sodium were co-precipitated as hydroxides by adding a potassium carbonate aqueous solution heated to 60° C. to a mixed aqueous solution prepared at a heating temperature of 60° C., and were sufficiently stirred using a stirrer. After that, nickel, magnesium and sodium were aged by continuing the stirring for a certain period of time while holding nickel, magnesium and sodium were at 60° C., then, were suction-filtered, and were sufficiently washed using pure water (80° C.).

After sediment obtained after the washing was dried at 120° C. and coarsely crushed, the crushed sediment was fired (calcined) in the air at 600° C., crushed, and then powder was press-molded into a tablet shape having a diameter of 3 mm using a compression molder, thereby producing a tablet compact. The compact was fired in the air at 950° C., and a $Ni_{0.1}M_{0.1}Mg_{0.8}O$ catalyst compact was prepared.

The catalyst was fixed using silica wool so as to be located in the center of an SUS reaction pipe, a thermocouple was inserted into the central position of the catalyst layer, and the fixed-bed reaction pipe was set in a predetermined location.

Before the initiation of a reformation reaction, the temperature of the reaction container was increased up to 800° C. in a nitrogen atmosphere, and a reduction treatment was carried out for 30 minutes while making hydrogen gas flow at 100 mL/min. After that, stimulant gas of coke furnace gas (crude gas) (hydrogen:nitrogen=1:1, 2000 ppm of $H_2S$ was contained, and the total flow rate was 125 mL/min) was prepared and introduced into the reaction container. In addition, as a stimulant substance of tar generated during the coal carbonization, 1-methyl naphthalene which was a liquid substance that was actually contained in tar and had a low viscosity at room temperature was introduced into the reaction container as a typical substance at a flow rate of 0.025 g/min, and was reacted at normal pressure.

As a result of collecting and observing the catalyst after the end of the test, a large amount of bulk-shaped carbon was accumulated between the catalyst particles. As a result of sieving the catalyst particles and the product, a majority of the bulk-shaped carbon on the catalyst surface was separated from the catalyst surface due to several times of fine vibration, passed through the openings in the sieve, and dropped.

Therefore, it was found that, in a case in which the present catalyst was used, a majority of the solid carbon accumulated between the catalyst particles passed through the catalyst particles due to the slight vibration of the catalyst particles, and dropped. Based on the above-described result, it can be considered that, when the apparatus of Test Example 3-1 or 3-2 is used in a reformation reaction in which the present catalyst is used, it is possible to significantly avoid the attachment of the solid product to the catalyst particles.

INDUSTRIAL APPLICABILITY

According to the invention, it is possible to provide a continuous fixed-bed catalytic reactor including an effective unit for removing a solid product generated and accumulated in a large-scale fixed-bed catalyst layer and a catalytic reaction method in which raw material gas, particularly, tar-containing raw material gas is highly efficiently reformed using the continuous fixed-bed catalytic reactor.

BRIEF DESCRIPTION OF THE REFERENCE SYMBOLS

1 CATALYTIC REACTION CONTAINER
2 CATALYST
3 PUNCHING METAL PLATE
4 RAW MATERIAL GAS
5 INFLOW OPENING
6 OUTFLOW OPENING
7 REFORMED GAS
110 CONTINUOUS FIXED-BED CATALYTIC REACTOR
111 REACTION CONTAINER
112, 112' CATALYST HOLDER
113 CATALYST LAYER
114 RAW MATERIAL GAS
115 REFORMED GAS
116 RAW MATERIAL GAS INFLOW PATH
117 REFORMED GAS OUTFLOW PATH
118 ROD
119 FIXING TOOL
120 DRIVING MECHANISM
121 UP-AND-DOWN MOVEMENT APPARATUS
122 CONDUCTION AXIS
125 PIN
126 BOTTOM PLATE
211 CATALYTIC REACTION CONTAINER
212 CATALYST LAYER
213 INFLOW PATH
213a INFLOW OPENING
214 OUTFLOW PATH
214a OUTFLOW OPENING
215 LID
216 RAW MATERIAL GAS
217 REFORMED GAS
218 CATALYST HOLDER
222 ROUND PIPE
223 STORAGE SPACE
224 LOUVER
225 DROPPED SUBSTANCE
310 CONTINUOUS FIXED-BED REACTOR
311 REACTION CONTAINER
312 HOLDING PLATE
313 CATALYST PARTICLE SERIES
314, 314' CATALYST BAR
315 DRIVING MECHANISM
316 UP-AND-DOWN MOVEMENT APPARATUS
317 CONDUCTION AXIS
318 RAW MATERIAL GAS
319 REFORMED GAS
320 RAW MATERIAL GAS INFLOW PATH
321 REFORMED GAS OUTFLOW PATH
322 COLLAR
351 CATALYST
352 CENTRAL ROD

The invention claimed is:

1. A continuous fixed-bed catalytic reactor comprising:
an inflow path for raw material gas for a catalytic reaction and an outflow path for reformed gas;
a catalytic reaction container that is connected to the inflow path and the outflow path and holds a clumpy catalyst, the clumpy catalyst having external dimensions of 5 mm to 50 mm;
a catalyst holder that has a ventilation property and holds the clumpy catalyst; and
a driving mechanism that moves the clumpy catalyst up and down by moving the catalyst holder up and down,
wherein a space for storing a solid or liquid foreign substance generated in a catalyst layer is provided below the catalyst layer; wherein the catalyst layer is a collection of clumpy catalyst particles.

2. The continuous fixed-bed catalytic reactor according to claim 1,
wherein at least some of catalyst particles configuring side outer circumferential surfaces of the catalyst layer are in contact with an inner wall of the catalytic reaction container.

3. The continuous fixed-bed catalytic reactor according to claim 2,
   wherein a height of the catalyst layer is twice or less a thickness of the catalytic reaction container and is equal to or more than a maximum height of three catalyst particles overlaid in a vertical direction value.

4. The continuous fixed-bed catalytic reactor according to claim 2,
   wherein an average speed of the driving mechanism moving the catalyst holder down is faster than an average speed of the driving mechanism moving the catalyst holder up.

5. The continuous fixed-bed catalytic reactor according to claim 2,
   wherein the catalyst holder has a plurality of pins which are disposed in parallel with each other and which directly hold the clumpy catalyst at a front end section.

6. The continuous fixed-bed catalytic reactor according to claim 5,
   wherein an inter-shaft distance between adjacent pins in the plurality of the pins satisfies a condition of [inter-shaft distance between pins]−[outer diameter dimension of pin]<[minimum mesh size dimension allowing the clumpy catalyst to pass through].

7. The continuous fixed-bed catalytic reactor according to claim 5,
   wherein a curvature at a contact section in the pin with the clumpy catalyst is smaller than a maximum curvature on an outer surface of the clumpy catalyst.

8. The continuous fixed-bed catalytic reactor according to claim 1,
   wherein the catalyst holder includes
   central rods forming catalyst particle series by penetrating a plurality of the clumpy catalyst particles without impairing mobility of the clumpy catalyst, and
   a holding plate supporting the plurality of the central rods upright.

9. The continuous fixed-bed catalytic reactor according to claim 8,
   wherein a material with a high thermal conductivity is used for the central rods, and a heating apparatus is provided to heat end sections of the central rods.

10. The continuous fixed-bed catalytic reactor according to claim 8,
    wherein the driving mechanism is operated so that a speed of the central rod becomes slower than a speed of the clumpy catalyst particles at a terminal portion of reciprocal movement by the driving mechanism.

11. The continuous fixed-bed catalytic reactor according to claim 1,
    wherein the raw material gas is gas containing hydrocarbon, and products of a catalytic reaction are gas and solid hydrocarbon or solid carbon.

12. The continuous fixed-bed catalytic reactor according to claim 11,
    wherein the raw material gas is gas containing tar.

13. The continuous fixed-bed catalytic reactor according to claim 12,
    wherein the clumpy catalyst is a complex oxide containing nickel, magnesium, cerium and aluminum, and is made of a complex oxide not containing alumina,
    in which the complex oxide may be made of crystal phases of NiMgO, $MgAl_2O_4$ and $CeO_2$.

14. The continuous fixed-bed catalytic reactor according to claim 12,
    wherein the clumpy catalyst is made of a complex oxide containing nickel, magnesium, cerium, zirconium and aluminum,
    in which the complex oxide includes crystal phases of NiMgO, $MgAl_2O_4$ and $Ce_xZr_{1-x}O_2$ (0<x<1).

15. The continuous fixed-bed catalytic reactor according to claim 12,
    wherein the clumpy catalyst is a catalyst for reforming tar-containing gas that is a complex oxide represented by aM.bNi.cMg.dO,
    in which a, b and c satisfy a+b+c=1, $0.02 \leq a \leq 0.98$, $0.01 \leq b \leq 0.97$ and $0.01 \leq c \leq 0.97$, d represents a value at which oxygen and a positive element becomes electrically neutral,
    M represents at least one element selected from Ti, Zr, Ca, W, Mn, Zn, Sr, Ba, Ta, Co, Mo, Re, platinum, rhenium, palladium, rhodium, Li, Na, K, Fe, Cu, Cr, La, Pr and Nd,
    at least one oxide selected from silica, alumina and zeolite is added to the complex oxide, and an amount of the oxide selected from silica, alumina and zeolite is in a range of 1% by mass to 90% by mass with respect to the complex oxide.

16. A continuous fixed-bed catalytic reaction method,
    wherein a catalytic reaction is caused using the continuous fixed-bed catalytic reactor according to claim 1.

* * * * *